US010460062B2

(12) United States Patent
Feld et al.

(10) Patent No.: US 10,460,062 B2
(45) Date of Patent: Oct. 29, 2019

(54) METHOD AND COMPUTER PROGRAM FOR DETERMINING A PLACEMENT OF AT LEAST ONE CIRCUIT FOR A RECONFIGURABLE LOGIC DEVICE

(71) Applicant: Fraunhofer-Gesellschaft zur Foerderung der angewandten Forschung e.V., Munich (DE)

(72) Inventors: Dustin Feld, Cologne (DE); Thomas Soddemann, Koenigswinter (DE)

(73) Assignee: Fraunhofer Gesellschaft zur Foerderung der angewandten Forschung e.V. (DE)

( * ) Notice: Subject to any disclaimer, the term of this patent is extended or adjusted under 35 U.S.C. 154(b) by 149 days.

(21) Appl. No.: 15/837,124

(22) Filed: Dec. 11, 2017

(65) Prior Publication Data

US 2018/0165400 A1    Jun. 14, 2018

(30) Foreign Application Priority Data

Dec. 12, 2016 (EP) .................................. 16203521

(51) Int. Cl.
*G06F 17/50* (2006.01)
(52) U.S. Cl.
CPC ........ *G06F 17/5072* (2013.01); *G06F 17/509* (2013.01); *G06F 17/5054* (2013.01); *G06F 2217/02* (2013.01); *G06F 2217/06* (2013.01)
(58) Field of Classification Search
USPC ........................................................ 716/121
See application file for complete search history.

(56) References Cited

U.S. PATENT DOCUMENTS 5,880,598 A    3/1999  Duong
6,275,064 B1   8/2001  Agrawal et al.
(Continued)

FOREIGN PATENT DOCUMENTS

CN    101231674 A    7/2008

OTHER PUBLICATIONS

Vaughn Betz et al; VPR: A new packing, placement and routing tool for FPGA research; In Proceedings of the 7th International Workshop on Field-Programmable Logic and Applications, FPL '97, pp. 213-222, London, UK, 1997, Springer-Verlag, ISBN 3-540-63465-7.

(Continued)

*Primary Examiner* — Mohammed Alam
(74) *Attorney, Agent, or Firm* — 2SPL Patent Attorneys PartG mbB

(57) ABSTRACT

Embodiments relate to a method and computer program for determining a placement of at least one circuit for a reconfigurable logic device. The method comprises obtaining (110) information related to the at least one circuit. The at least one circuit comprises a plurality of blocks and a plurality of connections between the plurality of blocks. The plurality of blocks comprise a plurality of logic blocks. The method further comprises calculating (120) a circuit graph based on the information related to the at least one circuit. The circuit graph comprises a plurality of nodes and a plurality of edges. The plurality of nodes represent at least a subset of the plurality of blocks of the at least one circuit and wherein the plurality of edges represent at least a subset of the plurality of connections between the plurality of blocks of the at least one circuit. The method further comprises determining (130) a force-directed layout of the circuit graph. The force-directed layout is based on attractive forces based on the plurality of connections between the (Continued)

plurality of blocks and based on repulsive forces between the plurality of blocks. The method further comprises determining (140) a placement of the plurality of logic blocks onto a plurality of available logic cells of the reconfigurable logic device based on the force-directed layout of the circuit graph.

14 Claims, 8 Drawing Sheets

(56) References Cited

U.S. PATENT DOCUMENTS

| | | | |
|---|---|---|---|
| 6,301,693 | B1 | 10/2001 | Naylor et al. |
| 7,287,171 | B1 | 10/2007 | Mendel et al. |
| 7,590,960 | B1 | 9/2009 | Kong et al. |
| 7,752,588 | B2 | 7/2010 | Bose |
| 8,112,731 | B1 | 2/2012 | Shen et al. |
| 8,719,750 | B1 | 5/2014 | Balzli, Jr. |
| 2004/0088663 | A1 | 5/2004 | Wu et al. |
| 2004/0133869 | A1 | 7/2004 | Sharma |
| 2007/0150846 | A1* | 6/2007 | Furnish ............... G06F 17/5068 716/122 |
| 2008/0216038 | A1* | 9/2008 | Bose .................... G06F 17/5072 716/118 |
| 2009/0254874 | A1* | 10/2009 | Bose .................... G06F 17/5068 716/113 |
| 2010/0007428 | A1 | 1/2010 | Nezuka |
| 2010/0281448 | A1* | 11/2010 | He ....................... G06F 17/5054 716/108 |
| 2018/0165400 | A1* | 6/2018 | Feld .................... G06F 17/5054 |

OTHER PUBLICATIONS

Vaughn Betz et al; Architecture and CAD for Deep-Submicron FPGAs. Kluwer Academic Publishers, Norwell, MA, USA, 1999, ISBN 0792384601.
Tony Chan et al; Multilevel generalized force-directed method for circuit placement; In Proceedings of the 2005 International Symposium on Physical Design, ISPD '05, pp. 185-192, New York, NY, USA, 2005. ACM. ISBN 1-59593-021-3. doi: 10.1145/1055137. 1055177.
Yao-Wen Chang et al; Essential Issues in Analytical Placement Algorithms. IPSJ Transactions on System Lsi Design Methodology, 2:145-166, 2009. doi: 10.2197/ipsjtsldm.2.145.
T. C. Chen et al; Ntuplace3: An analytical placer for large-scale mixed-size designs with preplaced blocks and density constraints. IEEE Transactions on Computer-Aided Design of Integrated Circuits and Systems,27(7):1228-1240, Jul. 2008, ISSN 0278-0070. doi: 10.1109/TCAD.2008.923063.
Markus Chimani et al; The open graph drawing framework (ogdf), 2014.
Georges-Henri Cotte et al; Fast multipole methods for three-dimensional n-body problems. In Vortex Methods, pp. 284-300. Cambridge University Press, 2000, ISBN 9780511526442;Cambridge Books Online.
A. E. Dunlop et al; A procedure for placement of standard-cell vlsi circuits. IEEE Transactions on Computer-Aided Design of Integrated Circuits and Systems, 4(1):92-98, Jan. 1985, ISSN 0278-0070. doi: 10.1109/TCAD.1985.1270101.
Peter Eades et al; Drawing graphs in two layers. Theoretical Computer Science, 131(2):361-374, 1994, ISSN 0304-3975. doi: http://dx.doi.org/10.1016/0304-3975(94)90179-1.
Tom Feist; Vivado Design Suite (wp416). Technical report, Xilinx, Inc., Jun. 2012.
Stefan Hachul; A potential field based multilevel algorithm for drawing large graphs; PhD thesis, University of Cologne, 2005.
Michael Himsolt; GML: A portable Graph File Format; Technical report, Universität Passau, 94030 Passau, Germany, 1999.

B. Hu; Timing-driven placement for heterogeneous field programmable gate array. In 2006 IEEE/ACM International Conference on Computer Aided Design, pp. 383-388, Nov. 2006. doi: 10.1109/ICCAD.2006.320062.
P. Jamieson et al; A verilog RTL synthesis tool for heterogeneous FPGAs; In International Conference on Field Programmable Logic and Applications, 2005., pp. 305-310, Aug. 2005. doi: 10.1109/FPL. 2005.1515739.
Michael Jünger et al; Exact and heuristic algorithms for 2-layer straightline crossing minimization, pp. 337-348, Springer Berlin Heidelberg, Berlin, Heidelberg, 1996. ISBN 978-3-540-49351-8. doi: 10.1007/BFb0021817.
V. M. Kureichik et al; A simulated evolution-based solution of the placement problem. Journal of Computer and Systems Sciences International, 46(4):578-589, 2007, ISSN 1555-6530, doi: 10.1134/S1064230707040089.
Chih Iiang Eric Cheng; RISA: Accurate and efficient placement routability modeling. In Computer-Aided Design, 1994., IEEE/ACM International Conference on, pp. 690-695, Nov. 1994, doi: 10.1109/ICCAD.1994.629897.
Tzu-Hen Lin et al; An efficient and effective analytical placer for FPGAs. In Design Automation Conference (DAC), 2013 50th ACM/EDAC/IEEE, pp. 1-6, May 2013.
Adrian Ludwin et al; Efficient and deterministic parallel placement for FPGAs. ACM Trans. Des. Autom. Electron. Syst., 16(3):22:1-22: Jun. 23, 2011. ISSN 1084-4309. doi:10.1145/1970353.1970355.
Jason Luu et al; Vtr 7.0: Next generation architecture and cad system for fpgas, ACM Trans. Reconfigurable Technol. Syst., 7(2):6:1-6:30, Jul. 2014. ISSN 1936-7406. doi:10.1145/2617593.
Wai-Kei Mak et al; Placement for modern FPGAs. In Conference, Emerging Information Technology 2005., pp. 4 pp.-, Aug. 2005. doi: 10.1109/EITC.2005.1544354.
L. McMurchie et al; Pathfinder: A negotiation-based performance-driven router for FPGAs. In Field-Programmable Gate Arrays, 1995. FPGA '95. Proceedings of the Third International ACM Symposium on, pp. 111-117, 1995, doi: 10.1109/FPGA.1995. 242049.
Chandra Mulpuri et al; Runtime and quality trade-offs in FPGA placement and routing, In Proceedings of the 2001 ACM/SIGDA Ninth International Symposium on Field Programmable Gate Arrays, FPGA '01, pp. 29-36, New York, NY, USA, 2001, ACM. ISBN 1-58113-341-3. doi: 10.1145/360276.360294.
R. Nair et al; Generation of performance constraints for layout. IEEE Transactions on Computer-Aided Design of Integrated Circuits and Systems, 8(8):860-874, Aug. 1989. ISSN 0278-0070. doi: 10.1109/43.31546.
N. Quinn et al; A forced directed component placement procedure for printed circuit boards. IEEE Transactions on Circuits and Systems, 26(6):377-388, Jun. 1979. ISSN 0098-4094. doi:10.1109/TCS.1979.1084652.
Srilata Raman et al; Timing-constrained FPGA placement: A force-directed formulation and its performance evaluation, VLSI Design, 4(4):345-355, 1996. doi:10.1155/1996/53238.
Georg Sigl et al; Analytical placement: A linear or a quadratic objective function? In Proceedings of the 28th ACM/IEEE Design Automation Conference, DAC '91, pp. 427-432, New York, NY, USA, 1991. ACM, ISBN 0-89791-395-7. doi: 10.1145/127601. 127707.
Jürgen M. Kleinhans et al; GORDIAN: VLSI Placement by Quadratic Programming and Slicing Optimization, IEE Transactions on Computer-Aided Design, vol. 10, No. 3, Mar. 1991.
Richard Smith; Working draft, standard for programming language C++, rev. N4140. Technical report, Google Inc, 2014.
P. Spindler et al; Kraftwerk2—a fast force-directed quadratic placement approach using an accurate net model, IEEE Transactions on Computer-Aided Design of Integrated Circuits and Systems, 27(8):1398-1411, Aug. 2008, ISSN 0278-0070, doi: 10.1109/TCAD.2008. 925783.
Young su Kwon et al; A 3-d fpga wire resource prediction model validated using a 3-d placement and routing tool, In in Proc. of SLIP '05, pp. 65-72. ACM, 2005.
W. T. Tutte; Convex Representations of Graphs. Proceedings of the London Mathematical Society, 10:304-320, 1960.

(56) References Cited

OTHER PUBLICATIONS

W. T. Tutte; How to draw a graph. Proceedings of the London Mathematical Society, 13:743-767, 1963.
V. Udar et al; Analysis of place and route algorithm for field programmable gate array (FPGA), In Information Communication Technologies (ICT), 2013, IEEE Conference on, pp. 116-119, Apr. 2013, doi: 10.1109/CICT.2013.6558073.
Satya Prakash Upadhyay; Wirelength-driven analytical placement for FPGA, Master's thesis, 2015.
N. Viswanathan, M. Pan, and C. Chu. Fastplace 3.0: A fast multi-level quadratic placement algorithm with placement congestion control; In 2007 Asia and South Pacific Design Automation Conference, pp. 135-140, Jan. 2007, doi: 10.1109/ASPDAC.2007.357975.
Kristofer Vorwerk et al; Engineering details of a stable force-directed placer, In Proceedings of the 2004 IEEE/ACM International conference on Computer-aided design, pp. 573-580. IEEE Computer Society, 2004.
Vaishali Udar et al; Analysis of Place and Route Algorithm for Field Programmable Gate Array (FPGA); Proceedings of 2013 IEEE Conference on Information and Communication Technologies (ICT 2013).
R. Ferreira et al; A Run-Time Graph-Based Polynomial Placement and Routing Algorithm for Virtual FPGAS; 978-1-4799-0004-6/13/$31.00, 2013 IEEE.
Wentao Sui et al: "Wireiength-driven force-directed 3D FPGA piacement", Great Lakes Symposium on VLSI, ACM, 2 Penn Plaza, Suite 701 New York NY 10121-0701 USA,May 16, 2010 (May 16, 2010) ISBN: 978-1-4503-0012-4.
C. Ababei et al: "Placement and Routing in 3D Integrated Circuits", IEEE Design & Test of Computers., vol. 22, No. 6, Jun. 1, 2005 (Jun. 1, 2005),US, ISSN: 0740-7475.

\* cited by examiner (b) Backwards tracking of possible routes (a) Expanded wave on architecture Embedded on the grid Force-directed layout result

METHOD AND COMPUTER PROGRAM FOR DETERMINING A PLACEMENT OF AT LEAST ONE CIRCUIT FOR A RECONFIGURABLE LOGIC DEVICE

FIELD

Examples relate to a method and computer program for determining a placement of at least one circuit for a reconfigurable logic device, more specifically, but not exclusively, based on force-directed graph drawing.

BACKGROUND

Compilation flows are often accepted as black boxes. Based on the input code, their task is to produce an executable version of the process description. This translation is necessary for any compiled programming language and execution environment. Therefore, compilers generally accomplish the task of translating abstract descriptions into concrete machine instructions.

Whereas this procedure is frequently used by programmers for all different kinds of compiled languages, influencing the result is often limited to common compiler options, e. g., the specification of an optimization level. However, compiler development itself is a very interesting discipline of computer science. The availability of different possibilities to influence the translation process can improve not only the quality of a resulting implementation but also the process of development itself. For x86 processors, compilers usually offer a huge number of options while only very few are regularly taken into account (like the typically used '-O3' option in, e. g., Intel's or GNU's compiler collections).

When dealing with more 'exotic' architectures, the situation is similar or even more pronounced. Different situations and different goals demand flexible configurability regarding 'which direction a compiler should take' to translate an input description into executable instructions or even synthesized hardware. This is especially the case if hard restrictions (like indispensable timing constraints) have to be respected in order to guarantee the correct functionality of a system. Under such circumstances, FPGAs or other reconfigurable hardware devices are often the architecture of choice. The straight implementation in hardware, paired with the option to renew this hardware implementation without the need to replace any hardware parts, make such devices more and more important, especially if frequent changes of the hardware design are anticipated or if only a small number of the hardware should be produced. The manufacturing of an ASIC design in small quantities is often much more expensive than integrating an appropriate reconfigurable equivalent (which has been produced in very large amounts). In the end, this relatively generic chip only has to be configured with the appropriate functionality. In this context, 'placement' is the part of the compile flow that assigns synthesized logic units to suitable positions on the architecture.

SUMMARY

At least some embodiments provide a placement of at least one circuit for a reconfigurable logic device based on a force-directed layout of a circuit graph of the at least one circuit. A method for providing the placement generates the force-directed layout based on attractive forces between nodes of the circuit graph based on edges between the nodes, and based on repulsive forces attributed to the nodes themselves. The force-directed layout of logic blocks of the circuit graph may then be mapped on available logic blocks of the reconfigurable logic device in a structure-preserving way, and additional blocks, such as input/output (I/O) blocks, memory blocks, special function blocks and a routing between blocks may be added based on the mapping of the logic blocks on the reconfigurable logic device. To further improve the mapping of the force-directed layout to the reconfigurable logic device, local refinements and repeated mappings (e.g. with fixed I/O blocks) may be added.

Embodiments provide a method for determining a placement of at least one circuit for a reconfigurable logic device. The method comprises obtaining information related to the at least one circuit. The at least one circuit comprises a plurality of blocks and a plurality of connections between the plurality of blocks. The plurality of blocks comprise a plurality of logic blocks. The method further comprises calculating a circuit graph based on the information related to the at least one circuit. The circuit graph comprises a plurality of nodes and a plurality of edges. The plurality of nodes represent at least a subset of the plurality of blocks of the at least one circuit and wherein the plurality of edges represent at least a subset of the plurality of connections between the plurality of blocks of the at least one circuit. The method further comprises determining a force-directed layout of the circuit graph. The force-directed layout is based on attractive forces based on the plurality of connections between the plurality of blocks and based on repulsive forces between the plurality of blocks. The method further comprises determining a placement of the plurality of logic blocks onto a plurality of available logic cells of the reconfigurable logic device based on the force-directed layout of the circuit graph.

Determining a placement of the plurality of logic blocks based on the force-directed layout of the circuit graph may provide a placement of the plurality of logic blocks with a reduced computational effort. The force-directed layout based on repulsive and attractive forces may provide a clustering of heavily interconnected logic blocks while maintaining a distance between clusters, which may enhance a routability of routes between the plurality of logic blocks.

For example, the determining of the placement of the plurality of logic blocks may be based on an arrangement of nodes of the plurality of nodes defined by the force-directed layout of the circuit graph. For example, the determining of the placement of the plurality of logic blocks may be based on distances between (resp. the arrangement of) nodes of the plurality of nodes defined by the force-directed layout of the circuit graph. For example, the determining of the placement of the plurality of logic blocks may be based on a structure-preserving placement of the plurality of nodes defined by the force-directed layout of the circuit graph. For example the determining of the placement of the plurality of logic blocks arranges nodes of the plurality of nodes into two or more clusters of nodes and free space between the two or more clusters of nodes. The arrangement defined by the force-directed layout of the circuit graph may provide an improved placement of the logic blocks at a reduced computational effort.

For example, the determining of the force-directed layout may be based on (e.g. may use) a Manhattan-distance between nodes of the plurality of nodes. The determining of the force-directed layout using the Manhattan-distance may improve an accuracy of the force-directed layout, as a subsequent routing based on a Manhattan-like grid may be based on the Manhattan-distance.

For example, the determining of the force-directed layout of the circuit graph may be based on determining an energy-minimal state of a plurality of spring functions between the plurality of nodes. The plurality of spring functions may be based on a counteracting between the attractive forces and the repulsive forces. The spring functions may provide an improved calculation of the force-directed layout of the circuit graph, e.g. based on a parallelizable calculation of the force-directed layout of the circuit graph.

For example, a repulsive force of a block of the plurality of blocks may increase with a number of connections of the block of the plurality of blocks. This may enable an improved emergence of clusters within the force-directed layout of the circuit graph and may improve a routability between the placed logic blocks.

For example, the determining of the placement of the plurality of logic blocks may comprise partitioning the placement of the plurality of logic blocks into a plurality of partitions. For example, the determining of the placement of the plurality of logic blocks may comprise determining a refinement of the placement of the plurality of logic blocks onto the plurality of available logic cells based on a local refinement of partitions of the plurality of partitions based on an optimization criterion. For example, performing local refinements on the partitions may further improve a placement while maintaining a reduced computational effort.

For example, the determining of the force-directed layout of the circuit graph may further comprise rotating an intermediate force-directed layout of the circuit graph. The rotating of the intermediate force-directed layout of the circuit graph may be based on an evaluation of predicted routing distances for a plurality of rotation angles. A rotation of an intermediate force-directed layout of the circuit graph may achieve an arrangement of logic blocks with improved properties, e.g. based on a routing between blocks.

For example, the determining of the force-directed layout of the circuit graph may comprise at least determining a first force-directed layout of the circuit graph and determining a second force-directed layout of the circuit graph to obtain the force-directed layout of the circuit graph. The attractive forces used for the second force-directed layout of the circuit graph may be based on a criticality of paths or connections or on slack defined by the plurality of logic blocks and (influenced) by the length of the edges of the first force-directed layout of the circuit graph. This may improve the placement of the blocks by taking into account a criticality of paths obtained from timing analyses of previous placements.

For example, the determining of the placement of the plurality of logic blocks onto the plurality of available logic cells may comprise splitting the plurality of logic blocks into a plurality of slices based on a first direction based on the force-directed layout of the circuit graph. For example, the determining of the placement of the plurality of logic blocks onto the plurality of available logic cells may comprise distributing logic blocks of a slice of the plurality of slices based on a second direction based on the force-directed layout of the circuit graph. Placing the plurality of blocks into slices may enable a structure-preserving placement of at least the logic blocks.

For example, the plurality of blocks may further comprise a plurality of input/output blocks. The method may further comprise determining a placement of the plurality of input/output blocks onto a plurality of available input/output cells. The determining of the placement of the plurality of input/output blocks may be based on the force-directed layout of the circuit graph and based on the placement of the plurality of logic blocks. Determining the placement of the I/O blocks based on the placement of the plurality of logic blocks may enable an improved distribution of the I/O blocks, and may enable determining a placement of blocks for the reconfigurable logic device without requiring a pre-determined or fixed assignment or arrangement of the I/O blocks.

Alternatively, the determining of the placement of the plurality of input/output (and logic) blocks may be based on a pre-determined placement of the plurality of input/output blocks. The determining of the force-directed layout of the circuit graph may be further based on the pre-determined placement of the plurality of input/output blocks. Using the pre-determined placement may enable a usage of the placement in designs with a fixed fan-out, e.g. to a printed circuit board (PCB).

For example, the method may further comprise determining a further force-directed layout of the circuit graph based on the placement of the plurality of input/output blocks and based on the attractive forces indicated by the plurality of connections between the plurality of cells. The method may further comprise determining a refinement of the placement of the plurality of logic blocks onto the plurality of available logic cells based on the further force-directed layout of the circuit graph, which may further improve the placement of the logic blocks.

For example, the force-directed layout of the circuit graph may be based on a first distance metric and the further force-directed layout of the circuit graph may be based on a second distance metric being different from the first distance metric. Using different distance metrics may further improve the placement of the logic blocks, e.g. a transmission-induced delay of critical paths.

For example, the determining of the placement of the plurality of input/output blocks may be based on a barycenter of logic blocks of the placement of the plurality of logic blocks connected to the plurality of input/output blocks, which may improve a length of routes of a routing and may reduce route crossing.

For example, the method may further comprise determining a routing of the plurality of connections between the plurality of blocks based on the placement of the plurality of logic blocks and based on the placement of the plurality of input/output-blocks. For example, the determining of the routing of the plurality of connections may be based on a preferred routing of at least one critical path of the at least one circuit. For example, the determining of the routing of the plurality of connections may be based on a predicted signal slack based on a criticality of paths of the at least one circuit. Determining the routing based on at least one critical path, based on a criticality of paths and/or based on an amount of slack may improve a routability while improving a routing of timing-critical paths.

For example, the plurality of blocks may further comprise a plurality of memory blocks. For example, the method may further comprise determining a placement of the plurality of memory blocks onto a plurality of available memory cells based on the force-directed layout of the circuit graph and based on the placement of the plurality of logic blocks. For example, the plurality of blocks may further comprise a plurality of special function blocks. The method may further comprise determining a placement of the plurality of special function blocks onto a plurality of available special function cells based on the force-directed layout of the circuit graph and based on the placement of the plurality of logic blocks. Placing the memory blocks and/or the special function blocks after the placement of the plurality of logic blocks may further reduce an overall wirelength of a routing of connections between the plurality of blocks.

For example, the utilization of wire segments connecting the plurality of available logic cells may be estimated by a shortest path routing of all connections without considering actual resource restrictions. The resulting overuse of wire segments between the plurality of available logic cells may provide an estimate of the routability of a placement of the available logic cells providing an evaluated measure of the exploitation of routing resources on the architecture.

For example, the method may further comprise determining a simulated shortest-path routing without capacity constraints on a routing architecture of the reconfigurable logic device to estimate a routability of a placement. At least one of the determining of the placement of the plurality of logic blocks, determining a placement of a plurality of input/input blocks, determining a placement of a plurality of memory blocks and determining a placement of a plurality of special function blocks may be further based on the estimated routability of the placement. By adjusting the placement to the estimated routability, a placement with an improved routability may be determined, e.g. using measurements from a "FieldPlacer congestion-driven maze router" introduced below. Routability may be further improved by adjusting the repulsive forces when determining the force-directed graph layout.

For example, the plurality of available logic cells may be arranged in a three-dimensional grid. The force-directed layout of the circuit graph may correspond to a three-dimensional force-directed layout of the circuit graph based on attractive and repulsive forces. Applying the method to a three-dimensional graph may enable a three-dimensional placement of the plurality of blocks with an improved wirelength.

Embodiments further provide a computer program having a program code for performing the methods according to one of the previous claims, when the computer program is executed on a computer, a processor, or a programmable hardware component.

Embodiments further provide a diamond-shaped reconfigurable logic device. Embodiments further provide a reconfigurable logic device having diagonal routing paths.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
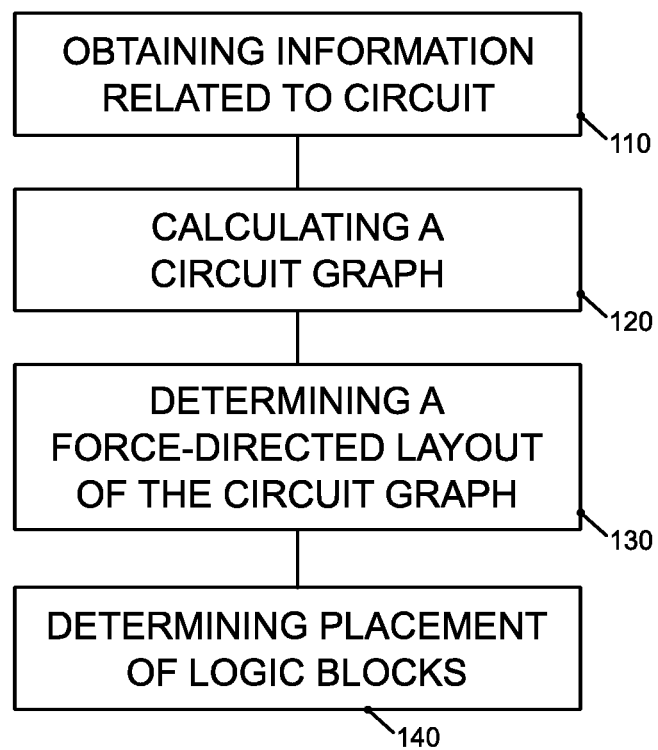
FIG. 1 illustrates a flow chart of an embodiment of a method for determining a placement of at least one circuit for a reconfigurable logic device.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 Elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

FPGAs (Field-Programmable Gate Arrays) are reconfigurable processors (reconfigurable logic devices) that become increasingly important in many hardware areas due to their energy efficiency and high performance. Field-Programmable Gate Arrays (FPGA) are integrated circuits of which the logic circuit may be programmed. Unlike a program for conventional computer hardware, a description language may describe the connectivity of single universal blocks (e.g. Configurable Logic Blocks, CLBs) and special blocks. Therefore, it is also referred to as a configuration. Unlike other programmable circuits, e.g., ASICs—Application Specific Integrated Circuits—FPGAs may allow to change this configuration during the operation. In FPGAs, the configurations may be provided in SRAM (Static Random Access Memory). In recent years, their versatility and dissemination has increased strongly due to new programing frameworks and beginner-friendly, inexpensive developer hardware.

While, until a few years ago, it was possible to program these processors in a dedicated hardware description language, e.g., VHDL (Very high speed integrated circuit Hardware Description Language) (with the exception of a few research projects), there are approaches to make FPGAs as calculation accelerators accessible to the programming with OpenCL (Open Computation Language)—or even with native C-Code.

FPGAs may be used where fast signal processing is required, e.g., for digital signal processing as part of digital filters or for a fast Fourier transform, and yet a quick reconfiguration of the hardware may be used, e.g., implement safety-relevant updates. Protocol implementations, such as parts of the Ethernet MAC (Media Access Control) layer, coding of digital video signals, data encryption and error correction methods are usual fields of application. Thus, FPGAs may be the architecture of choice in areas marked by a high rate of advancement with simultaneous implementation in quick and application-specific hardware. While, in case of an innovation, classical ASICs may be replaced as hardware, the chip may simply be reconfigured by a software update when using FPGAs. Thus, FPGAs may combine quick development of a product and subsequent simple and inexpensive maintenance. Furthermore, FPGAs may often be used as a development platform for ASICs entering production at a later date. In such a development, the compiling procedure may be performed frequently. At this point, an acceleration of the time-consuming compiling procedure may be important.

The compiling procedure for a reconfigurable processor may differ from the procedure of a standard processor as the program for an FPGA may be executed in hardware instead of a binary code that is executed by a processor at the run-time. For this purpose, various configurable basic units may be available on an FPGA board that each receive a specific processing order by the compiling procedure and are interconnected. Within this compiling procedure, the program code may be partitioned into code parts that may be implemented in the basic units available. Subsequently, the units on the board may be associated with the suitable hardware elements. These may then be connected to one another. This procedure of placing and networking is called "place and route". An important goal within this procedure is to reduce the overall wirelength. In this respect, the number of lines available may be limited. However, various other objective functions are also possible, e.g., a placement which enables quick/easy wiring.

Various projects may demonstrate that FPGAs are even suitable as high-performance parallel calculators for special areas of application (in the project for code-breaking of the Data Encryption Standard DES). Some companies may offer FPGA-based parallel calculator systems which are specifically suitable for tasks relating to voice recognition (e.g., for call centers) and in bioinformatics (genome assembly) and may be widely employed in these areas.

At present, FPGAs in so-called integrated "system on chip" systems (SoC), e.g., together with an ARM (Advanced Reduced instruction set computing Machine) processor, may be particularly common. To develop operational configurations, tools may be required that map the description of the circuit onto components of a given FPGA (placement) and determine the connectivity of the various components (routing). In both procedures, optimization algorithms may be employed to, on the one hand, take up as little space as possible and to reduce the maximum path length of a connection (as the length and the number of clocks needed to provide the result may be directly linked).

Hardware manufacturers of FPGAs may supply proprietary development tools for their hardware as well. It is only rarely disclosed as to which algorithms are used here, particularly in placing and in routing. The same also applies to third-party providers, such as Mentor Graphics and Altium. Altera at least offers the possibility to use one's own algorithms for placing and routing via an API.

Furthermore, the "Versatile Place-and-Route" (VPR) Framework of the University of Toronto offers an open-source compiling environment. Here, a configuration may initially be tested in an FPGA simulator. The architecture of the target FPGA may be described in VPR to subsequently compile for the same. The tool may be suited to perform research and development for FPGA models that are not available on the market, amongst others. However, models may be available for few common FPGA architectures so that using proprietary tools for application projects might not be ignored with few exceptions.

The creation of relatively simple configuration alone is very time-consuming and may depend on several factors. Periods of a few minutes to hours may be assumed here, whereby most of the time may be spent in the placement and the routing phase. To exactly solve the placing problem alone may be NP-hard (attributable to the Quadratic Assignment Problem, QAP). Heuristic methods may be used instead.

Other placers may be based on initially distributing elements on the board in a random but permitted manner and performing a simulated annealing approach, which iteratively interchanges elements of the same basic type and may thus attempt to reduce the wiring length. Even though this may trivially embed the elements in the grid, it may be generally very slow and the result may (only) illustrate a local optimum.

When determining a placement of logic blocks based on a force-based approach, independent of the adjacent structure of a matrix used for determining a solution, such a system may always have a trivial solution without any further restrictions, i.e., that all elements lie in the same point. Such an arrangement may reduce the edge length to zero, but may not be the desired result. To find a "reasonable" solution to the problem, the external I/O nodes may be fixed. Assuming that each logic unit is directly or indirectly connected to at least one of the I/O nodes fixed in this way (as a logic unit would otherwise not contribute to useful solutions outside the chip), a (unique) solution of this system may be calculated using fixed I/O nodes. However, in this context, the specific fixings of the I/O nodes on defined coordinates may have significant influence on the solution. In a case where the arrangement of the I/O nodes would virtually be freely selected (e.g., in the prototype-development of a chip), comprising the I/O nodes in improving the results may further improve an overall wirelength and may facilitate the routing. Other, numerical approaches may be unable to do this per se due to these methodological restrictions.

Based on a continuous numerical solution of the problem, the logic units may be assigned to corresponding slots on the target architecture. For FPGAs, this problem may be solved using recursive partitioning strategies and may comprise overlapping of chip elements while allowing for a wiring of the elements. Other approaches may attempt to improve the overall system with regard to the overall wiring length. This might not be necessarily meaningful as often other goals (too) may be pursued. Other force-based approaches may deal exclusively with homogenous FPGA architectures. The time to solve the occurring equation systems may be comparatively short, particularly for sparse graphs; the denser the graph is, the more obvious the solution may increase e.g. based on a complexity of $O(n^3)$.

At least some embodiments may be based on distributing the elements based on a force-based model in which node centers repel each other while connected nodes attract each other. Within this model, a minimal energy state of the overall system may be pursued.

Such a model and the energy minimization may be used, e.g., with regard to large graphs, as it causes "balanced" arrangements and the method may permit a large degree of parallelism for an efficient execution. The method may also reduce an overall edge length. The routing, which may take place in the next step, may tend to be favorably influenced by such a distribution. The method may be directly applied to three-dimensional graphs and thus to future FPGAs with a three-dimensional block arrangement.

Embodiments may allow for shorter compiling periods with good results compared to established methods. Thus, development times of programs and/or circuits on FPGAs may be reduced. At least some embodiments may provide at least some differences to available approaches: For example, a method according to at least some embodiments may improve the system globally including the I/O blocks. For example, a method according to at least some embodiments may comprise a direct and quick placement strategy which may use existing distances/arrangements in the force-based solution to achieve a good balance between short edge length and "wiring friendliness". At least some examples may optimize the overall system as, apart from the attractive forces between connected blocks, repulsive forces between (all) node pairs may also be simulated. Thus, the system might not "collapse" and distances between nodes may be maintained, which, particularly for strongly connected regions, may result in a more consistent structure than if using numerical approaches without repulsive forces.

It may be shown that this methodology, together with the presented embedding strategy, may provide an improved balance between the two objectives of short edge length and "wiring friendliness" (routability).

FIG. 1 illustrates a flow chart of a method for determining a placement of at least one circuit for a reconfigurable logic device. For example, the reconfigurable logic device may correspond to a Field-Programmable Gate Array or to a Programmable Logic Device (PLD). For example, the reconfigurable logic device may comprise a (two-dimensional or three-dimensional) grid of available cells. For example, a cell of the grid of available cells may comprise one of a logic cell, an input/output cell, a memory cell and a special function cell (e.g. a multiplier or a digital signal processor). For example, the grid of available cells may comprise rows and columns. For example, a column of the grid may comprise the same type of available cells, e.g. logic cells, memory cells or special function cells. For example, available input/output cells may be arranged in banks. The banks of available input/output cells may be arranged in rows and/or columns at a perimeter of the gird (perimeter I/O) or as rows or columns within the gird.

For example, a circuit (of the at least one circuit) may comprise logic blocks and at least one of input/output blocks, memory blocks and special function blocks interconnected by a plurality of connections as connected component. For example, the at least one circuit may correspond to at least one connected component.

The method comprises obtaining 110 information related to the at least one circuit. The at least one circuit comprises a plurality of blocks and a plurality of connections between the plurality of blocks. The plurality of blocks comprise a plurality of logic blocks.

For example, the information related to the at least one circuit may comprise source code formulated in a hardware description language, e.g. Verilog or VHDL, or a netlist of the at least one circuit. For example, the obtaining 110 of the information related to the at least one circuit may read in at least one file comprising the information related to the at least one circuit, or receive the information related to the at least one circuit via a (programming) interface. For example, the plurality of blocks may correspond to a plurality of instances of a netlist, or to a plurality of instances of various modules in a hardware description language. For example, the plurality of connections may be based on a plurality of nets of the netlist or based on input/outputs in the source code of the hardware description language. For example, the plurality of logic blocks may correspond to logic gates or accumulations of logic gates to be represented by a plurality of available logic cells of the reconfigurable logic. For example, a logic block of the plurality of logic blocks may be represented by a look-up table. For example, the information related to the at least one circuit may comprise information related to output values related to corresponding input values for a plurality of logic cells. For example, at least one logic block of the plurality of logic blocks may be mapped to one look-up table. The plurality blocks may further comprise at least one of a plurality of input/output blocks, a plurality of memory blocks and a plurality of special function blocks.

The method further comprises calculating 120 a circuit graph based on the information related to the at least one circuit. The circuit graph comprises a plurality of nodes and a plurality of edges. The plurality of nodes represent at least a subset of the plurality of blocks of the at least one circuit. The plurality of edges represent at least a subset of the plurality of connections between the plurality of blocks of the at least one circuit.

For example, the calculating 120 of the circuit graph may use at least a subset of the plurality of blocks (e.g. the plurality of logic blocks, or the plurality of logic blocks and other blocks, e.g. the plurality of input/output blocks) as nodes and at least a subset of the plurality of connections (e.g. connections between logic blocks of the plurality of logic blocks and/or between logic blocks of the plurality of logic blocks and input/output blocks of the plurality of input/output blocks). For example, the calculating 120 of the circuit graph may combine multiple connections between blocks of the plurality of blocks into single connections between plurality of blocks, e.g. with shared/combined properties (e.g. regarding criticality/slack). For example, the calculating 120 of the circuit graph may provide information related to the circuit graph in a computer-readable format, e.g. in a file format for export to a graph-drawing application.

The method further comprises determining 130 a force-directed layout of the circuit graph. The force-directed layout is based on attractive forces based on the plurality of connections between the plurality of blocks and based on repulsive forces between the plurality of blocks.

For example, connections of the plurality of connections may induce attractive forces between the plurality of blocks and at least a subset of the plurality of blocks (e.g. the plurality of logic blocks, or the plurality of logic blocks and the plurality of input/output blocks) may comprise repulsive forces. For example, the repulsive forces exhibited by a block of the plurality of blocks may act against other blocks of the plurality of blocks. For example, the determining 130 of the force-directed layout of the circuit graph may be based on determining an energy-minimal state of a plurality of spring functions between the plurality of nodes. The plurality of spring functions may be based on a counteracting between the attractive forces and the repulsive forces. For example, a block of the plurality of blocks may be attracted to other blocks of the plurality of blocks by the attractive forces induced by connections to the other blocks of the plurality of blocks, and may be repulsed from at least a subset of other blocks of the plurality of blocks by the repulsive forces. For example, the determining 130 of the force-directed layout of the circuit graph may be based on repulsive forces of blocks in a vicinity of a block (e.g. within a pre-defined distance of the block). Additionally or alternatively, the determining 130 of the force-directed layout of the circuit graph may be based on repulsive forces accumulated for subsets (e.g. clusters) of blocks of the plurality of blocks. The repulsive forces for a subset of blocks may be accumulated at a barycenter of the blocks of the subset of blocks. For example, when determining spring functions between a block and blocks not within a vicinity of a block, an accumulated repulsive force of a subset of blocks at a barycenter of the subset of blocks may be used instead of block-to-block repulsive forces. For example, to achieve a further distance between clusters of blocks, a repulsive force of a block of the plurality of blocks may increase with a number of connections of the block of the plurality of blocks.

For example, the determining 130 of the force-directed layout may be based on a Manhattan-distance between nodes of the plurality of nodes. Alternatively or additionally, the determining of at least an intermediate force-directed layout for the force-directed layout may be based on one of an Euclidian distance and a Chebyshev distance between nodes of the plurality of nodes.

Reducing a sum of squares of distances may be evident from an "Euclidean" perspective on distances and may have the advantage that various numerical methods are known to solve the resulting system with quadratic objective function. The edge length on an FPGA may be calculated based on the Manhattan distance. The reason for this may be the orthogonal "grid architecture" of the wiring elements. However, the function of the Manhattan distance might not be differentiable; thus a direct application in the numerical solvers may not be possible.

For example, the determining 130 of the force-directed layout of the circuit graph may comprise at least determining a first force-directed layout of the circuit graph and determining a second force-directed layout of the circuit graph to obtain the force-directed layout of the circuit graph. The attractive forces used for the second force-directed layout of the circuit graph may be based on the criticality of paths defined by the plurality of logic blocks and by a timing analysis of the embedded first force-directed layout of the circuit graph. For example, a path may comprise at least two blocks of the plurality of blocks and at least one connection between the at least two blocks. A criticality of the path may be based on a length of edges of the first force-directed layout corresponding to the at least one connection and a processing time of the at least two blocks. The length of an edge of the first force-directed layout may indicate (and influence) an approximate signal propagation delay incurred by a signal traversing the edge of the first force-directed layout.

For example, at least the plurality of available logic cells (e.g. and the plurality of input/output cells) may be arranged in a three-dimensional grid. The force-directed layout of the circuit graph may correspond to a three-dimensional force-directed layout of the circuit graph.

Figure 1A:
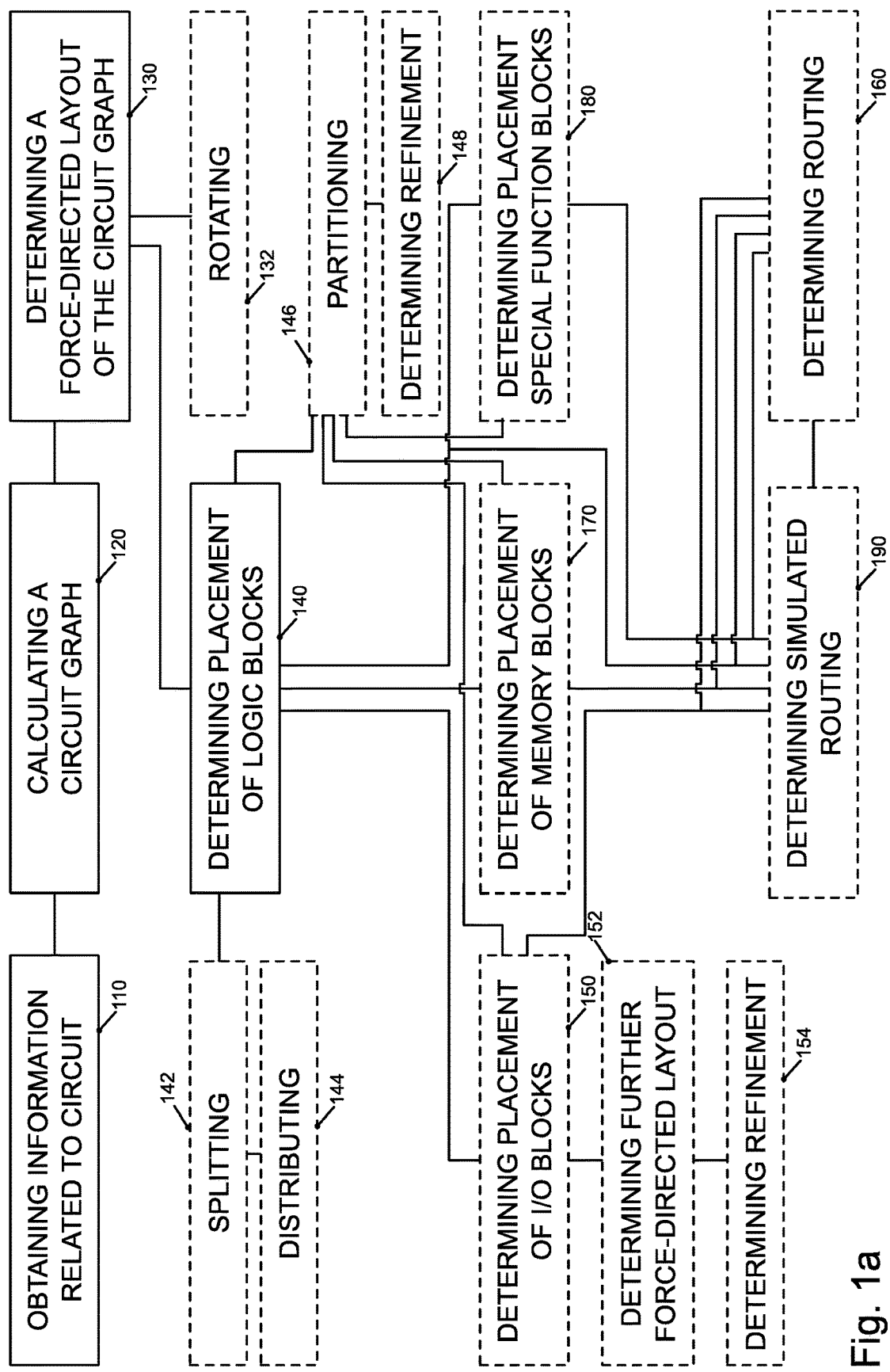
FIG. 1a illustrates a flow chart of an embodiment of a method for determining a placement of at least one circuit for a reconfigurable logic device.

For example, the determining 130 of the force-directed layout of the circuit graph may further comprise rotating 132 (e.g. as shown in FIG. 1a ) an intermediate force-directed layout of the circuit graph. For example, when using a Manhattan distance norm, the rotating 132 may rotate the intermediate force-directed layout by 45°. For example, the rotating 132 of the intermediate force-directed layout of the circuit graph may be based on an evaluation of predicted routing distances for a plurality of rotation angles. For example, for an Euclidian distance metric, the rotating 132 may rotate the intermediate force-directed layout in multiple (e.g. 10) steps from 0° to 90° to evaluate the best rotation angle.

The method further comprises determining 140 a placement of the plurality of logic blocks onto a plurality of available logic cells of the reconfigurable logic device based on the force-directed layout of the circuit graph.

For example, the determining 140 of the (first) placement of the plurality of logic blocks may be based on an arrangement of nodes of the plurality of nodes defined by the force-directed layout of the circuit graph. For example, the determining 140 of the placement of the plurality of logic blocks may be based on a structure-preserving placement of the plurality of nodes defined by the force-directed layout of the circuit graph. For example, the structure-preserving placement of the plurality of logic blocks may preserve an order in a first direction (e.g. horizontal direction) and/or a second direction (e.g. vertical direction) of logic blocks between the force-directed layout of the circuit graph and the placement of the plurality of logic blocks. For example, the determining of the placement of the plurality of logic blocks may arrange nodes of the plurality of nodes into two or more clusters of nodes and free space between the two or more clusters of nodes.

For example, the determining 140 of the placement of the plurality of logic blocks may be based on an arrangement of nodes (corresponding to logic blocks) of the plurality of nodes defined by the force-directed layout of the circuit graph. For example, an (initial) arrangement of logic blocks after the determining 140 of the placement of the plurality of logic blocks may preserve/project a horizontal and/or vertical order of nodes of the plurality of nodes to a horizontal and/or vertical order of placed logic blocks of the plurality of logic blocks.

For example, in an exemplary implementation, the determining 140 of the placement of the plurality of logic blocks onto the plurality of available logic cells may comprise splitting 142 the plurality of logic blocks into a plurality of slices based on a first (e.g. vertical or horizontal) direction based on the force-directed layout of the circuit graph. For example, the plurality of slices based on the first direction may correspond to a plurality of subsequent ranges of coordinates of the first direction, e.g. y-coordinates ranging from 0 . . . 2, 2.01 . . . 4, 4.01 . . . 6 etc. For example, nodes of the plurality of nodes fitting a range of the plurality of subsequent ranges may be assigned to a corresponding slice of the plurality of slices. For example, the plurality of available logic cells may be arranged in a (two-dimensional) grid in the first direction and a second (e.g. horizontal or vertical) direction. For example, the plurality of slices based on the first direction may be clustered around a center of the first direction of the grid of the plurality of available logic cells. Alternatively, the plurality of slices based on the first direction may be arranged in the first direction of the grid according to respective distances of the nodes in a first direction of the force-directed layout of the circuit graph. Alternatively, the plurality of slices based on the first direction may be arranged equidistantly across the first direction of the grid. The determining 140 of the placement of the plurality of logic blocks may further comprise distributing 144 logic blocks of a slice of the plurality of slices based on a second direction based on the force-directed layout of the circuit graph. For example, logic blocks of a slice of the plurality of slices may comprise the same coordinates in the first direction. For example, the logic blocks of a slice of the plurality of slices may be arranged in the second direction of the grid according to respective distances of the nodes in a second direction of the force-directed layout of the circuit graph. Alternatively, the logic blocks of a slice of the plurality of slices may be clustered around a center of the second direction of the grid of the plurality of available logic cells. Alternatively, the logic blocks of a slice of the plurality of slices may be arranged equidistantly across the second direction of the grid.

For example, the determining 140 of the placement of the plurality of logic blocks may further comprise partitioning 146 the placement of the plurality of logic blocks (e.g. and a placement of a plurality of input/output blocks, a placement of a plurality of memory blocks and/or a placement of a plurality of special function blocks) into a plurality of partitions. For example, the partitioning 146 may partition the plurality of logic blocks recursively. For example, a partition may comprise further (sub-) partitions. For example, the partitioning 146 may partition the plurality of logic blocks into partitions comprising a maximal amount of logic blocks, e.g. 2 or 3 logic blocks. For example, the partitioning 146 may correspond to a framing of differently-sized partitions of the placement of the plurality of logic blocks. For example, to locally refine a placement of logic blocks, a partition used for the local refinement may be incrementally shrunk. The determining 140 of the placement of the plurality of logic blocks may further comprise determining 148 a refinement of the placement of the plurality of logic blocks onto the plurality of available logic cells based on a local refinement of partitions of the plurality of partitions based on an optimization criterion. For example, the determining 148 of the refinement of the placement may be based on at least one of a bounding box cost function, a (total/average) wirelength, a critical path delay or an overuse (as optimization criterion). For example, the determining 148 of the refinement of the placement may comprise a simulated annealing of at least subsets of the plurality of logic blocks with an initial system temperature of 0.

For example, the plurality of blocks may further comprise a plurality of input/output blocks. For example, an input/output block may comprise input capabilities, output capabilities or input/output capabilities. The method (e.g. as shown in FIG. 1a) may further comprise determining 150 a placement of the plurality of input/output blocks onto a plurality of available input/output cells. For example, the plurality of available input/output cells may be arranged in (four) perimeter input/output banks, column-based input/output banks or an input/output grid. The determining 150 of the placement of the plurality of input/output blocks may be based on the force-directed layout of the circuit graph and based on the placement of the plurality of logic blocks. For example, the determining 150 of the placement of the plurality of input/output blocks may be based on a barycenter of logic blocks after placement of the plurality of logic blocks connected to the plurality of input/output blocks. For example, the determining 150 may place the plurality of input/output blocks in a vicinity of the barycenter of the placed logic blocks connected to the plurality of input/output blocks. For example, the placement 150 of the plurality of input/output blocks may be based on a reduction of predicted (total/average/maximal) wirelength of connections between the plurality of input/output blocks and the plurality of logic blocks (after a (first) placement of the plurality of logic blocks), e.g. based on a criticality of the connections between the plurality of input/output blocks and the plurality of logic blocks. For example, the determining 150 of the placement of the plurality of input/output blocks may comprise a pairwise exchange of placed input/output blocks, e.g. based on a reduction of predicted (total/average/maximal) wirelength of connections between the plurality of input/output blocks and the plurality of logic blocks. For example, if the plurality of available input/output cells is arranged in (four) perimeter input/output banks, the determining 150 of the placement of the plurality of input/output blocks may comprise moving of placed input/output blocks from an input/output bank to an adjacent perimeter input/output bank.

Alternatively, the determining 150 of the placement of the plurality of input/output blocks may be based on a pre-determined placement of the plurality of input/output blocks. The determining 130 of the force-directed layout of the circuit graph may be further based on the pre-determined placement of the plurality of input/output blocks. For example, nodes corresponding to at least a subset of the plurality of input/output blocks may be fixed to pre-determined locations during the determining 130 of the force-directed layout of the circuit graph, and nodes corresponding to the plurality of logic blocks (and nodes corresponding to other input/output blocks of the plurality of input/output blocks) may be determined in relation/based on the fixed locations of the at least subset of the plurality of input/output blocks.

For example, the method may, as further shown in FIG. 1a, comprise determining 152 a further force-directed layout of the circuit graph based on the placement of the plurality of input/output blocks and based on the attractive forces indicated by the plurality of connections between the plurality of cells. For example, the further force-directed layout may use fixed locations for nodes corresponding to the plurlity of input/output blocks and may determine the positions of nodes corresponding to the plurality of logic blocks in relation to/based on the position of the nodes corresponding to the plurality of input/output blocks. The method may further comprise determining 154 a refinement of the placement of the plurality of logic blocks onto the plurality of available logic cells based on the further force-directed layout of the circuit graph. For example, the determining 154 of the refinement may be implemented similar to the determining 140 of the placement of the plurality of logic blocks, based on the further force-directed layout of the circuit graph. Alternatively, the determining 154 of the refinement may comprise adjusting the previously determined 140 placement of the plurality of logic blocks by moving of blocks towards a position of corresponding nodes indicated by the further force-directed layout of the circuit graph. For example, the force-directed layout of the circuit graph may be based on a first distance metric and the further force-directed layout of the circuit graph may be based on a second distance metric being different from the first distance metric. For example, the first distance metric and/or the second distance metric may be one of an Euclidian distance metric, a Manhattan distance metric and a Chebyshev distance metric.

For example, the plurality of blocks may further comprise a plurality of memory blocks. The method may, as further shown in FIG. 1a, further comprise determining 170 a placement of the plurality of memory blocks onto a plurality of available memory cells based on the force-directed layout of the circuit graph and based on the placement of the plurality of logic blocks. For example, the plurality of available memory cells may be arranged in columns of a cell grid of the reconfigurable logic device. For example, the determining 170 of the placement of the memory blocks may be performed after the determining 140 of the placement of the logic blocks and after the determining 150 of the placement of the input/output cells. For example, the determining 170 of the placement of the plurality of memory blocks may determine a placement of a memory block of the plurality of memory blocks onto an available memory block of the plurality of available memory blocks in a vicinity (e.g. nearest) of the barycenter of (logic) blocks connected to the memory block. For example, the determining 170 of the placement of the plurality of memory blocks may place the memory blocks in the order specified by their number of connections to other blocks (logic or in-/output), e.g. starting with the memory block of the plurality of memory blocks having the largest number of connections of memory blocks of the plurality of memory blocks. For example, the determining 170 of the placement of the plurality of memory blocks may be implemented similar to the determining 150 of the placement of the plurality of input/output blocks.

For example, the plurality of blocks may further comprise a plurality of special function blocks. The method may, as further shown in FIG. 1a, further comprise determining 180 a placement of the plurality of special function blocks onto a plurality of available special function cells based on the force-directed layout of the circuit graph and based on the placement of the plurality of logic blocks. For example, the plurality of available special function cells may be arranged in columns of a cell grid of the reconfigurable logic device. For example, the determining 180 of the placement of the memory blocks may be performed after the determining 140 of the placement of the logic blocks and after the determining 150 of the placement of the input/output cells. For example, the determining 180 of the placement of the plurality of special function blocks may determine a placement of a special function block of the plurality of special function blocks onto an available special function block of the plurality of available special function blocks in a vicinity (e.g. nearest) a barycenter of (logic) blocks connected to the special function block. For example, the determining 180 of the placement of the plurality of special function blocks may place the special function blocks in the order specified by their number of connections to other blocks (logic or in-/output), e.g. starting with the special function block of the plurality of special function blocks having the largest number of connections of special function blocks of the plurality of special function blocks. For example, the determining 180 of the placement of the plurality of special function blocks may be implemented similar to the determining 150 of the placement of the plurality of input/output blocks.

For example, the determining 150, 170 and/or 180 of the placement of the plurality of input/output, memory and/or special function blocks may further comprise partitioning the placement of the plurality of input/output, memory and/or special function blocks into a plurality of partitions (e.g. in conjunction with the partitioning 146 of the plurality of logic blocks). For example, the partitioning may partition the plurality of input/output, memory and/or special function blocks recursively. For example, a partition may comprise further (sub-)partitions. For example, the partitioning of the input/output, memory and/or special function blocks may partition the plurality of input/output, memory and/or special function blocks into partitions comprising a maximal amount of logic blocks, input/output, memory and/or special function blocks, e.g. 2 or 3 logic, input/output, memory and/or special function blocks. For example, the partitioning of the input/output, memory and/or special function blocks may correspond to a framing of differently-sized partitions of the placement of the plurality of input/output, memory and/or special function blocks. For example, to locally refine a placement of s input/output, memory and/or special function blocks, a partition used for the local refinement may be incrementally shrunk. The determining 150, 170 and/or 180 of the placement of the plurality of input/output, memory and/or special function blocks may further comprise determining a refinement of the placement of the plurality of input/output, memory and/or special function blocks onto the plurality of available in-put/output, memory and/or special function cells based on a local refinement of partitions of the plurality of partitions based on an optimization criterion. For example, the determining of the refinement of the placement of the plurality of input/output, memory and/or special function blocks may be based on at least one of a bounding box cost function, a (total/average) wirelength, a critical path delay or an overuse (as optimization criterion). For example, the determining of the refinement of the placement of the plurality of input/output, memory and/or special function blocks may comprise a simulated annealing of at least subsets of the plurality of input/output, memory and/or special function blocks with an initial system temperature of 0.

For example, the method may, as further shown in FIG. 1a, further comprise determining 160 a routing of the plurality of connections between the plurality of blocks based on the placement of the plurality of logic blocks (e.g. of any type) and based on the placement of the plurality of input/output-blocks. For example, the determining 160 of the routing may be based on a connection grid comprising a plurality of horizontal and vertical segments connecting the plurality of logic blocks (and at least one of the plurality of input/output blocks, the plurality of memory blocks and the plurality of special function blocks). For example, the plurality of horizontal and vertical segments may each have a capacity of a pre-determined number of connections. For example, the determining 160 of the routing may be based on a shortest path routing over the connection grid. For example, the determining 160 of an idealized/simulated routing of the plurality of connections may be taken to measure the overuse of routing resources on the grid. For example, the determining 160 of the routing of the plurality of connections may be used to rate the degree of usage of regions for the routing based on the actual placement of the plurality of logic blocks of any type. For example, the determining 160 of the routing of the plurality of connections may be based on a preferred routing of paths through preferably less used regions. For example, connections comprised in the at least one critical path may be routed based on the shortest path routing, and connections not comprised in the at least one critical path may be routed based on the shortest path routing or based on alternate routes, e.g. based on a used capacity of the plurality of horizontal and vertical segments. For example, the determining of the routing of the plurality of connections may be based on a predicted signal slack based on at least one critical path of the at least one circuit. For example, connections having a lower predicated signal slack may be routed based on the shortest path routing, and connections having a higher predicted signal slack may be routed based on the shortest path routing or based on alternate routes, e.g. based on a used capacity of the plurality of horizontal and vertical segments.

For example, the method may further comprise determining 190 a simulated shortest-path routing without capacity constraints on a routing architecture of the reconfigurable logic device to estimate a routability of a placement. The determining 190 of the simulated shortest-path routing may be implemented similar to the determining 160 of the routing, albeit, for example, without capacity constraints (on the horizontal and vertical segments). The determining 190 of the simulated shortest-path routing may be based Field-Placer congestion-driven maze router. For example, at least one of the determining 140 of the placement of the plurality of logic blocks, the determining 150 of the placement of the plurality of input/input blocks, the determining 170 of the placement of the plurality of memory blocks and the determining 180 of the placement of the plurality of special function blocks is further based on the estimated routability of the placement. For example, the method may further comprise adjusting at least one of the placement of the plurality of logic blocks, the placement of the plurality of input/output blocks, the placement of the plurality of memory blocks and the placement of the plurality of special function blocks based on the estimated routability of the placement. For example, the at least one of the determining 140 of the placement of the plurality of logic blocks, the determining 150 of the placement of the plurality of input/input blocks, the determining 170 of the placement of the plurality of memory blocks and the determining 180 of the placement of the plurality of special function blocks may be repeated based on the estimated routability of the placement.

At least some examples of the method may directly and without any complex approximation functions, use the Manhattan norm (and other norms as well) as an optimization objective/criterion. Alongside the overall wiring length, at least some examples may also allow for various other and combined objective functions (as optimization criteria). In this context, a norm may be introduced that may quickly assess the "wiring friendliness" based on an idealized wiring approach.

The method according to at least some embodiments may place particularly heterogeneous FPGA designs with various block types up to complex DSPs (Digital Signal Processors) as increasingly used nowadays in FPGAs.

The method according to at least some embodiments may comprise an $O(n \log(n))$ complexity. Embodiments may provide a flexible and free force-directed placement method for heterogeneous reconfigurable processor architectures".

The method of at least some embodiments may be denominated the FieldPlacer method. The FieldPlacer method may place chip elements (e.g. a plurality of blocks) for a heterogeneous FPGA design on a predefined FPGA architecture (e.g. an integer grid with various slot types) based on a force-based graph layout and considering attractive and repulsive forces. While numerical methods may find a solution quickly for sparse graphs, the FieldPlacer approach may exhibit a generally low degree of complexity of $O(n \log(n))$.

The method according to various embodiments may generate (by employing a Spring Embedder simulation instead of numerical solvers and in comparison to many other approaches) a global layout of the overall FPGA Design without fixing elements from the outset. Many different objective functions (short edge length, wiring friendliness, short critical path, small "semi-perimeter bounding box" norm, etc.) may be applied to carry out a targeted optimization of the layout for heterogeneous FPGAs. Furthermore, an equilibrium of forces calculated by the Spring Embedder simulation may be carried out directly using the Manhattan metric that may not be overall differentiable.

Overall, the method according to at least some embodiments may provide intuitive access for subsequent extensions through graph drawing-based approaches. In other methods, (only) the optimized arrangement of the I/O elements could be employed prior to their fixing.

The method according to at least some embodiments may be based on a Spring Embedder, on various types of distance metrics in the Spring Embedder, the imitation of the continuous force-based layout by embedding on the integer grid, and/or, in general the global optimization including all types of logic blocks by a system with attractive and repulsive forces and the solution in an equilibrium of forces.

The method according to at least some embodiments may be used as a placement method in any translation tools for FPGAs, but may also be employed in other reconfigurable processor architectures (PLDs). Furthermore, the method may basically be used as well to create placements for non-reconfigurable chips, e.g., ASICs.

The main idea behind at least some embodiments, e.g. the FieldPlacer method, may be to bring progress that was made in the field of graph drawing within the last decades, in particular in the field of force-directed graph drawing, back to the contemporary field of FPGA placement together with a new assignment methodology and additional studies. The presented method in this work may pursue several goals. In the following, an exemplary embodiment of the method, FieldPlacer, is shown. In the following, the terms minimize and maximize are used to express an improvement above a previously existing solution to a problem, and are not meant as absolutes, e.g. minimizing or maximizing a value or set of values corresponds to improving a value (e.g. using heuristics), the solution found, however, might not be the absolute best solution, but one that is sufficiently good.

The problem of chip placement (or floorplanning) with equally dimensioned facilities and a priori defined locations can be formalized by the Quadratic Assignment Problem (QAP) introduced by Beckman and Koopmans in 1957 in the mathematical field of operations research. The QAP is a special case of general floorplanning from the category of 'facility location problems'. It can be formulated as follows:

Definition: (Quadratic Assignment Problem (informal)). Given a set of n facilities F and n respective locations L, along with a definition of distance between two locations and flow (sometimes weight) that has to be transported between every pair of facilities. Find an assignment of the facilities to the locations that minimizes the sum of costs which are in turn the product of distance and flow.

As a basic metaheuristic to solve QAP, a simple local search (LS) method can be implemented. The local search method gets an initial solution as the input and therefore makes it the first solution $s_{cur}$ and accordingly the, so far, best found solution s*. It then generates a full neighborhood of $s_{cur}$ with elements $s_{cur}'$ and looks for the best element in the neighborhood which is successively the new $s_{cur}$ and, if it improves s*, also the new s*. This procedure is repeated until a neighborhood occurs in which no improving neighbor is found. The algorithm then stops and returns s* as the optimal solution. A possible modification would be to choose the first improving $s_{cur}'$ instead of the best one in the full neighborhood. This would generally reduce the search time in the neighborhood. An analogue local search approach for maximization problems is, for example, the 'hill climbing' algorithm. The local search algorithm monotonically iterates to a local optimum Simulated annealing (SA) is a heuristical optimization technique that bases on simulating the behavior of an annealing physical system in the field of statistical mechanics. In fact, the method was initially applied to solve a microprocessor layout (floorplanning) problem by Kirkpatrick et al. and came into operation for many different problems in combinatorial optimization.

To get a tangible impression of the basic idea, one can imagine a metal plate that gets heated and cooled down again. By heating the plate, atomic irregularities in the crystalline structure of the metal are provided with energy to escape the unfavorable situation, consequently strengthening the structure of the material. With decreasing temperature, more and more arrangements become fixed due to the absence of energy, finally reaching a more stable cold state.

Following fundamental ideas from statistical mechanics, the transition probability, estimating the likelihood that a state $s_{cur}$ moves to a neighboring state $s_{cur}'$, can be described through the Boltzmann distribution neglecting the Boltzmann constant by $$\tilde{p}_t(\Delta c) = e^{\frac{\Delta c}{t}}$$

with $$\Delta c = c(S_{cur}) - c(s'_{cur})$$

The thermodynamic temperature is a principle parameter in thermodynamics. It is also called the absolute measure of temperature and is defined by the third law of thermodynamics, declaring the theoretically lowest temperature as null. In this 'absolute zero' circumstance, particles' constituents of matter have minimal motion and cannot become colder.

$\Delta c$ measures the difference of the two states in terms of costs or, more precisely, the absolute improvement of a neighboring solution to the current solution. If such a neighboring solution $s'_{cur}$ is an improvement (solution with lower costs) compared to the best known solution so far ($s_{cur}$), it follows that $\Delta c = c(S_{cur}) - c(s'_{cur}) > 0$. Thus, as the thermodynamic temperature t is positive by definition, the exponent in the equation is positive and $\tilde{p}_t(\Delta c) > 1$, which means that such an improving swap will always be accepted. If $\Delta c < 0$, it follows that $\tilde{p}_t(\Delta c) \in (0,1)$. Now, a threshold $r \in [0,1]$ has to be defined to decide for which probabilities $\tilde{p}_t(\Delta c)$ such a non-improving swap will be accepted. As $\tilde{p}_t$ shall map $\Delta c$ on a probability, $$\tilde{p}_t(\Delta c) = \min\left(e^{\frac{\Delta c}{t}}, 1\right)$$

It is important to note that the transition probability is strictly positive ($\tilde{p}_t(\Delta c) > 0$), called a 'non-zero transition probability', so that any non-improving swap, regardless of its deteriorative intensity and the temperature, can potentially be accepted (the larger the degradation of costs and the colder the system, the less probable).

Simulated annealing starts with a relatively high thermodynamic temperature to, determines a random threshold $r \in [0,1]$ and calculates the transition probability $\tilde{p}_t(\Delta c)$ for a solution in the reduced neighborhood of the initial solution. If $\tilde{p}_t(\Delta c) > r$, the move to $s'_{cur}$ is performed, otherwise not. A special characteristic of a simulated annealing approach therefore is that, besides all improving moves, also non-improving moves are randomly accepted (if the probability of the move exceeds the random parameter r), giving the method a good chance to escape local optima. The warmer the system is, the more non-improving moves are accepted. A new threshold r is randomly computed for each neighborhood.

Force-directed graph layouts are the foundation of the at least some embodiments.

Definitions: A graph $G=(V, E)$ is an undirected graph with nodes (vertices) V and connections (edges) E. It therefore holds true that $(u, v) \in E \Leftrightarrow (v, u) \in E$ for u, v e V. A graph $G=(V, E)$ is called undirected if its edges have no orientation. Thus, the edges (u,v) and (v, u) are identical. This work generally operates on such undirected graphs (unless stated otherwise). A graph $G=(V, E)$ is called simple if at most one edge exists between any pair of nodes in the graph. A graph $G=(V, E)$ with nodes V and edges E is called complete if E contains each possible node-to-node connection in the graph. An undirected complete graph contains exactly $$|E| = \frac{|V| \cdot (|V|-1)}{2} \text{ edges.}$$

A node $v \in V$ is a neighbor of node $u \in V$ ($v \in N(u)$) in the undirected graph $G=(V, E)$ if, and only if, $(u, v) \in E$. The nodes v and u are then called to be adjacent. A node v in a graph $G=(V, E)$ has degree $\delta(v)$ if it has exactly $\delta(v)$ neighbors. A graph $G=(V, E)$ with nodes V and edges E is called connected if there exist no two nodes u, v e V such that G contains no path of edges with u and v as its endpoints. A (not complete) graph has connectivity k if there does not exist a set of (k−1) vertices whose removal disconnects the graph. The graph is then called k-connected or, more precisely, k-vertex-connected. An embedding of a (two-dimensional) graph $G=(V, E)$ is an assignment of the nodes to the plane (with two dimensional coordinates) and of the edges to plane curves. An embedding of G is called planar if no two edges intersect each other. A graph G is called planar if a planar embedding of G exists. The canvas of an embedding of a graph G is the smallest rectangle that contains all nodes of G.

To achieve a situation in which each node is in the barycenter of its neighbors, the x and y coordinates of all nodes may satisfy equations:

$$x(v_i) = \sum_{v_j|(v_i,v_j)\in E} x(v_j)$$

$$y(v_i) = \sum_{v_j|(v_i,v_j)\in E} y(v_j)$$

A basic 'barycentric' idea can be applied to arbitrary graphs with at least 3 fixed nodes by iteratively calculating the attractive forces $F(v_i)$ acting on each free node ($\forall v_i \in V^1$) and moving the node (possibly only 'a bit') in this direction. After all free nodes of the graph have been moved once in that way, the procedure can be repeated again and again until either a fixed number of iterations has been performed or until the system reaches a stable state (formally until the lengths of all force vectors are almost zero).

A system without fixed nodes that minimizes the overall edge-length (or the edge-forces) would result in an assignment of the same position to each point in the graph. Instead of fixing nodes to obtain a counterforce, the edges can be considered to be mechanical helical springs with an ideal length l connecting the nodes with each other. The ideal edge length is the 'zero-energy length' of the spring and thus the length of the spring in its unbent equilibrium state.

The force of such a linear spring can be estimated by Hook's law, which states that the force needed to stretch or compress a spring from its natural relaxed state is linear to the difference $\Delta L$ of the spring's current length (in other words the distance d between spring's endpoints) and its zero-energy length l. If d>1, the spring is in a stretched state and the difference $\Delta L=(d-l)$ is greater than zero, whereas $\Delta L$ becomes smaller than zero if the spring is in a compressed state. This force strength of the spring can further be formalized by introducing a constant $c_a$ depending on the material of the spring.

$$f_a = c_a \cdot \Delta L = c_a \cdot (d-l)$$

Hook's law quantifies the strength of the force acting through the spring by a linear approximation of the 'real' force. Nevertheless, it is obvious that this assumption cannot be true 'far away' from the zero-energy state. On the one hand, any material would break when being stretched too drastically and, on the other, it is not be possible to compress a physical spring to length zero.

Instead of using this linear approximation, Eades proposed that a logarithmic relation, like in equation, behaves better in practice for far distanced pairs of points because the linear approximation is 'too strong' in such situations (see Peter Eades. A Heuristic for Graph Drawing). In the following, $p_u$ denotes the position (localization) of node u.

Let $p_u$ and $p_v$ be two points in the Euclidean space ($\mathbb{R}$) and let l(u, v) be the zero-energy length of the string between the two points. Then, the strength of an attractive force in Eades' model between two connected points can be approximated b:

$$f_a = c_a \cdot \log\left(\frac{d}{l}\right) = c_a \cdot \log\left(\frac{\|p_u - p_v\|_2}{l(u, v)}\right)$$

The zero-energy length is individual for each spring while Eades modeled it as a system-wide constant.

If the distance d of two adjacent points is equal to the zero-energy length l of the respective string, the fraction in the logarithm is one and, therefore, the force strength $f_a$ becomes zero As a result, the spring is in its 'relaxed' state and no force acts to either compress or stretch it.

Besides a model (approximation) for the strength of the force that acts on a node $p_v$, the direction of the force is needed to calculate the consequent force vector. Assume that the force that acts on point $p_v$ through the connection of $p_u$ and $p_v$ is acting in the direction of $(p_u-p_v)$ and that $c_a=1$. Then, the force vector $\vec{F}_{attr}^{(u,v)}$ can be calculated as:

$$\vec{F}_{attr}^{(u,v)} = f_a \cdot (p_u - p_v) = \log\left(\frac{\|p_u - p_v\|_2}{l(u, v)}\right) \cdot (p_u - p_v)$$

If d>1, the spring is in a stretched state and therefore tends to further contract itself to reach the zero-energy state. Thus, the force strength $f_a$ that acts on $p_v$ in the direction of $(p_u-p_v)$ is positive in that case. However, if d<1, the spring is in a compressed state and therefore tends to push its ends further apart to reach the zero-energy state. Thus, the force strength $f_a$ that acts on $p_v$ in the direction of $(p_u-p_v)$ is negative in that case.

As a result, the logarithm of the fraction of d and l qualitatively models the force strengths just like the linear assumption of Hook, but it quantifies it differently. To be more precise, the logarithm is more 'moderate' in quantifying the forces' strengths for far distanced node pairs.

In addition to the attractive forces introduced by the strings between connected nodes, Eades extended the model by introducing repulsive forces to the nodes so that (only) non-adjacent nodes in the system repel each other. The idea is to simulate the forces as repulsive forces $F_{rep}$ of static electrically charged particles. The resulting repulsive forces $F_{rep}$ can therefore be assumed to be proportional to $1/d^2$ due to Coulomb's law (also called Coulomb's inverse-square law).

Assume that two points $p_u$ and $p_v$ are not connected in the graph and therefore not encounter a reciprocal attractive force through a connecting spring. Then, the strength of the repulsive force between these two nodes can be quantified by:

$$f_r = \frac{1}{\|p_v - p_u\|_2^2}$$

The resulting vector of the repulsive force $F_{rep}^u$ starting out from node u that acts on node v (and therefore in direction $(p_v-p_u)$) is calculated by the following formula:

$$F_{rep}^u(v) = f_r \cdot (p_v - p_u) = \frac{1}{\|p_v - p_u\|_2^2} \cdot (p_v - p_u)$$

Both types of force vectors (attractive and repulsive) may be calculated by the product of the forces strengths ($f_a$ and $f_r$) and the direction (vector) of the force ($(p_u-p_v)$ and $(p_v-p_u)$, respectively).

The presented definitions of $f_a$, $\vec{F}_{attr}^{(u,v)}$, $f_r$ and $F_{rep}^u(v)$ form one example model approximating the forces. This model can generally be varied.

With the two principal force sources, the overall system may be able to converge to a stable state of balanced forces that is not a single point for all nodes and does not require any fixation of nodes. This generalized and extended model contains the repulsive forces between non-adjacent nodes (and also the zero-energy lengths for connected nodes) as 'opponents' to the attractive forces of connected nodes.

Thus, even if the graph is complete (eventuating in a system without repulsive forces), it does not collapse to a single point as long as the zero-energy lengths l of the springs are not zero. The overall force strength acting on node v levels off to zero if the repulsive and the attractive forces neutralize each other and if, therefore, the pairwise distances d between all connected nodes correspond to the desired zero-energy lengths. Such a force model is often called a 'system of springs and magnets' due to its real-world counterpart.

The process of iterating towards an equilibrium state with Eades' force model is summarized in Algorithm Spring Embedder. After positioning all nodes randomly to obtain an initial configuration, the iterative procedure of minimizing the forces in the system is started. In each iteration, the repulsive and the attractive forces that act on each of the nodes are calculated according to the previously defined force model. A resulting force F(v) is derived for each node v by summing up the relevant forces and potentially scaling the sum of forces with parameters called the stiffness factor $A_{attr}$ for the attractive forces and the repulsion factor $A_{rep}$ for the repulsive forces. After these calculations have been completed for all nodes, each node v is moved 'a little' (more formally by the proportion δ) in the direction of the resulting acting force F(v) whereupon the entire process is repeated with the new forces acting on the nodes due to their updated positions. If a fixed number of such iterations has been performed, the process terminates returning the final positions of all nodes.

---
Algorithm: Spring Embedder
--- procedure SpringEmbedder(G, nb_iterations, δ)
  for all v ∈ V do
    $p_v$ ← random(x,y)
  end for
  i ← 0
  while i < nb_iterations do
    for all v ∈ V do    // calculate forces $$F_{rep}^u(v) = \frac{1}{\|p_v - p_u\|_2^2} \cdot (p_v - p_u)$$

$$F_{attr}^{(u,v)}(v) \leftarrow \log\left(\frac{\|p_v - p_u\|_2}{1}\right) \cdot (p_u - p_v)$$

F(v) ← $\lambda_{rep}$ · $\Sigma_{u|(u,v)\notin E}$ $F_{rep}^u$(v) − $\lambda_{attr}$ · $\Sigma_{(u,v)\in E}$ $F_{attr}^{(u,v)}$(v)
    end for
    for all v ∈ V do    //move nodes
      $p_v$ ← $p_v$ + δ · F(v)
    end for
    i ← i + 1
  end while
  return positions (set of coordinates for each v ∈ V
end procedure

---

In each iteration, the attractive forces arising from the springs (itself representing the |E| edges of the graph) and the repulsive forces between each non-adjacent pair of nodes (each pair of nodes but the connected ones in the graph: $|V|^2 - |E|$) have to be calculated.

The termination criterion may be formulated more adaptively and dynamically, e.g., by stopping either as soon as the sum of all acting forces $\Sigma_{v \in V}$ F(v) in the system falls below a certain predefined (small) threshold (as this indicates an equilibrium state) or if a maximum number of iterations has been performed.

The general principle behind a spring embedder model is that, on the one hand, connected vertices should be placed near to each other and, on the other hand, vertices should generally not be placed too close to each other. The fact that the complexity of one single iteration is $O(|V|^2)$ makes Eades' approach inapplicable for larger graphs. The initial random positioning of the nodes can additionally prevent the algorithm from reaching a good local or even a global optimum. An improvement to the method may be to calculate (only) those repulsive forces acting on a node v ∈ V that arise from nodes in its neighborhood. For this purpose, the graph can be placed on a canvas and the neighborhood is, following the approach of Fruchterman & Reingold (F&R), now constructed by dividing this canvas for the drawing with an equidistant grid (Thomas M. J. Fruchterman and Edward M. Reingold. Graph drawing by force-directed placement). Now, (only) nodes in v's own and the eight neighboring cells are taken into account for the calculation of repulsive forces acting on node v.

Figure 2:
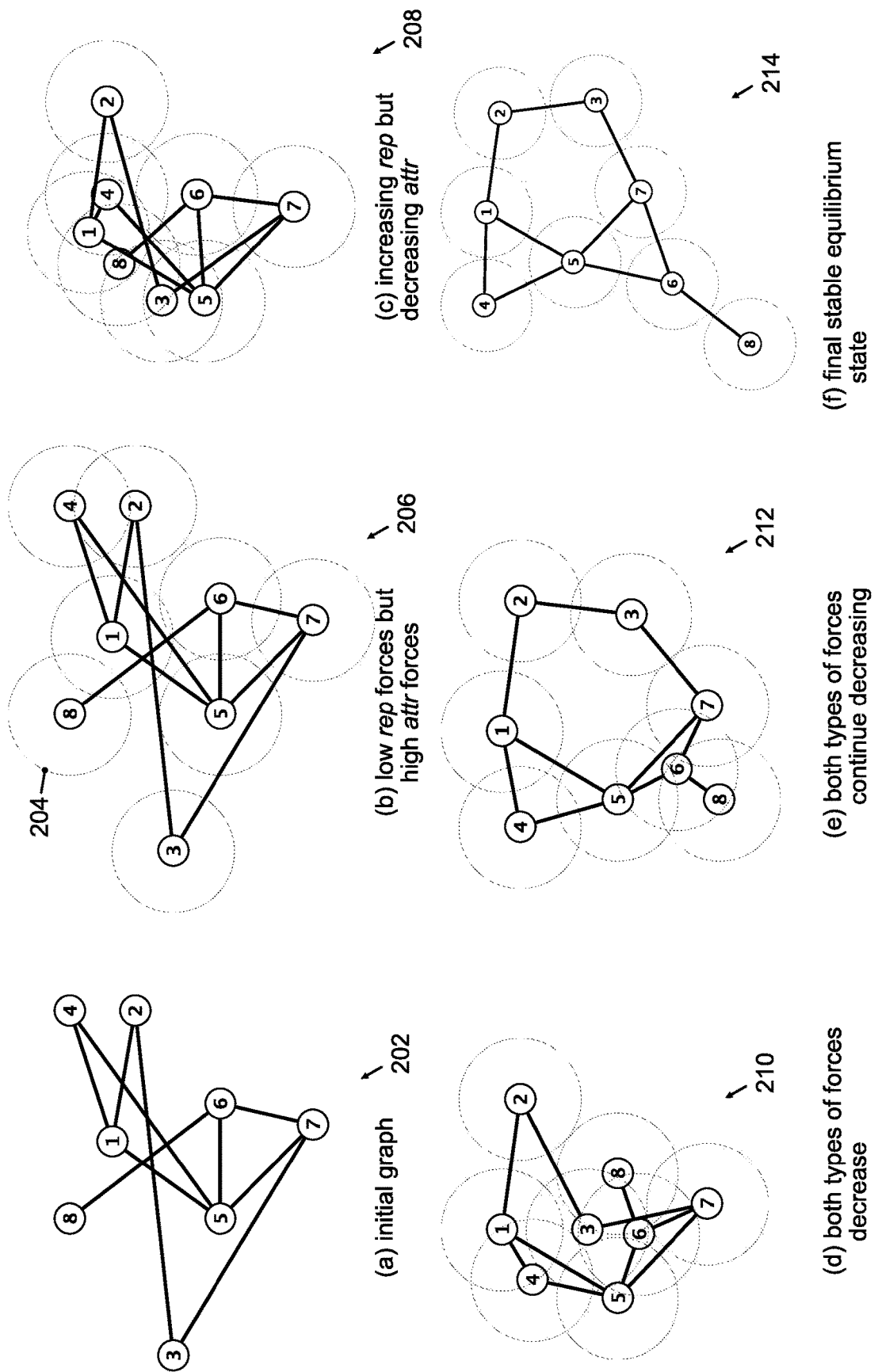
FIG. 2 depicts the iterative process in a spring embedder procedure.

FIG. 2 depicts the iterative process in a spring embedder procedure. The circles 202 around nodes are drawn to indicate the repulsive force of the node acting in its close spatial proximity. Starting with a random initial layout 204, the spring forces (edges) attract (attr) connected nodes that are far away from each other. During the process, nodes have to pass regions with higher repulsive (rep) forces to overcome local optima. This is possible in case of strong attractive forces for larger distanced connected nodes. It is important to note that, in this process, a node can undoubtedly be stuck in such a situation. It is therefore desirable to start with a good initial layout to avoid such situations as much as possible. One strategy to do so is a multilevel layout which is used in the presented implementation and explained. When all the distances between connected nodes are more or less balanced, the repulsive forces become more influential by arranging all node pairs more consistently distanced to each other. The iterations depict an exemplary time-series starting with the initial graph 204, a graph with low repulsive forces but high attractive forces 206, a state with increasing repulsive forces but decreasing attractive forces 208, a further transformation based on decreasing both forces 210, further decreasing of both forces 212 and a final stable equilibrium state 214.

Another important observation for the later parts of this work is that the drawing has no real orientation. Any rotation of this embedding has the same amount of acting forces between all nodes, a fact that is formally based on the application of the L2-norm in the force calculation methods.

An ideal edge length l: To make use of all techniques presented in this work, it is important (though, in general, not compulsory) to involve zero-energy edge lengths for the desired graph layout to steer the distances between connected vertices in the force-directed layout. Even though these values have already been introduced in the previous section, the following paragraph should give a little deeper insight to their influence in the force model.

Consider the force model of Hachul and Ringer with an attractive force which is modeled following equation.

$$f_a = \log\left(\frac{d}{l}\right) \cdot d = \log\left(\frac{\|p_v - p_u\|_2}{l^{zero}(e)}\right) \cdot \|p_v - p_u\|_2$$

If an edge is longer than its zero-energy length (d>l), the acting attractive force is positive while it becomes negative when the edge's length is smaller than it's zero-energy length (d<l). For d=l, the argument of the logarithm is exactly one, though the logarithm is zero by which means there is no acting attractive force. A state in which all distances of connected nodes correspond precisely to their zero-energy lengths can be called an attractive force equilibrium. The zero-energy lengths can therefore be seen as dampers or amplifiers of the attractive forces' strengths.

Apart from this general incorporation of the zero-energy lengths in the force model, $FM^3$ additionally contains post-processing procedures to readjust the desired lengths of edges very accurately by a few extra iterations of the embedder with extremely reduced repulsion factor $A_{rep}$ and increased stiffness factor $A_{attr}$. Under these assumptions, a small number of improving iterations that almost neglect the repulsive forces is performed after the main simulation. As a result, the final lengths of the edges of an $FM^3$ layout correspond rather precisely to the a priori desired user-defined edge lengths. Due to the zero-energy lengths, connected nodes would still retain a minimal distance to each other even if there were no repulsive forces.

The force-directed layout method that was applied, extended and adapted for this work is the Fast Multilevel Multipole Method (FMMM or FM³). It was developed and implemented by Stefan Hachul in his PhD-work at the computer science chair of Prof. Dr. Michael Ringer and is practically available in the already mentioned graph drawing framework OGDF. However, the force-directed layout algorithm incorporated in this framework is easily exchangeable by any other layout algorithm (not even necessarily a force-directed layout method) through a very generic interface in the implementation. The force model used by the FM³ is:

$$F_{rep}^u(v) = \begin{cases} \frac{1}{\|p_v - p_u\|_2^2} \cdot (p_v - p_u) & p_v \neq p_u \\ 0 & \text{otherwise} \end{cases}$$

$$F_{attr}^{(u,v)}(v) = \begin{cases} \log\left(\frac{\|p_v - p_u\|_2}{l^{zero}(e)}\right) \cdot \|p_v - p_u\|_2 \cdot (p_u - p_v) & p_v \neq p_u \\ 0 & \text{otherwise} \end{cases}$$

$$F_{rep}(v) = \sum_{u \in V \setminus v} F_{rep}^u(v)$$

$$F_{attr}(v) = \sum_{u|(u,v) \in E} F_{attr}^{(u,v)}(v)$$

$$F_{res}(v) = \lambda_{rep} \cdot F_{rep}(v) + \lambda_{attr} \cdot F_{attr}(v) \to 0$$

target
force equilbrium

This model is only one example for the approximate calculation of forces. Other models can generally as well be used for the FieldPlacer. Forces are (only) calculated when two nodes are not in the same position (which is particularly important when dealing with integer coordinates), otherwise the force is neglected. However, the are implemented mechanisms to avoid such situations. After calculating the attractive and repulsive forces acting on each node v, the resulting force $F_{res}(v)$ acting on node v is accumulated and the node is consequently moved in this direction.

Quadtree for approximation of repulsive forces: To overcome the drawback of Fruchterman & Reingold's rather static grid based algorithm to speed up the calculation of the repulsive forces, tree data structures like the 'reduced bucket quadtree' are likely used for further improvement. In the following paragraph, the basic idea how to create and how to use this data structure for faster repulsive force calculations is presented.

To create a quadtree data structure of a graph G, the canvas of the graph can recursively be split in four (equally sized) sub-cells whereas each cell represents the set of nodes located in the cell. This procedure is repeated recursively for each cell until it contains (only) a constant (small) number of nodes K, at the extreme just a single one. If K>1, a leaf of the tree can consequently contain more than one node. Such a leaf is called a bucket and the corresponding quadtree is more precisely called a 'bucket quadtree' with bucket capacity K. Each created cell in the coarsening procedure becomes a node in the quadtree and, as there are at most four non-empty children for a cell by this construction, each node in the quadtree has at most four children. After the i-th of such recursions, the current 'coarsening' of the graph is called the coarsening of the graph to stage $C_i$ and it is represented by level i of the quadtree. After a number of n recursions, each cell contains at most K nodes and the construction terminates. Thus, the leaves of the tree contain the (buckets of) nodes of the graph. Whenever a cell contains the same nodes than its child or, in other words, whenever a cell has (only) one child, this stage can be 'skipped' for this cell and the technically two cells become one in the tree which is consequently called 'reduced (bucket) quadtree'. If a series of such nodes forms a path $(v_i, \ldots, v_p)$, this entire path is shrunk and replaced by a simple edge $(v_i, v_p)$.

A simple approximation theme using this quadtree to speed up the repulsive force calculation is to represent the repulsive force of each quadtree node by an accumulated cluster force located in the barycenter of all nodes in the cell. Consider a node v in the graph and a cloud of nodes that is 'far away' from v.

Instead of calculating the repulsive forces that act from each of the cloud's nodes onto v, the overall force can be approximated by the cluster force. This can reduce the amount of calculations for v drastically if there are many nodes in the cloud. Nevertheless, such an approximation introduces inaccuracies (errors) with respect to the underlying force model. Furthermore, the influence of such inaccuracies is larger the larger the acting force of the cloud is. Since the repulsive force in FM³ is inversely proportional to the square of the distance of two nodes, the influence of the repulsive force and thus the influence of the introduced error decreases quickly with the distance. The question at which distance from the node to approximate forces can clearly not be answered conclusively. The earlier the force is calculated approximately, the more calculations can be saved but the larger is the influence of the error.

To constructively calculate all repulsive forces acting on a node v, an algorithm could start at the root of the tree with an initial force $F_{rep}(v)=0$. Now, all (at most four and at least two) children $u_1, u_2, \ldots$ are visited with the following rule for the recursion step: if v is a leaf in the subtree rooted by the quadtree child node (or the cell) $u_p$ visit all children of $u_p$. If v is not in the subtree rooted by the child node Ui, the following three cases are possible:

if the child ui is a leaf, add the repulsive force acting from cell Ui on v to $F_{rep}(v)$,
if ui is not a leaf but 'far enough' away $$\left(\frac{s}{d} < t\right)$$

from v, add the approximative cluster force acting from the cloud in cell ui on v to $F_{rep}$ else visit all children and proceed analogously.

The larger t is, the earlier the algorithm stops while traversing the tree and the fewer calculations have to be performed but the larger is also the introduced error. It is, again, a balancing act to choose a 'good' parameter t. Even though the approximation can speed up the repulsive force calculation by reducing the number of calculated influencing forces per node, the construction of the quadtree introduces a potentially relevant additional overhead. To profit from the use of a quadtree in the explained manner, it is therefore necessary that the number of nodes in the graph is sufficiently large. For three-dimensional graphs, an analogue construction leads to an octree representation.

Multipole approach for accurate and fast approximation of repulsive forces: Multipoles can be used to approximate the interaction of charges in a potential field instead of calculating all pairwise inter-actions. The multipole approach is rather complex and its application is not essential for the presented approach. A monopole approximation would also work and would speed up the calculation of repulsive forces, whereas a multipole approach is more accurate. Furthermore, the repulsive force calculation was not modified for the presented approach in this work. The goal of a multipole approximation is to describe the influence of a large set of charges onto other charges in a potential field by decomposing this influence into the sum of 'basic' influences, whereas the incorporation of more such basic components increases the accuracy of the approximation. These basic components of the interaction in a potential field are monopoles, dipoles, quadrupoles, octupoles, etc. The effort to determine the approximation can be kept small by taking only few such components into account. The 'right' choice of a number of basic components is, again, a question of weighing up between costs (in terms of time) and accuracy of the approximation.

Hierarchical multilevel approach to overcome weak initial placements: One crucial challenge for force-directed graph layouts, as for other iterative techniques, is the dependence of the methods behavior and its outcome on the initial placement of the nodes. While direct approaches calculate a placement without the need of randomized initial coordinates, they are not comprehensively applicable and also not as customizable as, for example, the spring embedder algorithm is. However, an utterly randomized placement of the initial nodes can lead to extremely long times needed until a stable equilibrium state is reached or (or and) to a resulting local minimum of low quality.

The main goal of a multilevel approach in the field of graph drawing is to create a good initial placement of nodes (or groups of nodes) for the layouting phase. Specifically, a commonly used approach is to create (potentially recursively) coarsened representations $G_1, G_2, \ldots, G_n$ of the graph G and consequently layout the graphs in the inverse order starting with Gn while transferring improvements that were made on a coarser representation onto the finer ones. Even when dealing with an efficient layouting approach like $FM^3$, the layouts of such smaller (coarsened) graph take significantly less time than the layouting of the finer or even the original representation G (resp. $G_0$).

The multilevel strategy that is used in this work is the one of Hachul implemented in $FM^3$. Instead of using matchings for the coarsening, Hachul proposed his 'sun-planet-moon' model in analogy to galaxies and solar systems. The idea works as follows. The entire graph G is considered as a galaxy partitioned into a set of solar systems that each contain a central object called the sun of the system. The sun's direct neighbors in the graph are called planets and these planets may have neighbors called moons. To formalize the property of being neighbors or, more general, the distance of nodes to each other, a metric called the graph theoretical distance is needed. Given a (connected) graph G(V, E), the graph-theoretical distance $d_g(u, v)$ between two nodes u, v ∈ V is the number of edges on a shortest path between u and v in G/

To mark the nodes representing the suns in G, a 'working-copy' V' of all nodes V is created. A random node v from V' is picked and its 'twin-node' in V is marked to be a sun-node. Now, all nodes u with graph-theoretical distance $d_G(u, v) < 3$ to v are deleted from V'. This procedure is performed until no node is left in V'. After that, the further steps are performed solely with the original set of nodes V.

Now that all sun nodes are marked in this way, the direct neighbors u ∈ V of each sun node v are marked as planets of v's solar system. As all nodes with $d_G(u, v) < 3$ were excluded from the set of potential suns after marking v as a sun, no direct neighbor of v has become a sun afterwards. The planet assignment can therefore be performed without any conflicts. Finally, the remaining nodes are moons in the galaxy and have a graph-theoretical distance smaller than three to at least one of the suns in the galaxy (by construction). Each of such moons is now assigned to a nearest planet and its solar system.

After partitioning a graph $G_i$ in this way, the coarsened graph $G_{i+1}$ is created by collapsing all solar systems to a single point which represents this system on the coarser level (i+1). All paths connecting different solar systems in $G_i$ (inter solar-system paths) are represented by respective edges connecting nodes in $G_{i+1}$. Thus, even several edges or paths between two solar-systems may be collapsed to one. To inherit the zero-energy lengths (which can be very important for this approach) from one level of the graph $G_i$ to the coarser representation $G_{i+1}$, each edge $(s_k, s_i)$ in $G_{i+1}$ between two collapsed solar systems with suns $s_k$ and $s_i$ gets a zero-energy length which is the average zero-energy length of all paths between $s_k$ and $s_i$ in $G_i$. In this context, the zero-energy length of a path is the sum of all edges' zero-energy lengths on the path. By this construction, the general aspirations concerning edge lengths are inherited from one coarsening level to the next.

$FM^3$ is also capable of creating drawings with user-defined node sizes. To consider such sizes in the coarsening step, each node on a coarser level (i+1) gets a desired node size that is the sum of the node sizes of its ancestors on level (i).

As already mentioned, the overall process in the coarsening phase creates the coarser representations of the graph G until a graph $G_n$ with a predefined constant number of nodes is created. This maximally coarsened representation $G_n$ is subsequently layouted with the force-directed method. After that, all planets and moons apparent in $G_{m-i}$ are placed near their respective suns and therefore already near their final position. Then, $G_{n-1}$ is layouted by the force-directed method. This process is repeated until $G_0 = G$ is reached. The layouting on the coarse representations can be performed very fast due to a very small number of nodes in the representations. However, the finer the graphs become, the more nodes have to be layouted. Nevertheless, the simulations on the finer levels converge relatively quickly as the inserted nodes are already near their desired equilibrium state position.

It is crucial to perform the layout very accurately on the coarser representations of the graph. An inaccuracy that was made on any coarse level of G propagates on the finer levels and therefore affects a larger number of nodes. Such errors would create initial layouts on the next level that are local minima and difficult or, accordingly, time consuming to escape.

If the number of applied iterations on the finer levels is not sufficiently large to 'correct' this, the layout can end in a weak local optimum. As the calculation of repulsive and attractive forces on the finer levels takes much longer, the process of 'untangling' such a situation on a fine level would take very much time. Instead, applying many iterations on the coarser levels is very cheap (in terms of time) due to the small number of nodes and edges. A rapidly growing function for the number of iterations on coarsening level i can be applied to obtain a good final layout quality by avoiding local minima in a small amount of time due to many cheap iterations on the coarser graphs and (due to good initial placements) decreasingly many on the finer and 'more expensive' graphs.

This multilevel strategy takes the actual structure of the problem into account to create good initial placements and thereby to avoid weak local optima. It is a much more 'precise' and problem-related technique than, for example, the strong perturbation in the beginning of a simulated annealing approach. This is one of the reasons why a multilevel strategy is used to improve the quality and the runtime of the desired chip placement.

The node degree of the selected sun-nodes directly influences the 'amount of coarsening' in the process. The more planets and moons a solar system contains, the stronger is the reduction when collapsing the system to a single node on the next level. Thus, a strategy for a rapid coarsening could be to sort the sun candidates in V' decreasingly according to their degree (number of adjacent nodes). If the list is sorted in ascending order, a moderate coarsening can be achieved.

In the multilevel process, the repulsive forces on very coarse-grained representations may even be calculated exactly for better performance by avoiding the quadtree creation overhead.

$FM^3$ not only incorporates many mechanisms to produce a layout whose edge lengths match the desired zero-energy lengths but also techniques to similarly assign different desired node sizes. At least some examples may increase the node size of such nodes that have many connections to other nodes (a high node degree). In this way, the stress in the region around such heavily 'loaded' nodes could pro-actively be reduced.

The previous sections presented the main sources of the good performance and the high accuracy of $FM^3$. It is based on a radical reduction of repulsive force calculations for distanced nodes combined with an accurate approximation based on multipoles and a fast multilevel approach which leads to good initial placements of the nodes. The multilevel approach also (mostly) eradicates the dependence of the final solution's quality on the initial arrangement by layouting the coarser graph representations very precisely for 'low costs' (in terms of necessary time).

There is a large number of available force-directed graph layouting approaches differing not only in the force model but also in their principal technique to obtain a layout. Apart from approaches that are based on the iterative spring embedder idea with and without a multilevel mechanism and, for example, using different approximation schemes for the repulsive forces (e.g., The Grid Variant Algorithm (GVA) by Thomas M. J. Fruchterman and Edward M. Reingold in Graph drawing by force-directed placemen, Graph Drawing with Intelligent Placement (GRIP) by Pawel Gajer, Michael T. Goodrich, and Stephen G. Kobourov in A Multi-dimensional Approach to Force-Directed Layouts of Large Graphs and Pawel Gajer and Stephen Kobourov. Grip: Graph drawing with intelligent placement, A Fast Multi-scale Method (FMS) by David Harel and Yehuda Koren. A fast multi-scale method for drawing large graphs), there are also several 'direct' approaches (like the one of Tutte based on solving a system of linear equations) using eigenvectors and eigenvalues of a matrix constructed from the adjacency structure (for example, the Laplacian matrix) of the graph.

Alternatively, the FastMultipoleMultilevelEmbedder approach developed and implemented by Gronemann in OGDF may be used. Compared to Hachul's $FM^3$ implementation, it includes a different quad-tree space partitioning and a well separated pair decomposition (WSPD). Combined with an approximation of repulsive forces by 'simple' monopoles, the approach can perform an order of magnitude faster than $FM^3$ (or even more). However, to apply it directly in the presented framework, the recognition of zero-energy lengths and the mentioned post-processing for these may be added. In general, the layouting process can be speeded up or refined by further parameter tuning or other force and force approximation models. The implementation of $FM^3$ is used for the framework as it provides many useful mechanisms and a very good balance between speed and accuracy. However, the presented framework provides a flexible structure to exchange the graph layouting procedure.

First of all, a force-directed placement routine for heterogeneous FPGAs may be provided to meet the requirements of today's FPGA architectures, e.g. based on an iterative spring embedder simulation with a force system including attractive and repulsive forces (e.g. $FM^3$). It is desired to build a method incorporating multilevel coarsening and multipole approximations of repulsive forces for a fast simulation with high accuracy.

A characteristic of many available analytical placement methods is that the surrounding I/O pads may be fixed to create a uniquely solvable equation system finding the optimal coordinates of all inner nodes. At least some embodiments may be usable without any fixing of nodes to improve the system more globally, as the initial fixing of nodes can either negatively affect the quality of the resulting placement or, if it is calculated in advance, be very time consuming. Anyway, I/O positions and inner logics' position influence each other considerably so that all nodes may be declared free if the situation allows it (e.g., in a prototyping phase).

Both facts, the influence of the actual assignment of fixed nodes to predefined positions and the unbalanced distribution in the absence of repulsive forces may emphasize the application of a global and entirely free spring embedder approach. The direct usage of graph drawings that may be provided by any graph drawing software within the workflow (due to universal interfaces) may generate an intuitive entry point and flexible access as a basis for future developments in this field supported by other researchers, e. g., from the field of general graph drawing. In particular, the abstraction of the chip design into a basic graph will be used to create placement strategies with different targets, e.g., wirelength-driven, timing-driven or routability-driven placements or even their weighted combinations. In addition, various operation modes with different trade-offs between time and quality may be available (depending on the development state of a design) and the principal distribution of elements on the chip may also be adjustable (for different demands).

Finally, the system may have a modular design to make it possible to use parts of it in combination with other methods. As many previous analytical placers need fixed I/O pads, a rapid global optimization from this workflow could, for example, also be used to obtain a good initial I/O distribution for such analytical methods.

The place-and-route tool VPR may be embedded into the comprehensive Verilog-To-Routing (VTR) CAD flow and basically needs two input files to run the FPGA compile chain.

First, it needs the design that may be implemented into the hardware in form of a netlist. A high-level Verilog description of the design is transformed into a text file using the Berkeley Logic Interchange Format (BLIF) in the elaboration step performed by Odin. This file is subsequently taken by the synthesis step for hardware-independent optimizations and the like.

Second, it may require a description of the targeted hardware architecture. VPR expects a principal description of the architecture in an Extensible Markup Language (XML) file. There are several example architectures provided by the VTR framework which have been used to test the FieldPlacer framework, e.g., the 'Comprehensive Architecture' which is exemplarily used for some explanations. This heterogeneous architecture comprises of CLBs (with fracturable LUTs (Look-Up-Tables) that can be used either as one 6-LUT or two 5-LUTs), fracturable multipliers, configurable memories and I/O pads. Every eighth column of the Comprehensive Architecture is a column of multiplier blocks and, with an offset, every eighth column consists of memory blocks. Both special block types span several rows as they are larger than the ordinary LUTs. As the multipliers are fracturable, a 36×36 multiplier can also be used as two independent 18×18 multipliers or these again as two 9×9 multipliers. The memory blocks are fracturable by their word size. The I/O blocks are surrounding the architecture while each I/O block holds 8 I/O pins which can either be used as output or as inputs.

Architecture assumptions in VTR are made based on real architectures from Xilinx and Altera, see the publication of VTR 7.0 for more details. However, the presented method is not restricted to such an architecture in any sense. Further special block types and also different CLB or I/O types can be easily added to the model in the future.

VPR first reads the design description and packs (or groups) it into basic blocks available on the architecture (I/Os, CLBs, MEMs, MULs). After this, it is known how many resources of each type are necessary for the design. An architecture with the aforementioned properties that contains all such basic blocks in an adequate number can automatically be created instead of manually passing a size for the FPGA. This automatic mode is used in all benchmark runs of this work. In real implementations (in contrast to such simulations), a suitable subarea of the overall FPGA is often chosen.

The size of the automatically derived squared N×N architecture is determined by simple bisection starting with $N_0 = \sqrt{\text{numberofblocks}}$. If there are enough resources of all types, the size $N_0$ is halved to $N_1 = N_0/2$ (otherwise it is doubled) and the routine subsequently checks whether enough resources of all heterogeneous types are available on an architecture of this size. If not, $N_2 = (N_0 + N_1)/2$ is checked and so forth. As soon as the suitable size is found so that enough resources of each type are available, the position of all blocks on the architecture is exported to an appropriate data structure named FPGAArch.

Before the placement routine starts, an appropriate architecture size was either defined by the user manually or found by the bisection based routine introduced in the previous section. Anyway, the automatic bisection-based method guarantees that the packed design can be implemented in the defined hardware architecture. If the user defines the size manually, this is checked and the program does not proceed if the size is not sufficient.

The overall architecture (and therefore also the placement) can be represented on a two dimensional grid (FPGAArch[x] [y]) containing logic blocks and routing resources (RR). Each element on this grid contains a type information (CLB, I/O, MEM, MUL or RR). The I/O blocks additionally may contain the number of available I/O pads in this I/O block (e. g., eight for each I/O block). The routing wires, for example, supplementary store their channel widths. In general, each block on the architecture is represented by a two-dimensional reference point in its center. All (e. g., eight) I/O pads in an I/O block are represented by the center (x, y) coordinates of their block together with an additional z-coordinate (e. g., ranging from 0 to 7) to distinguish the different pads in a block.

In addition to the general availability of the CLBs' coordinates in the FPGAArch array, the number of CLBs in each row of the FPGA is stored in a separate array for fast creations of appropriate distributions later. In the exemplary architecture, this CLB-on-architecture distribution contains 8 CLBs in each of the 12 CLB rows. Heterogeneous blocks (special function blocks) (MEMs and MULs) are represented by a central reference point.

The predominant norm in VPR is the bounding box cost norm, which takes the semi-perimeter bounding box sizes of all nets and the available average channel width in a region of the FPGA into account. The implementation in VPR also includes an estimation about wire-crossings within the boxes and rates the consequent wire elongation in the routing based on the previously named bounding boxes' parameters. Based on this estimation of wire-crossings (which essentially uses statistics about Steiner Trees), the bounding box cost is scaled by a factor q(i) depending on the number of terminals in a net.

The simulated annealing approach in VPR uses this norm in its cost function. Thus, the optimization in VPR considers both the overall wirelength (by the semi-perimeter bounding box sizes) and the routability (by the channel widths and the estimation of crossings) simultaneously.

VPR includes a method to estimate the critical path delay after the actual routing and also before it. If this norm is used after the placement and, therefore, before the routing, the wire-delay has (of course) to be roughly estimated as the concrete routing tracks are not known. This norm estimates the maximum delay of a clock-cycle in the design and consequently the maximum possible speed to run it validly.

The router in VPR tries to route all connections of a net with the available routing tracks on the architecture by applying an iterated maze router similar to the PathFinder negotiated congestion-delay algorithm. The nets are ripped up and rerouted in each routing iteration with adjusted parameters (timing-driven in the applied default configuration) if the previous routing was not successful under the restrictions of the routing architecture (consequently prioritizing critical connections in the next routing iteration). This process is repeated until a successful routing is created which satisfies all guide-lines (including some additional cost functions) or until a predefined number of routing iterations has been performed (which is 50 in the default setup). After the routing process, the numbers of routing tracks that are used on each wire segment (their occupancies) are reported. The Maximal Channel Occupancy (MCO) is consequently the largest number of channels used on one wire segment by the final routing. If the routing satisfies the requirements of the architecture, the occupancy is smaller than the channel width for each wire segment. Otherwise, it exceeds the guidelines and would not be realizable on the given architecture.

The maximal channel occupancy can be taken as a norm to rate the congestion in a specific routing and the routability of a placement. Together with the finally realized critical path delay after routing, the overall quality of a design's layout can be rated.

Along with the presented FieldPlacer method, additional norms were introduced to rate the quality of a placement towards different objectives. All these norms operate on a model considering the global routing on the architecture. Generally, there is an initial graph representation $G_D$ with arbitrary coordinates to perform the basic force-directed layout $G_D^{layout}$ and an embedded representation $G_D^{arch}$ on the architecture after slot assignment with constrained integer coordinates.

The bounding box cost norm in VPR includes the approximation of the overall wirelength by the semi-perimeter bounding box size of nets. As the actual routing of connections is not known in the placement phase, this approximation is reasonable and well suited and rather accurate. However, the force-directed layout approach that will be used in this work tends to minimize the point-to-point wirelength sum in the targeted force equilibrium of the introduced graph model of the design by attractive forces while keeping distances between nodes by repulsive forces. Thus, a further norm was implemented that iterates over the edges of the graph representation of the design ($G_D^{layout}$) and sums up all distances between connected nodes. Due to the characteristics of the routing architecture, the distance is measured as the Manhattan distance. Consequently, the wirelength in the graph can be derived by equation $$\text{WireLength}(G_D^{layout}) = \Sigma_{(u,v) \in E_D} |x(v)-x(u)| + |y(v)-y(u)|$$

After the embedding of the graph on the integer grid of the chip, each node $v \in G_D^{layout}$ the architecture receives the coordinate of its assigned. Thus, the point-to-point wirelength on the slot on chip can be calculated analogously on the corresponding graph $G_D^{arch}$ with $G_D^{arch}=(V_D^{arch}, E_D)$. Notice that the connection information ($E_D$) in the graphs does not change by the layout or the embedding.

VPR uses the semi-perimeter bounding box approximation not only because the actual routing is not known, but also because the bounding box updates can be performed much faster than recalculating all connections' lengths of a node after a position change. This is extremely important for VPR's placer, as the simulated annealing method needs to recalculate the distances frequently in every iteration. The point-to-point wirelength is not applied within the optimization process of the graph, but after it in order to get a final evaluation of the achieved quality so that the time consumption is 'negligible'.

Not only the estimation of the wirelength in the resulting layout plays a role for a placement. Other criteria may even be much more relevant, though not easily assessable. For example, it would often be more desirable to minimize the critical path length instead of the overall wirelength. However, in a simulated annealing process, the estimation of the critical path length in every iteration may be too time consuming. Thus, such complex estimations are generally performed once after the placement.

An approximation of congestion: Besides wirelength, VPR's placer also includes a statistical evaluation of wire crossings to take routability into account in the annealing process. In general, rating routability is a difficult task but as the routability affects the later routing time and quality, an approximation of it is desirable to compare different placements.

The FieldPlacer congestion-driven maze router: As VPR iteratively applies a maze router to route the nets, this behavior is imitated by the 'FieldPlacer congestion norm'. In fact, the routing of each point-to-point connection between logic blocks is simulated by searching a shortest route via wave propagation and backwards tracking. There are, in general, multiple shortest routes (concerning the Manhattan distance). The idea is to make one routing attempt under the assumption of an infinite number of routing tracks in each routing channel In addition, the routing cell with the smallest current congestion is (greedily) chosen among the possible cells on shortest routes. After that, the overuse of all routing wires is measured by summing up the congestion on all routing tracks. This process will be illustrated in the following.

Figure 3:
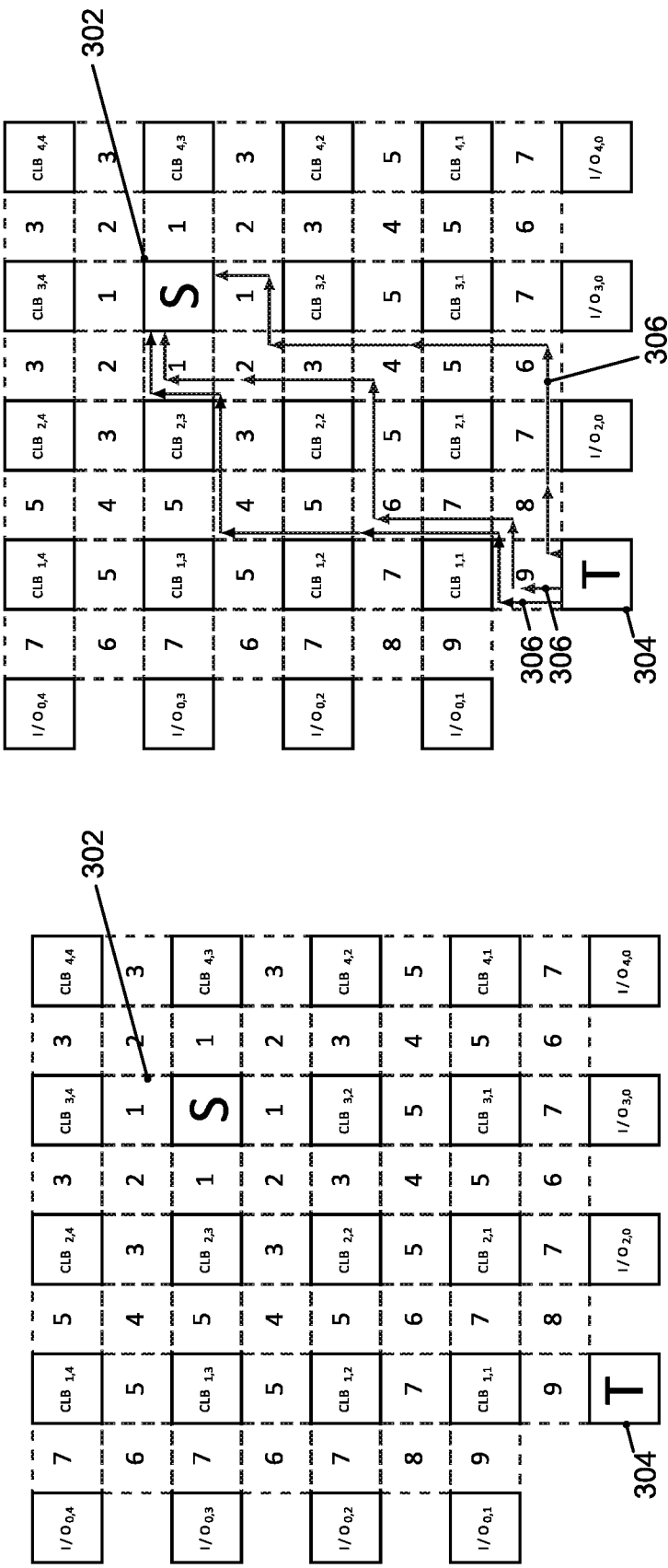
FIG. 3 shows a part of an FPGA architecture with Input/Output blocks and Configurable Logic Blocks.

FIG. 3 shows a part of an FPGA architecture with I/Os and CLBs. In this example, a connection from the marked CLB (Source 302) to the marked I/O (Target 304) has to be found. Therefore, a wave is expanded from the source point, marking the Manhattan distance of every routing cell back to the source. As the overall architecture not only consists of routing cells but also contains the logic units, the expanded wave has holes. However, due to the regular grid of logic and routing resources in the model, a shortest track back to the source is available for every connection. The wave is expanded until the target point is reached with a final Manhattan distance n. This part of the process is called wave expansion.

After this, the route is determined by starting at the target point and following the wave back to the source by choosing routing resources with declining Manhattan distances from n to 1. This part of the process is called backwards tracking. FIG. 3 shows three different routes 306 with minimal Manhattan distance. Due to the 'holes' in the wave that occur from the logic cells, the process always proceeds from one switch box to the next traversing one wire segment.

All depicted routes 306 in FIG. 3 obviously have the same (minimal) wirelength by this construction. Now, the occupancy of the cells caused by already routed connections is taken into account. If two wire segments (routing cells), both on optimal tracks, are available as the next cell, the 'Field-Placer congestion-driven maze router' greedily takes the next wire segment with the smallest current occupancy to continue the routing. This decision is locally optimal but not necessarily globally.

Starting with the current wire usage (in form of the occupancy array), the wave is expanded from the source and tracked back from the target. Reaching the first switch box, the track could for example continue upwards or rightwards. After choosing the next routing cell, the occupancy array is updated. Finally, the wire usage on the cells that are chosen for the actual route are increased by one each. This procedure is consecutively performed for every connection between blocks in the design.

After every connection has been routed in a globally optimal way concerning wirelength and locally optimal concerning the congestion of routing tracks, the overall overuse of routing resources in this simplified model is obtained by summing up all cells' overuse ratings.

$$OverUse = \sum_{\text{wire segments } w} \max(0, \text{occupancy}(w) - \text{capacity}(w))$$

Thus, the overuse norm considers (only) those wire segments that would not be routable in the described manner on the defined architecture. It rates in which quantity routing cells would be overused. In the actual routing phase, such congestions would be resolved by routing uncritical paths on a detour. This enlarges the final overall wirelength and also increases the routing time. Consequently, a placement with small overuse is generally desired.

The capacity of switch boxes is not easily estimable because not every change of direction at 'intersecting' wire segments is possible. A detailed routing would be necessary for accurate investigations. Thus, the switch boxes' capacities are not considered in this model.

Like in the 'real' routing, the order of the connections plays a role for this process, but as the norm is (only) used to get an impression of the stress on the routing architecture, this fact is not considered in the norm calculation. Instead of simply accumulating the overuse of wire segments, a super-linear assumption could be made to, for example, penalize heavily overused resources more than only slightly overused ones, as the rerouting may take over proportionally longer in such cases.

Finding a suitable function for the overuse cost would in any case be difficult and be done on basis of experiments, as there are many influencing and unknown factors. In this work, a linear behavior of the overuse cost is assumed. Thus, the function is piecewise linear (0 up to the point of overuse and directly proportional with slope 1 afterwards). As a result, the more a segment is overused, the higher is the penalty, while non-overused segments are neglected.

The FieldPlacer method creates a heuristically energy-minimized graph layout as a basic 'arrangement-draft' of the design and embeds this unrestricted graph with arbitrary (e.g., floating-point) coordinates on a given heterogeneous FPGA architecture (and therefore on a constrained integer grid). The algorithm to create the initial graph-layout is arbitrarily exchangeable although a force-directed graph layout is, for this approach, advisable to match the presented embedding-process. The basic FieldPlacer method mainly bases on nested sort-techniques and barycenter- and angle-calculations paired with user-definable distributions. It is composed of several consecutive steps and can be extended for upcoming FPGA architectures with other block types and also with further methods. The development of the FieldPlacer itself has been an iterative process adding more and more refinements and functionalities step by step. The method sets up a graph that represents the design that has to be placed, creates a free (unconstrained) force-directed layout and places it by assigning each element to a suitable (fitting and adequate) integer position on the restricted grid of the FPGA chip following different (selectable) strategies. This basic FieldPlacer method has then been extended by further optimization steps like, for example, a local refinement, the application of different distance norms in the layout phase, a second energy phase or even the repeated application of (parts of) the method in a statistical framework.

$1^{st}$ Step—Setup: The representation of the design, stored in the FPGAGraphRep structure (e.g. the circuit graph), is the fundamental basis of the procedure and the input for the force-directed graph layout (of the circuit graph). For its setup, each packed (CLB (logic block), I/O (input/output block), MEM (memory block), MUL (e.g. special function block)) block of the FPGA design becomes a node in the FPGAGraphRep and all point-to-point connections of the nets of the design are traversed and incorporated as edges in the FPGAGraphRep. In this process, (only) connections that do not belong to global nets are considered because global nets might not be routed on the normal routing architecture and do generally not influence the placement, routing and timing of a layout.

The initial position of the nodes is (only) needed if there are fixed nodes in the design that may not be moved. For now, this is not the case. Thus, the graph representation contains no information about the position of nodes but (solely) their connectivity (or adjacency) and their heterogeneous block type. It is consequently a pure abstract graph with no definite geometry (no embedding).

Depending on the subsequently applied graph layouting approach, it can be desirable to remove parallel edges in the graph that result from multiple connections between pairs of logic blocks. This is optionally possible in the FieldPlacer method. For the presented ideas of this work, this option is actually always activated as it becomes particularly important in the slack graph morphing procedure to steer the connections' lengths in the layout.

In summary, the FPGAGraphRep structure represents the netlist of the input design as a graph $G_D=(V_D, E_D)$ with all heterogeneous blocks ($V_D$) and their interconnectivity ($E_D$). This graph may have multiple components processing different independent tasks. However, the inputs that were taken from the heterogeneous benchmark set in VTR 7.0 mostly contain one single or at least one predominant component (in terms of number of blocks/nodes).

---

Algorithm Create the FPGA representation graph

```
procedure CreateFPGARep(NodeList* BlockPlacement , EdgeList* BlockConnections)
        for all nodes in BlockPlacement do                    //create the nodes
            create a node in the FPGAGraphRep (G_D)
            store the block type with the node in the FPGAGraphRep
        end for
        extract point-to-point connections from BlockConnections that are NOT on
        GLOBAL nets
        for all such point-to-point connections (S,T) do        // create the edges
            if Option.no_parallel_edges then
                if the nodes S and T are not yet connected in the FPGAGraphRep then
                    insert the edge (S,T) into the FPGAGraphRep
                end if
            else
                    insert the edge (S,T) into the FPGAGraphRep
            end if
        end for
        return FPGAGraphRep (G_D) and.gml representation      //return and export
    FPGAGraphRep
end procedure
```

---

$2^{nd}$ Step—Graph Layout: The FPGAGraphRep is internally stored in a structure and additionally exported to a common Graph Modelling Language (GML) file. In that way, the graph layout can be performed by any graph layouting software that is able to read and write such files. Additional interfaces can be implemented. In the FieldPlacer method, this GML file is passed to a slightly modified and enhanced version of the $FM^3$ algorithm implemented in OGDF, FieldFM$^3$ and FieldOGDF in the following (see: The Open Graph Drawing Framework). The extensions are methodologically described in the following Sections and some technical insights are given.

In VPR's simulated annealing approach, all blocks are randomly assigned to suitable slots on the architecture to create a legal initial solution. The graph layouting in FieldFM$^3$ gets the general graph description (without embedding) and starts with a random initial assignment on the coarsest representation of the multilevel framework.

(All) nodes may be randomly assigned in the beginning as long as there are no user-defined fixed nodes. As there were no inputs with such fixed blocks in the benchmark set, this is always assumed in this work. However, an extension with initially fixed nodes is directly possible due to the extensions implemented in FieldFM$^3$.

Figure 4:
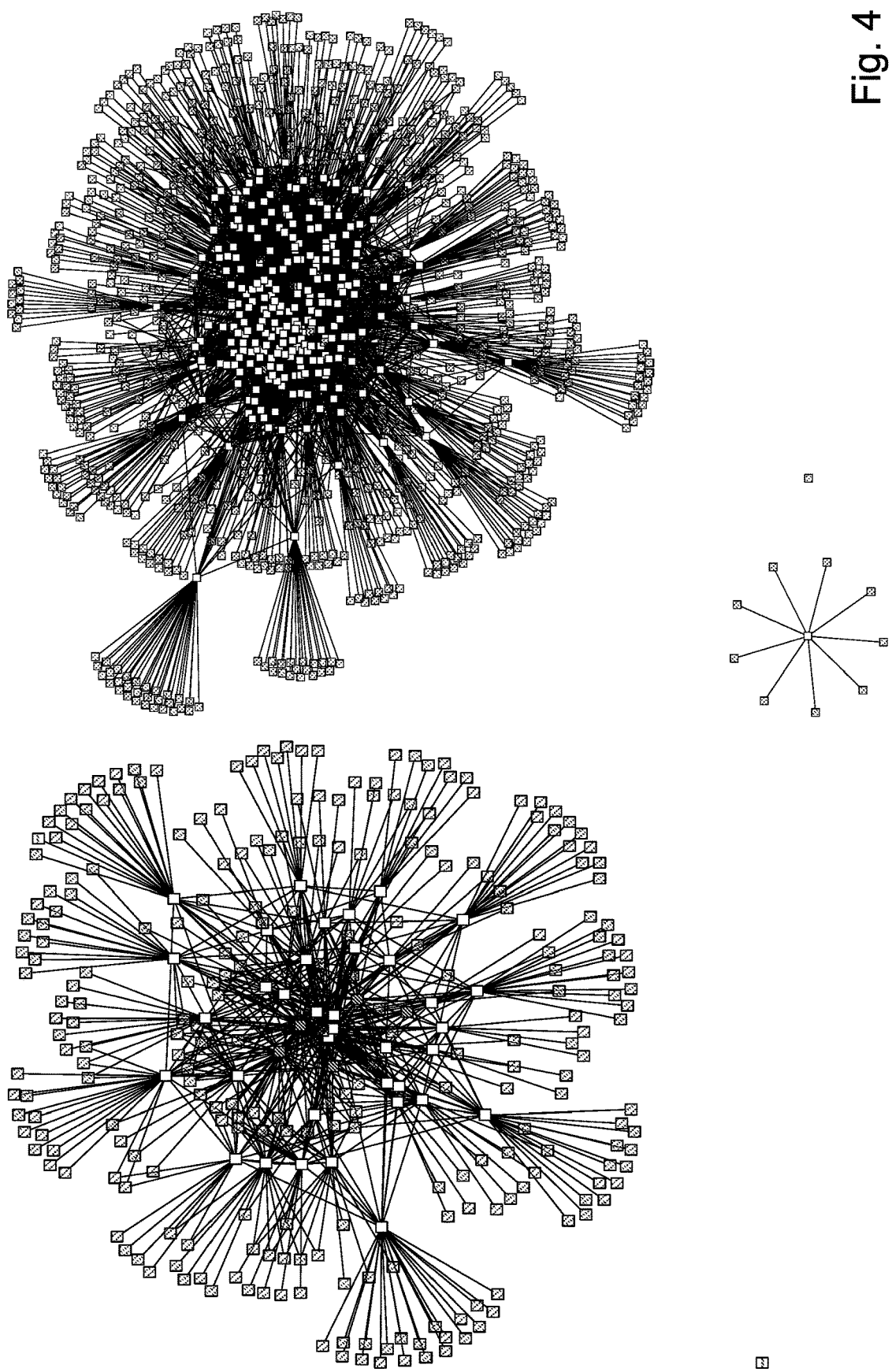
FIG. 4 shows the resulting layout of a force-directed graph layout.

FIG. 4 shows the resulting layout of the Force-directed graph layout obtained from FieldFM$^3$ for two example codes 402, 404. Even though these layouts were produced without any restrictions concerning the resulting coordinates of the nodes, the results show some distinct peculiarities of achieved force-directed layouts in general. First of all, each node is approximately placed in the barycenter of its neighbors as the energy-minimized solution tends to minimize the sum of distances between connected nodes.

In addition, I/O nodes (depicted in orange) tend to the border of the layout. This is based on the fact that most I/O pads are only connected to one single inner logic block (CLB, MEM or MUL). Thus, such I/O nodes are (the) leaves of the graph and there is no force that pulls the node 'inwards' the graph layout except for these single connections. This perfectly matches the structure of FPGAs (e. g., the considered island-style FPGAs) or chip architectures in general as the I/O connections are naturally surrounding the other elements. There may also be I/O nodes that are connected to multiple inner nodes. These are then, again, placed near the barycenter of their neighbors.

Every block of another type (than I/O) generally has in- and outputs to process data and is therefore carried to the inner regions of the graph layout. As a result, while the I/O nodes are pulled outwards the layout due to the repulsive forces, the neighboring inner nodes reside near them. The inner nodes are ordinarily much stronger connected to several other nodes (e.g., a CLB, depicted in white, contains multiple LUTs and these have multiple in- and outputs). In fact, the MEM (in blue) and MUL (in gray) elements often have exceptionally many in and outputs and are therefore strongly connected (and placed near the barycenter of their neighbors).

The layout of the $G_D$ follows some physically motivated properties. Like in many published approaches from the field of analytical placement techniques, connected elements attract each other by the attractive forces in the force model. However, the FieldPlacer method additionally considers repulsive forces. As a consequence, the I/O nodes can be freely distributed to find good positions for them (like for all other nodes) without a collapse of the system. Another very positive effect is that the nodes are quite evenly distributed and not too much space is wasted in the layout. Due to the implication of the repulsive forces for each node in VD, nodes tend to repel each other and this reduces the problem of overlapping. On the other hand, each edge in ED generates a contracting force between connected blocks, conceivable as a spring. By these attractive forces, connected nodes still tend to be placed closely together.

Summarizing, this phase generates a low energy arrangement of the system (the design), it concentrates 'clusters' that are strongly connected together (so that the many wires between nodes in the cluster are kept short) and it preserves larger distances between groups of nodes with smaller numbers of connections. The method thereby keeps the overall edge length sum small and generates a consistently distributed node arrangement of the design whereas the repulsive forces ensure that the stress (resp. the overlapping) in all regions of the layout remains moderate.

The main idea is now to take this force-directed layout as a 'preliminary sketch' of the later embedding. For the depicted graph layouts, the FieldFM$^3$ implementation (which uses the FM$^3$ algorithm) was used as it is extremely fast while being accurate at the same time. Nevertheless, the method is absolutely exchangeable. No matter which particular force-directed layout approach and implementation is used, the mentioned positive core effects are in the nature of these methods and may therefore generally be present for each individual implementation.

The later placement can easily be controlled, adjusted and extended by modifying the properties of the graph model $G_D$ as it is, e.g., done in the slack graph morphing by adjusting the zero-energy lengths of the edges to iteratively reduce the overall slack in the design and consequently the critical path delay ('length').

Minimizing the critical path delay is reasonable when the primary optimization goal is performance. If developers are, for instance, aiming at a better thermal distribution, the graph model and the layouting algorithm could be modified in that direction before applying the force-directed layout, e.g., towards further reduction of stress by a more 'aggressive' function for the repulsive forces. Even completely different layout-techniques could be used in such a case. Another possibility to adjust the generated placement is to choose different norms for the distance within the layouting phase.

$3^{rd}$ Step—CLB placement: Let $G_D$ be the graph of the basic description of a design's blocks' connectivity (adjacency), $G_D^{layout}$ the output graph of the force-directed layout with arbitrary coordinates and $G_D^{arch}$ the embedded graph on the architecture after slot assignment with constrained integer coordinates.

The nodes of the force-directed layout in $G_D^{layout}$ from step 2 in the previous Section can have arbitrary (floating-point and arbitrarily sized) coordinates. The next steps embed this graph layout onto the restricted integer grid of the FPGA architecture.

As CLBs are the basic logic blocks of ordinary FPGAs (the 'general purpose FPGA workers') and therefore are, in general, the predominant (non-I/O) block type in a design, these are embedded first of all. For that, the GML output from the graph layouting method is taken as the input of the following steps.

To be able to create an embedding of the CLBs from the graph layout, the CLB nodes and their coordinates are extracted from $G_D^{layout}$ (which contains all block types) while the connections can be neglected in this step. The extracted set of CLB nodes is denoted by $V_{CLB}^{layout}$ may now be placed on the integer grid, generally preserving their two-dimensional arrangement to each other in the obtained layout.

In the following, the nodes of a node pair v and ṽ are always representing the same node of the FPGA design while $v \in G_D^{layout}$ has the arbitrary coordinates of the layout and $ṽ \in G_D^{arch}$ is its counterpart embedded on the architecture.

Vertical sort: At first, a node $v \in V_{CLB}^{layout}$ that is below another node $u \in V_{CLB}^{layout}$ layout in $G_D$ may not be placed over v in the final embedding on the architecture in $G_D^{arch}$.

If $\tilde{v}, \tilde{u} \in V_{CLB}^{arch}$ are the embedded nodes with integer coordinates, then $y(v) < y(u) \Rightarrow y(\tilde{v}) \leq y(\tilde{u})$ may hold true. Therefore, the set of CLB nodes $V_{CLB}^{layout}$ is arranged in a linked list (the CLBNodeList) which is first sorted ascendingly according to all nodes' vertical coordinates.

At this stage, successive nodes in the CLBNodeList have ascending vertical coordinates. In the next step, this list is partitioned into disjoint subsets of nodes $R_i$ (e.g. the plurality of slices) whereas all nodes of one subset $R_i$ will be placed in the same row $r_i$ of CLBs on the FPGA architecture (with $\cup_i R_i = V_{CLB}^{layout}$). For the partitioning, different desired CLBDistributions can be chosen.

The CENTER distribution places the CLBs densely in the center of the FPGA. For this purpose, the smallest central square field of size $N_{SQUARE} \times N_{SQUARE}$ on the architecture containing a sufficient number of CLB slots ($\geq$ #CLBs) is chosen and the CLBNodeList is partitioned into $N_{SQUARE}$ respective sets of nodes.

No, Equal & Distance distribution—Other distributions place the CLBs consistently across the rows of the FPGA. Thus, the number of elements per row is calculated as $\lceil$#CLBRowsOnArch/#CLBs$\rceil$. The last used row may consequently get a smaller number of CLBs and some final rows on the architecture may remain empty due to rounding. Under this assumption, the partitioning of all CLBs into the group that will be placed in the first row of the FPGA ($R_1$), the second row ($R_2$), etc. is defined and, therefore, the assignment of vertical coordinates in $G_D^{arch}$ can be conducted.

The next step additionally generates the horizontal coordinates of the nodes in $G_D^{arch}$ within each row following the different distribution strategies.

Horizontal Sort

For the horizontal assignment of the nodes, each packed row $R_i$ (slice) is independently considered and the subset of the linked list is sorted by its nodes' horizontal coordinates from $G_D^{layout}$. After this step, $x(v) < x(u) \Rightarrow x(\tilde{v}) < x(\tilde{u})$ will hold true for every pair of nodes u, v from the same row. In addition to their pure horizontal order, penalties (free slots) may be placed between nodes following the distribution strategies (e.g. for the distributing 144).

Center distribution: To center each row, the first CLB is placed with an offset of ColumnOffset logic blocks to leave a free margin on the left and on the right (like it was left at the top and the bottom).

$$ColumnOffset = \left\lfloor \frac{\#LOGICColumnsOnArch - N_{SQUARE}}{2} \right\rfloor$$

The nodes of each row are placed from left to right onto the next free CLB slot and columns with heterogeneous 'special' block types are skipped if they appear.

No distribution: The NO distribution uses all rows of the FPGA (see the previous paragraph). The CLBs are simply placed from the left to the right onto the next free CLB slot with no free CLB slots between them.

Equal distribution: The EQUAL distribution aims at spreading the CLBs of each row evenly within this row. For this purpose, a penalty counter p is increased by #CLBsTo-BePlacedInThisRow/#CLBColumnsOnArch after placing a CLB. Whenever this counter p becomes equal to or greater than 1, $\lfloor p \rfloor$ CLB slots are skipped and p is updated to $p - \lfloor p \rfloor$. This may guarantee that all CLBs can be placed within the row and that the available penalties are approximately evenly distributed across the row.

Distance distribution: This may be a core distribution of the FieldPlacer. Instead of distributing the penalties equally, free CLB slots between blocks of a row are assigned according to the respective open spaces in the force-directed layout $G_D^{layout}$. Larger spaces between two nodes u, v in the layout are supposed to result in multiple free slots between the embedded nodes $\tilde{u}, \tilde{v}$ and vice versa. To realize this, the minimal and maximal horizontal coordinate is extracted from $G_D^{layout}$ to derive the overall width of the set $V_{CLB}^{layout}$ as shown in the subsequent equation.

$$\text{width}_{V_{CLB}^{layout}} = \max_{\forall v \in V_{CLB}^{layout}} \{x(v)\} - \min_{\forall v \in V_{CLB}^{layout}} \{x(v)\}$$

For each row $R_i$, the number of #FreeCLBsInThisRow = #CLBColumnsOnArch − #CLBsTo-BePlacedInThisRow may now be distributed according to horizontal distances in $G_D^{layout}$. Therefore, each unit of distance between two successive nodes in a row is basically penalized with $$\frac{FreeCLBsToBePlacedInThisRow}{\text{width}_{V_{CLB}^{layout}}}$$

free slots.

The same is done for the initial free space in the row to the left border of the chip architecture. For two successive nodes in the CLBNodeList $v_j$ and $v_{j+i}$, the penalty counter p is consequently increased by $p_j$.

Like for the EQUAL distribution, $\lfloor p \rfloor$ CLB slots are left free between $v_j$ and $v_{j-1}$ and p is updated to $p - \lfloor p \rfloor$. By this strategy, the distribution of nodes in $G_D^{layout}$ is 'imitated' on the architecture and therefore in $G_D^{arch}$.

The DISTANCE distribution may assign the same number of nodes to each row $R_i$ (except for the last row) and the layout-aware distribution on the architecture may be realized by respective penalties between nodes within the rows. In the future, a more appropriate imitation of $G_D^{layout}$ on the architecture could be achieved by a respective vertical distribution of nodes. For example, a histogram of the vertical distribution of nodes in $G_D^{layout}$ could be calculated to partition the nodes more adaptively. Furthermore, other more sophisticated techniques are undoubtedly conceivable to consider vertical penalties.

The accumulation of penalties ensures that each basic penalty (fraction) $p_j$ is legally inserted nearby the node $v_j$. Without the accumulation, smaller distances ($p_j < 1$) would simply be globally neglected. The next paragraph describes the motivations behind the different distribution strategies.

Motivations of the distribution strategies: The principal arrangement of the nodes is the same for all presented distribution types as their relative position to each other is defined by their occurrence in $G_D^{layout}$ and by the two-dimensional sorting. The inserted penalties follow different purposes.

The CENTER distribution places the CLBs densely in the center of the architecture. As the blocks are generally connected with multiple elements, nodes representing CLBs (just like for MEMs or MULs) have much higher node degrees than the I/O nodes on average. The CENTER distribution may therefore be well suited to keep the many inner connections small while enlarging (only) the fewer connections' lengths between I/O and inner logic blocks.

Thus, the overall wirelength in the embedding may be relatively small. However, the overuse and the maximal channel occupancy can instead be expected to be relatively high as the connections have no good chance for low-stress detours. Thus, the routing time for a placement with the CENTER distribution is extended by the ripup and reroute phases. On the other hand, the expanded waves are relatively small so that creating the individual routes between two points may be possible in relatively short times.

The EQUAL distribution may work in the contrary way. Due to the free spaces between the CLBs, the routing may be more 'relaxed' because of many opportunities for detours. However, the distances between nodes are relatively large so that the overall wirelength may consequently become large and the routing of the individual connections requires more time. The EQUAL distribution is intended to produce an even dispersion of the nodes among the architecture.

Finally, the DISTANCE distribution is the main objective of the FieldPlacer method. It imitates the free (or unconstrained) situation in the force-directed layout with repulsive forces and may therefore find a good balance (equilibrium) between the two extreme options mentioned before. For example, regions with many nodes are expanded by the repulsive forces and weakly connected nodes can be carried further away from others due to small acting attractive forces.

In at least some embodiments, the equilibrium state of such a force-directed layout with repulsive forces results in a profitable trade-off between wirelength and overuse.

The NO distribution is primarily shown for comparison purposes. It has exactly the same order of nodes in each row than both the EQUAL and the DISTANCE distribution. Results for this distribution strategy can therefore be considered to investigate the impact of the introduced penalties on different measures of quality.

Figure 5B:
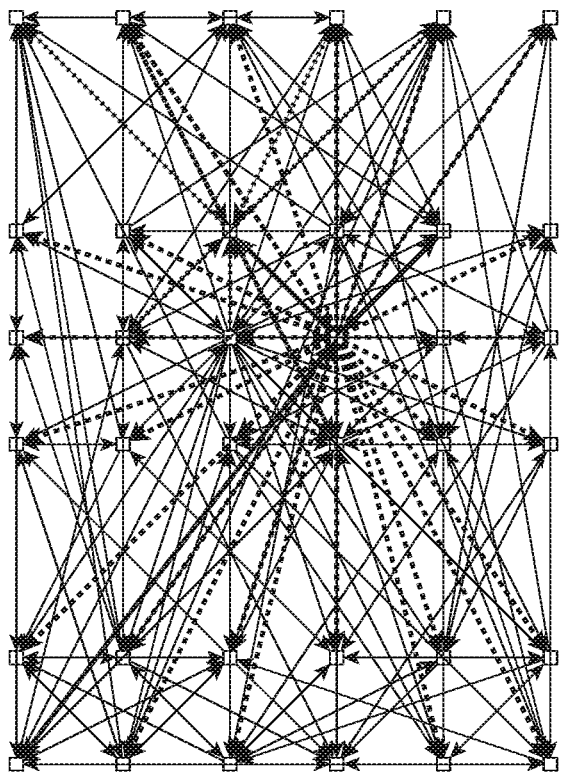
FIGS. 5a and 5b show embedding of the CLBs onto the architecture with a center distribution.
Figure 5A:
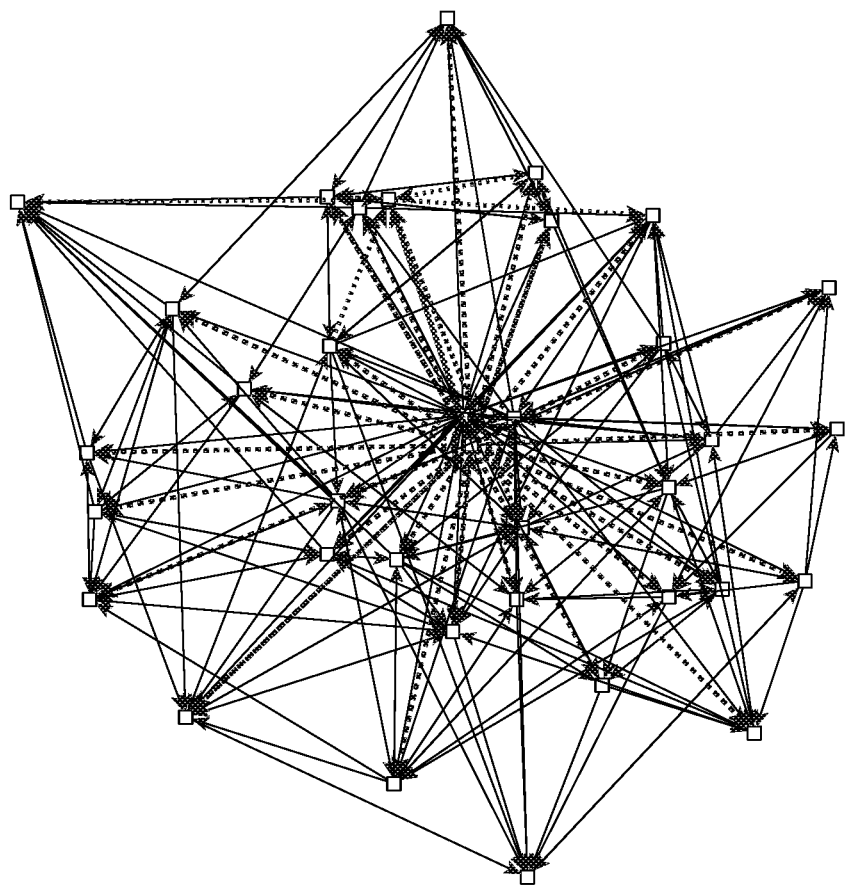

FIG. 5$a$; 5$b$ shows the embedding of the CLBs ($G_{CLB}^{layout}$ in FIG. 5$a$ and $G_{CLB}^{arch}$ in FIG. 5$b$) onto the architecture with the CENTER distribution. The figures show how the relative position of nodes to each other is preserved by the CLB embedding technique presented in this Section. Algorithm CLB Placement shows a summarizing pseudocode of the method.

The entire process was described with a constant number of CLBs per row. However, it is possible to have different numbers of CLBs in each row. Therefore, two arrays are used to store the information of how many CLBs are available and used per row, respectively.

able to create the embedding of the I/O pins from the graph layout, the I/O nodes and their coordinates $V_{IO}^{layout}$ are extracted from layout $G_D$ and stored in a linked list, the IONodeList. In addition, for each node in the list, the angle $\omega$ to the barycenter of the graph (BC) is stored as a further parameter. This angle is rotated to start (and end) with $-\pi$(and $\pi$) in the north-west.

The I/O nodes are basically grouped into four faces by sorting them according to their $\omega$-parameter. This results in a clockwise enumeration of the nodes in the IONodeList (beginning in the north-west). For the basic partitioning into the four I/O faces of the FPGA architecture, each node is assigned to either the North $$(-\pi < \omega(v) \le \frac{\pi}{2})),$$

the East ($-\pi/2<\omega(v)\le0$), the South $$(0 < \omega(v) \le \frac{\pi}{2})$$

or the West face $$(\frac{\pi}{2} < \omega(v) \le \pi),$$

(solely) based on its position $G_D^{layout}$.

Capacity legalization: Even though the FPGA contains enough I/O pins to satisfy the code's demands (ensured by the setup of the architecture), some faces may be overfull while others still have free capacities due to the simple partitioning concerning their angle to the BC described in the previous section. In that case, nodes may be redistributed into neighboring faces so that, in the end, no face is overfull.

For the partitioning of the (sorted) list, (only) the indices that contain the last node of each face have been stored as the split points of faces in the list. For the legalization of the capacities in the I/O faces, the following technique is applied. First, traverse the sorted list's split_points clockwise (North.end, East.end, South.end). If the capacity of the prospected face is exceeded (this.nb_nodes>this.capacity), the exceeding amount of nodes is transferred from the end

---

Algorithm CLB placement

--- procedure createCLBplacement(Arch FPGAArch , Graph $G^{layout}_D$, Enum Option.dist_type)
linked list CLBNodeList← extract $V_{CLB}^{layout}$ from $G^{layout}_D$
sort CLBNodeList ascendingly concerning vertical coordinates
partition the list into rows $R_i$
    for all rows $R_i$ do
        sort the nodes of $R_i$ in CLBNodeList ascendingly concerning horizontal coordinates
        if Option.dist_type==EQUAL or DISTANCE then
            calculate penalties between nodes        // see the 'Horizontal sort' subsection
            assign the sorted CLBs to repective CLB slots on FPGAArch skipping the free slots
        else
            assign the sorted CLBs to successive CLB slots on FPGAArch
        end if
    end for
    return the CLB slot assignment in the CLBNodeList
end procedure

---

4th Step—I/O placement (determining of the placement of the input/output blocks): Basic I/O partitioning: To be of this face to the beginning of the next face (clockwise) by adjusting the split_point this.end (last node's index of this face) for the sorted IONodeList. After this, the West face may still be overfull as it could, e.g., have 'received' exceeding nodes from the South face. Thus, the linked list's split_points are then traversed anticlockwise (South.end, East.end, North.end) and the number of nodes that exceed the capacity of the prospected face are passed to the anticlockwise neighbor by adjusting prev.end.

After both traversals, it may be guaranteed (by construction of the method and the architecture) that all faces' capacities are respected. Finally, the set of I/O nodes in each face is assigned clockwise to the faces slots on the architecture (I/O nodes from the sorted IONodeList are successively assigned to the North, East, South and West face), whereas each integer I/O block on the architecture generally comprises multiple I/O pins (eight for the aforementioned example 'Comprehensive Architecture'). The nodes have z-coordinates to distinguish between each blocks' pins. Thus, groups of eight successive nodes in the sorted IONodeList always have the same horizontal and vertical coordinate. In each face, the set of nodes is additionally centered so that free I/O pins in a face are equally distributed to the outer ends of the face.

This technique locally transfers as many nodes as necessary but as few as possible to neighboring faces. The time complexity of the legalization method (only) depends on the number of faces and is thus constant for given architectures (independent from the design).

Even though the introduced embedding of both the CLBs and the I/Os is principally preserving the relations of positions in the graph layout, the detailed positioning is inevitably disturbed by the embedding on the restricted integer grid. To take the actual embedding of the CLBs from the preceding step into account, an additional optimization step may be performed after the I/O legalization.

The idea is to take the legalized I/O partitioning and rearrange the I/O pins in each face with a fast heuristic to minimize wirelengths and wire-crossings. Minimizing crossings can be very beneficial as the short connections between outer CLBs and I/O faces usually might not have too many detour possibilities in heavily used regions of the routing architecture.

The problem of minimizing the wire-crossings between I/O nodes and CLB nodes is basically a '(one-sided) bilayer straightline crossing minimization problem'. The CLB nodes of all CLB-to-I/O-connections define the fixed layer of the problem and the I/O nodes are on the free layer. The fact that the CLB nodes are not necessarily on one horizontal line can be neglected. Unfortunately, the problem is known to be NP-hard. In this work, the barycenter-heuristic is applied instead.

To each node on the free layer, the barycenter heuristic assigns the arithmetic mean of the horizontal coordinates of connected fixed nodes (CLBs) and subsequently sorts the free nodes (I/Os) according to this average value. This procedure can analogously be performed for vertical parallel layers.

---

Algorithm: I/O refinement by barycenter heuristic procedure improveIOarrangement(Graph $G_D^{layout}$,NodeList CLBNodeList, NodeList IONodeList)
   extract NodeConnections E between I/Os and CLBs from $G_D^{layout}$
   for face=North,South do
     for all nodes v in this face do
       extract coordinates of CLBs and I/Os from the CLBNodeList and the IONodeList

---

-continued

Algorithm: I/O refinement by barycenter heuristic $$\bar{x}_{IO}(v) = \frac{1}{\delta(v)} \sum_{(u,v) \in E} x_{CLB}(u)$$

end for
     sort the face's part of the IONodeList ascendingly concerning $\bar{x}_{IO}(v)$
     assign updated coordinates to the nodes with respect to their sorted order
   end for
   for face=East,West do
     for all nodes v in this face do
       extract coordinates of CLBs and I/Os from the CLBNodeList and the IONodeList $$\bar{y}_{IO}(v) = \frac{1}{\delta(v)} \sum_{(u,v) \in E} y_{CLB}(u)$$

end for
     sort the face's part of the IONodeList ascendingly concerning $\bar{y}_{IO}(v)$
     assign updated coordinates to the nodes with respect to their sorted order
   end for
   return the refined coordinates in the IONodeList
end procedure

---

Applying this heuristic to all four faces of the architecture may lead to a CLB-aware reordering of the I/O nodes in each face. The improvement of wirelengths by the reordering can be measured by accumulating the pure horizontal (North and South face: $|x_{I/O}(v)-x_{CLB}(u)|$) or the pure vertical (East and West face: $|y_{I/O}(v)-y_{CLB}(u)|$) distance between connected nodes v (I/O) and u (CLB). For example, this displacement would be zero if a totally crossing-free arrangement is found where each I/O node connects to a CLB in the same column or row.

Summarizing, the barycenter heuristic can improve the placement of the I/O nodes after fixing the CLBs significantly, especially for codes with relatively high numbers of I/O blocks. Due to the centering in the I/O face, codes with only very few I/O connections can naturally not be improved too much. However, in such designs it is also not that important. After this fourth step, both the CLB blocks and the I/O pins are set to their final position in the basic FieldPlacer method. Subsequently, final optimizing exchanges may (possibly) take place in the second energy phase or the local refinement.

Multiple components in the design: The designs and therefore the representing graph $G_D$ may have more than one component (unconnected subgraphs) (e.g. more than one circuit). The $FM^3$ algorithm has a powerful postprocessing step to combine the individual layouts of all components of a graph to a compact common drawing. The entire placement of such designs in the FieldPlacer method is directly realized based on this common drawing. Due to the separate layouting of the components with subsequent consolidation, each component may get a virtually separate part of the chip architecture with short resulting connections on the routing architecture.

The basic FieldPlacer method assumes a free (unconstrained) assignment of all nodes on the architecture. However, if there are (user-)fixed blocks in the design, they can also be taken into account as the enhanced FieldOGDF implementation can handle such fixed nodes. This is exploited in the second energy phase. Thus, inputs with a priori fixed nodes can be considered in the FieldPlacer method. In the case of a priori fixed I/O nodes, an initial free force-directed layout may be performed to extract a good scaling of the nodes' positions for the forces in the subsequent simulation.

The I/O assignment technique of the FieldPlacer can also be used for other numerical force-directed approaches basing on equation systems which require a priori fixed I/O nodes. In such cases, the FieldPlacer could be used to create a good I/O assignment for other placers rapidly. The improvement achieved by the use of the barycenter heuristic alone shows that a free positioning of the I/O nodes can actually be quite beneficial.

Nevertheless, fixed I/O blocks also appear in certain situations in 'productive design flows' and random pin assignment is a well-known issue for FPGA designs. The application of the proposed rapid FieldPlacer I/O assignment may be used in such cases (even without all the other embedding techniques of the FieldPlacer).

In addition, different I/O block types may be considered by performing a separate clockwise enumeration for each I/O type and subsequently splitting the IONodeLists with respect to the architecture's equipping.

Finally, a splitting of the clockwise enumerated IONodeList into less than four faces can easily be performed, e.g., in the case that (only) a small fraction of a large FPGA is used for a design which is placed in one corner of the chip. In such cases, it can be desirable to connect (only) to the two nearby I/O faces.

5$^{th}$ Step—Special blocks (MEM+MUL), e.g. determining 170/180 of a placement of a plurality of memory blocks/a plurality of special function blocks:

Finally, further heterogeneous block types may be placed. Two main characteristics of such blocks in common designs are used. First, they appear (only) in relatively small numbers and, second, they generally have a high node degree (as they are strongly connected due to many in- and out-pins). This is due to their high inner complexity which is the essential motivation to use such special elements in a design. Each of these special blocks is now placed after the general purpose elements of the FPGA (CLBs and I/Os) have been assigned to suitable locations. For this purpose, all memory blocks (MEMs) are first extracted from the force-directed layout $G_D^{layout}$ and stored in a linked list together with the information about connected I/O and CLB nodes for each of those. Then, the barycenter ($\bar{x}$, $\bar{y}$) of all such connected nodes' coordinates on the architecture (taken from $G_{CLB+IO}^{arch}$) is calculated for each memory block and the number of connections (the node degree) is stored. The memory blocks are subsequently sorted descending according to their node degrees. Finally, they are—in their sorted order—assigned to the positions that are nearest to the beforehand calculated barycenters of connected nodes (that have already been embedded on the architecture) until all blocks have been placed. The same procedure is performed independently for the multipliers (MULs). Connections between different special types of blocks may also be considered for later placed special blocks.

As already mentioned, these special elements may be placed after all other 'ordinary' ones. The idea is to assign them the best suitable available place with respect to the placed CLBs and I/Os and to prioritize such elements that influence many connections on the chip to keep the overall wirelength small. Due to the fact that the number of such elements is nowadays still relatively small, a pretty naive implementation of the assignment may be used. In the future, more advanced techniques, for example, basing on a quadtree to find the nearest available slot, may be applied.

Even though the number of heterogeneous blocks may be small, they often have many in- and output pins and, thus, their influence is important and can become crucial for the wirelength in the placement and for good routability. It is therefore reasonable to place these nodes with respect to all already placed blocks taking their final coordinates from $G_D^{arch}$ into account.

After these 5 phases, all elements are placed on the FPGA and the basic FieldPlacer placement $G_D^{arch}$ is produced by combining $G_{CLB}^{arch}$, $G_{IO}^{arch}$ and $G_{MEM+MUL}^{arch}$.

Figure 6:
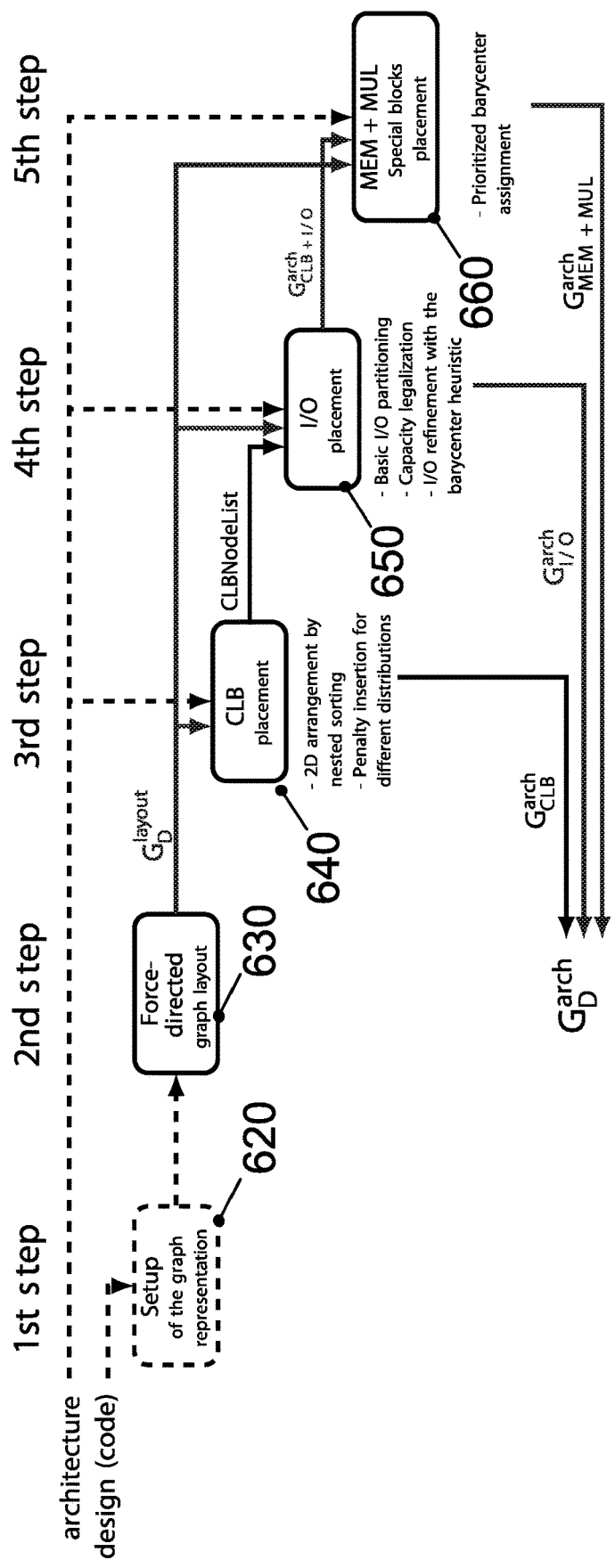
FIG. 6 illustrates the overall workflow of the basic FieldPlacer workflow.

FIG. 6 illustrates the overall workflow of the basic FieldPlacer workflow. The workflow comprises a setup of the graph representation 620 (Step 1, e.g., calculating 120 the circuit graph). The workflow further comprises determining 630 a force-directed graph layout of the graph (Step 2, e.g., determining 130 the force-directed graph layout), CLB placement 640 (Step 3, e.g., determining 140 the placement of the plurality of logic blocks), I/O placement 650 (Step 4, e.g., determining 150 the placement of the plurality of input/output blocks), MEM+MUL Special blocks treatment 660 (Step 5, e.g., determining 170/180 of the placement of the plurality of memory blocks/special function blocks).

---

Algorithm Special heterogeneous blocks' placement

--- procedure EMBEDSPECBLOCKS(Arch FPGAArch, Graph $G_D^{layout}$, Graph $G_{CLB+IO}^{arch}$)
  linked list MEMNodeList ← extract $V_{MEM}^{layout}$ from $G_D^{layout}$
  linked list MULNodeList ← extract $V_{MUL}^{layout}$ from $G_D^{layout}$
  linked list MEMSlots ← extract all memory slots from FPGAArch
  linked list MULSlots ← extract all multiplicator slots from FPGAArch
  sort the MEMNodeList descendingly concerning the nodes' degree in $V_{MEM}^{layout}$
  sort the MULNodeList descendingly concerning the nodes' degree in $V_{MEM}^{layout}$
  for all v∈G MEMNodeList and for all v ∈ MULNodeList do
    extract (x,y) coordinates of connected CLBs and I/Os from $G_{CLB+IO}^{arch}$
    //calculate the barycenter of all connected and embedded elements ($\bar{x}(v),\bar{y}(v)$)

$$\bar{x}(v) = \frac{1}{\delta(v)} \sum_{(u,v)\in E_D} x(u)$$

$$\bar{y}(v) = \frac{1}{\delta(v)} \sum_{(u,v)\in E_D} y(u)$$

//calculate the distances of the barycenter to each available slot
    for all suitable slots (x(s),y(s)) on FPGAArch do
      dist(s) = $\|(\bar{x}(v), \bar{y}(v)) - (x(s), y(s))\|_p$
    end for
    //embed the special block
    select slot s with minimum dist
    assign coordinates of s to v in MEMNodeList or MULNodeList
    remove slot s from the respective list (MEMSlots or MULSlots)
  end for
  return coordinates for all special blocks in MEMNodeList and MULNodeList
end procedure

---

In an implementation of FieldPlacer, the imitation of the force-directed graph layout through the DISTANCE distribution may achieve the good results in different categories. It therefore combines the aforementioned positive characteristics of force-directed layouts with attractive and repulsive forces. The attractive forces tend to keep distances between connected nodes small (for small bounding box cost, critical path delay and overall wirelength) while the repulsive forces keep nodes away from each other and counteract highly dense regions in the layout (basically for reduced overuse of wire-segments in a subsequent routing phase).

Overuse: The FieldPlacer congestion-driven maze router was introduced to simulate an 'ideal routing' without capacity restrictions on the routing architecture in order to extract a measure for the routability of a placement before the actual routing takes place. In evaluations of an exemplary implementation of FieldPlacer, it may be shown how the overuse of routing resources matches the distribution types' shapes as the overuse mainly takes place due to inter-logic-block connections. There is almost no overuse in the outer regions of the architecture because there are fewer connections to I/O than between the inner logic-blocks and probably also because of the good I/O placement through the application of the barycenter heuristic.

As the estimation of the overuse simulates the routing under idealized circumstances, the actual routing may in fact look different and may, due to many different influences (like the connections' order and the resolving of congestions) not necessarily behave as the overuse norm tries to predict. A comparison between the actual routing and the overuse estimation may show that a correlation between the overuse estimation and the final maximal channel occupancy is, to a certain extent, measurable. For example, the distribution strategy with the smallest average overuse (the EQUAL distribution) is the one with the smallest maximal channel occupancy. However, both are still not 'exact' measures but (only) (more or less rough) estimates for the general routability of a design's placement.

The overuse of the EQUAL and the DISTANCE distribution may be generally much smaller than the one of the other two FieldPlacer distribution strategies. As a consequence, for these two strategies, all codes that were routable with VPR's placement by simulated annealing were finally routable with the basic FieldPlacer placement. For the CENTER distribution, three times as many codes were not routable (for a given architecture with specific restrictions concerning the channel widths). This actual routability of the placement does in fact correlate very well with the introduced overuse estimation performed by the FieldPlacer congestion-driven maze router. Investigations may additionally show that the routing time does not necessarily follow the trend of the overuse or the maximal channel occupancy. This is based, among other things, on the fact that even though a placement of a design might be routable with smaller maximal channel occupancy than another placement, both can still be routable at all so that a legal routing could be generated in the same time, just with different requirements for the channel widths.

To measure the quality of the placement procedure, the critical path delay can (only) be estimated after the placement as the routing influences connections' wiring and wirelengths and thus the resulting (wire) delays. Measurements show that the correlation between the estimated and the final critical path delay is almost perfectly positive. Thus, the estimated critical path delay after placement may be considered to estimate the speed of the design on the architecture already after the placement and without the actual routing in the following.

The investigations showed that the different distribution strategies actually have the previously assumed characteristics. It has been shown that the strategies differ concerning the different quality measures and that the new introduced overuse norm can be helpful to predict the routability of a placement. It can therefore be used to choose either a 'well routable' placement out of several tries or to choose, for example, the right distribution strategy for the demands of the designer as better routability normally comes at the price of increased wirelength (which correlates positively with the critical path delay and the bounding box cost). Thus, wirelength minimization and routability can be contradicting goals in general. However, the DISTANCE distribution, which imitates the arrangement of the force-directed graph layout, may be promising at combining good routability and short wirelengths and is therefore the strategy of choice in the following.

As the actual routing time is generally very long, it may be crucial to have a placement which supports the routing process. In fact, the routing can take many (3 to >400) times longer than the placement time with VPR's placer and router in the default configuration although this, undoubtedly, depends on the specific router (and placer) that is used. Apart from the routing time, the general routability of placements has been shown to be influenceable by the distribution strategy.

Due to the good estimation of the critical path delay, the basic FieldPlacer could, for example, be applied to quickly check how changes in the design may help to achieve a desired clock speed before placing and routing the design in detail.

FieldPlacer Extensions:

$5\frac{1}{2}^{th}$ Step—Second energy phase: The biggest portion of the runtime in the basic FieldPlacer may be required to calculate the repulsive forces in the force-directed graph layout in step 2. Simulating (or even solving) a (sparse) system without repulsive forces, but instead with fixed I/O nodes, may work much faster. However, it was reasoned extensively that fixing the I/O nodes a priori can influence the later design a lot and may not be the idea of at least some embodiments. Nevertheless, assuming that the I/O nodes are as well distributed as with the basic FieldPlacer result, the question remains whether the attendance of repulsive forces is necessary or advantageous at all. To investigate this, a second energy phase can be conducted (e.g. through determining 152 of the further force-directed layout and determining 154 of the refinement of the placement of the plurality of logic blocks) after the basic FieldPlacer has been applied. In the second energy phase, all I/O nodes are fixed and (only) attractive forces between connected nodes are taken into account. The resulting force system is:

$$F_{attr}^{(u,v)}(v) = \begin{cases} \log\left(\frac{\|p_v - p_u\|_2}{l^{zero}(e)}\right) \cdot \|p_v - p_u\|_2 \cdot (p_u - p_v) p_v \neq p_u \\ 0 \text{ otherwise} \end{cases}$$

$$F_{attr}(v) = \begin{cases} 0 & \text{if } v \text{ is fixed} \\ \sum_{u|(u,v)\in E} F_{attr}^{(u,v)}(v) & \text{otherwise} \end{cases}$$

$$F_{res}(v) = \lambda_{attr} \cdot F_{attr}(v) \to 0^{target}$$

Optimizing this system is twofold. On the one hand, the absence of repulsive forces may help to escape from local minima (that were facilitated by the repulsive forces in step 2) and, on the other hand, nodes may be not kept away from each other by their reciprocal repulsion. Finally, such an 'amendment' respects the final I/O positions and could therefore be able to improve especially the CLB placement which was performed solely based on $G_{CLB}^{layout}$ and without the explicit knowledge of the later embedded I/O positions in $G_D^{arch}$.

As the initial layout of this phase may already be quite good and may (only) be improved, the initial positions for all nodes are of course taken from the embedded layout of the FieldPlacer (instead of placing the nodes randomly like in the first phase). Due to the good initial solution, the multi-level ability of FieldFM³ may be deactivated.

Generally, the more iterations are performed with the fixed outer I/O nodes, the smaller becomes the wirelength in $G_D^{2ndlayout}$. However, as the distances of the nodes to each other might not be preserved in the embedding, this does not necessarily mean that the embedded result on the architecture in $G_D^{2ndarch}$ can also benefit from many iterations.

In an exemplary implementation, the force-directed layout may improve the wirelength in $G_D^{2ndlayout}$ by up to 69.43% after 100000 iterations while the wirelength in the embedded layout $G_D^{2ndarch}$ becomes worse and worse. Even for codes where the embedding can be performed in a more structure-preserving way, the final improvement due to this second energy phase may be rather small and such a refinement may take a significant amount of time (depending on the density of the graph), even though the repulsive force calculations might not be carried out. Together with the rather poor overall improvement, (only) very few, if any, iterations of such a second energy phase might be performed.

This shows why the aforementioned approaches, which base on force systems without repulsive forces and solve the system for minimal wirelength, may require an intensive hierarchical partitioning scheme after the basic layout. The usage of repulsive forces makes it possible to embed the created layout with (only) small displacements and, therefore, to benefit from the fine-grained properties of the layout without the need for a 'universal' partitioning. Altogether, these results underline the good quality of the embedding through the FieldPlacer method.

Finally, (only) very few additional iterations for fine-grained improvement of the situation might be performed in general. Space may be wasted in the outer regions of the graph because all nodes are contracted to (and by) the inner regions. This is based on the very few attractive forces from the fixed surrounding I/O nodes which are dominated by the attractive forces in the strongly connected inner parts of the graph. A structure-preserving embedding onto a fairly filled chip architecture is not possible in such situations.

Other choices of fixed node sets are directly possible in the FieldPlacer. For example, it can also be configured to fix all but the CLB nodes.

2nd Step with different distance norms: Some approaches in the field of force-directed placement techniques measure and model the distances between connected blocks usually with the Euclidean distance. However, the wiring on the architecture instead follows the Manhattan distance. In order to pursue this fact, the FieldPlacer supports the usage of not only the Euclidean distance ($\|\cdot\|_2$ norm) in the force model for the attractive forces, but also contains the option to use the Manhattan distance ($\|\cdot\|_1$ norm) or the Chebyshev distance ($\|\cdot\|_{max}$ or $\|\cdot\|_\infty$ norm).

In the FieldPlacer method, the norm to calculate distances can be arbitrarily varied. If the FieldPlacer is configured to use, for example, the Manhattan distance to model the wirelength of connections, the original force model from FM³ may change to:

$$F_{rep}^u(v) = \begin{cases} \frac{1}{\|p_v - p_u\|_1^2} \cdot (p_v - p_u) & p_v \neq p_u \\ 0 & \text{otherwise} \end{cases}$$

-continued $$F_{attr}^{(u,v)}(v) = \begin{cases} \log\left(\frac{\|P_v - P_u\|_2}{l^{zero}(e)}\right) \cdot \|p_v - p_u\|_2 \cdot (p_u - p_v) & p_v \neq p_u \\ 0 & \text{otherwise} \end{cases}$$

$$F_{rep}(v) = \sum_{u \in V \setminus v} F_{rep}^u(v)$$

$$F_{attr}(v) = \sum_{u|(u,v) \in E} F_{attr}^{(u,v)}(v)$$

$$F_{res}(v) = \lambda_{rep} \cdot F_{rep}(v) + \lambda_{attr} \cdot F_{attr}(v) \to 0_{force\ equilibrium}^{target}$$

In some examples, the norm calculations for the repulsive forces can also be performed with other norms in the FieldPlacer.

Naturally, nodes of a graph that are connected to a common center tend to be spread on circular perimeters around this center in a force equilibrium obtained from a force-directed layout method. This is based on the fact that the strength of attractive forces between nodes depends on their distance to each other and that, therefore, nodes with the same distance to the center experience the same force so that an equilibrium state is reached when repulsive and attractive forces compensate each other on the unit circle of the applied p-norm.

While the Euclidean graph layout results is circular graphs, the two other layouts have an 'orientation' due to their different distance functions. The Manhattan graph has a diamond shape and the Chebychev graph has a square shape. Thus, as the resulting layouts do not all have a quadratic shape (as the embedding on the chip has to have), it may be advantageous to rotate the layouts appropriately to match the shape of the chip. Without a rotation, the displacement of nodes in the embedding (from $G_D^{layout}$ to $G_D^{arch}$) can become large and could even eradicate the advantages of the other norm usage as the created diamond and the square chip shape do not match at all. The shape of the resulting force-directed layout may match better with the chip's shape the larger p is.

Thus, applying the Chebychev distance ($p \to \infty$) results in a perfectly matching (outer) graph shape. However, the Manhattan norm respects the routing architecture perfectly. To make the Manhattan result also match the chip's shape, it could be ordinarily rotated by 45° (in the Euclidean sense). Even though an 'ordinary Euclidean' rotation does not change distances between any two points under the Euclidean norm, this is not the case for other metrics. Thus, as the distances on the chip may be minimized concerning the Manhattan norm for the wiring, such a rotation actually influences the Manhattan distances between nodes in the graph.

For a complete graph, this degradation is the maximal possible value as the elongation of an edge caused by the rotation can (fully or partially) be compensated by other edges with different initial orientations. The rotation benchmarks on 'real world graphs'—just as many other performed benchmarks—have shown that the effect is in fact much smaller due to rather 'un-orthogonal' graph structures.

One question is whether it is profitable to optimize for the Manhattan distance directly in the force model and either 'loose wirelength quality' in the rotation step or have larger displacements in the embedding step. Larger rotation angles that are not between 0° and 90° lead to periodical results due to the 'horizontal and vertical (orthogonal) characteristic' of the Manhattan distance.

First of all, rotating the resulting graph $G_D^{layout}$ created with the Euclidean distance in the force model may improve the graphs overall (Manhattan) wirelength, but the optimal angle might not be predictable. This is simply based on the fact that the graph produced with the Euclidean distance has no 'distinct orientation', in other words, there is no trend how the final circle is rotated in the force-directed minimum because the rotation does not influence the layout's energetic potential. However, this also means that the general displacement (concerning the shape) is the same for all rotations.

While the Manhattan graph has the smallest overall wirelength in its resulting energy-minimal layout (with no rotation as it was particularly optimized towards the distance norm of the wirelength), the Chebyshev graph has the smallest wirelength in $G_D^{layout}$ if it is rotated by 45° and is, therefore, similarly oriented as the Manhattan graph.

Even though the wirelength can be optimized when rotating the chip, this is still performed with the layout graph layout $G_D$ before the actual embedding onto the chip. Once again, as the wirelength is calculated by Manhattan distance between connected blocks, both the (oriented) Manhattan and Chebyshev results have the smallest overall wirelength in $G_D^{layout}$ in the diamond shape rotation of the 1-norm unit circle. This means that the Manhattan result might not be rotated at all and the Chebyshev graph may be rotated by approximately 45° to minimize the distances in $G_D^{layout}$. On the other hand, a diamond shape of the graph $G_D^{layout}$ does not match the shape of the chip architecture. Thus, larger displacements are introduced when embedding the layout onto the restricted quadratic integer grid for $G_D^{arch}$ (with all the different distribution strategies). This is based on the fact that nodes may be moved further away from their relative position in a diamond-shaped $G_D^{layout}$ to embed them on the square-shaped chip. In fact, further repeated benchmark results have shown that—on average—the deterioration of the wirelength by these displacements to create $G_D^{arch}$ redeems the advantage of the rotation applied to $G_D^{layout}$ in case of using the Chebyshev distance for $G_D^{layout}$ while it is profitable to rotate the result of the Manhattan graph by 45°. Both graphs consequently match the shape of the chip while not necessarily minimizing the wirelength in $G_D^{layout}$. Thus, matching the chip's shape to preserve the arrangement of nodes to each other as well as possible is more favorable.

Due to the unpredictable optimal rotation angle for the Euclidean graph, it may be desirable to try different angles between 0° and 90° and choose the best one. This rotation of the Euclidean graph is, due to its choice of the best angle and the relatively constant outer shape, undoubtedly profitable but accordingly more time consuming.

Considering the embedded results in $G_D^{arch}$, the following strategies are defined for the final rotation of the energy-graphs.

Norm strategy—Euclidean: Rotate the graph in 10 steps from 0° to 90° and choose the best rotation angle.
Norm strategy—Manhattan: Rotate the graph by 45° for small displacements in $G_D^{arch}$.
Norm strategy—Chebyshev Do not rotate the graph at all for small displacements in $G_D^{arch}$.

Even though the overall improvements after embedding are relatively small (partially due to the fact that the chips are principally very densely filled with logic blocks), the best strategy is to perform a force-directed layout with the Manhattan distance in the force model, rotate $G_D^{layout}$ by 45° and embed it with the desired CLB distribution strategy.

Benchmarks show the impact on the average wirelength and also on the overall wirelength (after embedding) of all benchmark codes (again relative to the results of full simulated annealing runs in VPR). The advantage obtained from using the Manhattan norm is even higher regarding the overall total wirelength sum instead of measuring the average advantage per code shows that the impact of the 'right' norm is greater for larger designs with larger overall wirelengths. Benchmarks additionally show that using the Manhattan norm with its 45° rotation strategy even results in a reduced overuse. In summary, the impact of the different norms on the final embedded wirelength in $G_D^{arch}$ is, nevertheless, averagely relatively small and is, therefore, rather a fine-tuning as the basic arrangement of nodes is not influenced too significantly by the norm itself. For example, the influence of the distribution strategy is generally much larger.

However, the CENTER distribution, for example, results in shortest overall wirelengths when using the Manhattan distance in the force model with subsequent 45° rotation of the layout graph. This shows that the Manhattan norm not only improves pure distances between connected nodes (by smaller penalties in the DISTANCE distribution strategy), but it also slightly improves the general arrangement of nodes as the CENTER distribution packs all nodes densely (in $G_D^{arch}$) into the same area of the chip for each outcome of layout $G_D^{layout}$.

Results, especially from the Chebychev graphs, show that the rotation towards a diamond shape is generally the best choice for $G_D^{layout}$. However, as the chip architecture often has a square shape, the diamond arrangement might not be preserved and the displacements between $G_D^{layout}$ and $G_D^{arch}$ in the embedding phase can deteriorate the good original wirelength results. The results also show that a diamond-shaped chip or, equivalently, a square chip with 'diagonal routing architecture' could actually be advantageous to minimize the wirelength on the chip.

In some examples, the second energy phase might not be applied and the force system with the Manhattan distance with subsequent 45° rotation of the layout graph may be used to obtain the best results. The DISTANCE penalty option might generally be used in the following for a good balance between performance (short wirelengths) and routability of the placed design.

6th Step—Local refinement: Simulated annealing may be a powerful method to solve the QAP problem as it is relatively independent from the initial solution and leads to good results in reasonable times. Even though the fundamental local search approach may lead to local optima in short times, the quality of obtained solutions strongly depends on the initial configuration as the algorithm finally stops when the first (nearest) local optimum has been found. However, local search can be a profitable technique to improve results that are already of good quality very fast as it does not deteriorate the solution at all.

In fact, after steps 1 to 5 of the FieldPlacer method, the obtained result is already of a relatively high quality. Thus, applying a final local search can be expected to be both advantageous and fast.

Benchmarks also showed that the simulated annealing (SA) approach implemented in VPR, which was tuned over many years, leads to rather good results and that the bounding box cost function is an accurate norm for several optimization goals like wirelength, critical path delay or even the overuse as it actually takes all influencing effects into account. As a consequence, a local search (which can be implemented essentially based on the VPR SA approach and especially on its cost function) can finally be performed to improve the created placement. For that, the VPR SA method is called with an initial system temperature of 0. In that way, (only) improving swaps are accepted and the bounding box cost of the layout can consequently (only) become smaller. In addition, the idea of shrinking the regions (the frames) from which the pairs of blocks are taken is used to make global swaps in the beginning and become more and more local if fewer swaps are accepted in the process.

Due to the fact that the temperature is 0 and that consequently (only) improving swaps are accepted, the stopping criterion of this 'cold annealing' approach or, more precisely, of the local search method, can be simplified. In the VPR SA method, a number of inner iterations #inner_iter=annealing_sched.inner_num·$|V_D|^{1.3333}$ (with the default configuration of annealing_sched.inner_num=1.0 is performed in each iteration block. Depending on the number of successful swaps, the frame to choose the swap-candidates from is shrunk or enlarged and the next iteration block is processed. For the following extended FieldPlacer benchmarks, the method stops if the improvement of the bounding box cost in one such iteration block is smaller than 1%.

In summary, the 6th step (the local refinement) can be seen as a simulated annealing with starting temperature 0 and, therefore, improves the layout up to the nearest local optimum of the objective function. While a general simulated annealing approach overcomes local optima by accepting deteriorating swaps in the beginning of the method, this task is carried out by the preceding force-directed multilevel layout of the basic FieldPlacer which provides the initial solution for this local search.

However, it may already be mentioned that, even including the local refinement, the extended FieldPlacer approach may still be remarkably faster than the VPR SA method. The number of performed iteration blocks was limited to 100 in the extended FieldPlacer implementation to restrict the maximal runtime. The actually performed number of iteration blocks until the improvement fell below the threshold of 1% has in fact been significantly smaller in benchmarks.

Within the FieldPlacer method, a very large proportion of the time is spent to create the force-directed graph layout by the spring embedder approach. The overall presented embedding itself only needs a very small time span for all codes.

The results of the extended FieldPlacer along with the LocalRefinement show that, on average, this approach leads to resulting placements that are comparable to those of the VPR SA approach concerning all the mentioned quality metrics. The basic FieldPlacer layout is used as a good starting point for a LocalRefinement with reducing 'swap-frame'. Even though the resulting quality is comparable, the runtime of the FieldPlacer based placement is up to 10 times smaller (in VTR 7.0) and the runtime advantage of the extended FieldPlacer increases with larger inputs due to an actually smaller runtime complexity of the method.

Theoretical runtime behavior of the FieldPlacer: Like before, $V_D$ and $E_D$ represent the nodes and edges of the designs' graph representations ($G_D$). Most of all steps are dominated by sorting of nodes that can be done in $O(|V_D| \log |V_D|)$ time. Traversals of all edges take additional $O(|E_D|)$ time so that the overall theoretical runtime of the FieldPlacer (without local refinement) is $O(|V_D|\log|V_D|+ |E_D|)$. Due to the fact that the number of MEM/MUL nodes is very small (in general), the actual implementation uses a simple $O(|V_{MEM\_MUL}|^2))$ approach in Step 5 to avoid the setup of a quadtree. For upcoming architectures with other conditions, this can easily be exchanged to an appropriate method with $O(|V_{MEM\_MUL}|\log|V_{MEM\_MUL}|)$ runtime. However, like in the $FM^3$ algorithm, this will (only) make sense for relatively large numbers of such special nodes. As the slots on the architecture are relatively evenly distributed, a very simple quadtree construction could in fact be used. As a result, the FieldPlacer does not extend the theoretical runtime of the included $FM^3$ algorithm.

In practice, the runtime of FieldPlacer's embedding methods is significantly smaller than the time needed to perform the graph layout. A practically faster implementation of a spring embedder-based force-directed graph layout routine, like the work of Gronemann in OGDF(Open Graph Drawing Framework: FastMultipoleMultilevelEmbedder), could indeed help to improve the runtime of the overall FieldPlacer method even more. However, it may be investigated if such an approach without multipoles is still as accurate as $FM^3$ and if an accurate edge length steering can be integrated.

The runtime of the LocalRefinement in the FieldPlacer implementation is $O(|V_D|^{1.3333})$. This is due to the fact that (per default) each iteration block performs $|V_D|^{1.3333}$ swaps and that the number of these iteration blocks is limited to 100 in the FieldPlacer.

Apart from the introduced heterogeneous FPGA architecture with I/O, CLB, MEM and MUL blocks, other types or even utterly different architectures can easily be integrated into the framework. Depending on the typical number of elements of such a new block type and its influence on the placement quality, an appropriate execution point in the consecutive FieldPlacer steps has to be chosen. In the following, some ideas for such integrations are given.

Non-uniform CLBs: For extended architectures with non-uniform CLBs (e.g., with CLB types CLB1 and CLB2 having different sizes/numbers of LUTs), the FieldPlacer method could be applied with small adaptions. All steps, except for the CLB placement, could operate exactly the way that has been explained before. The CLB placement could take the energy-minimized graph layouts from the force-directed graph layouts and partition the CLB nodes into node sets of type 1 (CLB1) and those of type 2 (CLB2). After that, the CLB slot assignment can be performed independently for these types with the presented approach including the different distribution strategies. Therefore, a distribution (solely) for the CLB1 slots on the target architecture can be considered (based on the availability of type 1 CLBs on the chip) and the type 1 CLBs can be embedded with a chosen distribution strategy. Subsequently, this could be done with the type 2 CLBs (CLB2) in the same way. For sure, more than 2 CLB types are possible in that way.

Further special block types: If there are additional special block types (like further DSPs) which are (only) sparsely available on the architecture, the placement of the special blocks could simply be repeated with the new block type to assign such nodes to appropriate slots on the chip.

3D-FPGAs: The method can even be extended to place layouts for 3-dimensional FPGAs. For that purpose, a 3-dimensional force-directed layout can be performed similarly to the $FM^3$ approach with 3-dimensional coordinates, e.g., with a corresponding 3-dimensional multipole development and a 3-dimensional version of Hachul's 'sun-planet-moon' multilevel model.

The 3-dimensional graph layout $G_D^{layout}$ could be embedded by dividing the nodes in horizontal slices (basically ordered by their z-coordinate and partitioned according to an architecture-related distribution, similarly to how it is done in the CLB placement of the FieldPlacer for the CLBs). Then, a 2-dimensional embedding for each of these slices can be performed according to the corresponding layer in the 'FPGA cube'. To obtain a resulting placement, the 2-dimensional slices finally may be stacked with respect to their z-coordinate.

However, it can be expected that the inter-slice communication in the layout and the arrangement of I/O resources (and many other more specific effects) in such hardware circumstances will demand for additional optimization steps.

A rotation strategy for rotating the force-directed graph layout is automatically set with respect to the chosen metric but can be altered by a user in the same simple way (e.g., by fmmm.innerrotationstrategy(ROT_45) for a 45° rotation). Instead of rotating each component of a graph after the other (like it is done in the original $FM^3$ implementation before the compaction to optimize the area of each component in the drawing), the components are rotated simultaneously in FieldFM$^3$. This is important when using the EUCLIDEAN distance and choosing the best rotation angle out of, e.g., 10 angles between 0° and 90° as the evaluation of the Manhattan wirelength has to be conducted for all graph components concurrently for each angle to choose the best one.

Handling and usage of fixed nodes in FMMM: The node object in FieldOGDF got an additional parameter to store whether a node is fixed or free. This is necessary to perform the second energy phase and, in the future, to handle a priori fixed nodes. To preserve the multilevel functionality in this idea, the fixed or free status is inherited from a finer level to a coarser one. Whenever a cluster node of a coarser representation in the quadtree contains at least one fixed child node, this cluster node is accordingly also fixed. Consequently, a (cluster) node on any level is (only) moved if it is not fixed, otherwise the node always remains in its position. Whenever the movement of a free node that is connected to a fixed node has to be calculated, the attractive and repulsive forces are not split between both nodes but are acting entirely on the free node.

Handling several nodes in the same place in FMMM: Due to the fact that several I/O nodes may be in the same position on the architecture, the calculation of repulsive forces between such pairs has to be skipped. This is not an issue, as the two nodes are fixed anyway and will consequently not be moved at all. The original $FM^3$ implementation in the OGDF library generally handles such cases by moving the nodes slightly away from each other (within a small epsilon radius) to avoid the singularity in the repulsive force calculation from pairs of nodes with zero distance.

Other modifications: Several other modifications were introduced to enable a flawless interaction with the FieldPlacer framework. However, the general behavior of the $FM^3$ method has, of course, been preserved and the modifications are not essential for the application within the FieldPlacer. For a basic usage in the FieldPlacer (without the second energy phase), any layouting method that takes a gml description of the graph as an input and outputs a gml description of the layout can be used (the nodes' numbers/labels may, in any case, be preserved to reassign the nodes appropriately). As a further extension, the nodes' sizes could be scaled with the nodes' degrees in $FM^3$ to create larger whitespace regions around nodes with higher node degrees to, finally, facilitate the routing.

FieldPlacer framework: The FieldPlacer is an independent implementation and was tested in VTR 7.0 and VTR 6.0. It can easily be integrated into these frameworks by adding the FieldPlacer sources to VPR's SRC folder and running a patch script to incorporate the placement method into VTR's (more precisely VPR's) placer routine. In fact, the user can afterwards choose which placer to use in the GUI or by the command line option—vprfieldplacer. All options can initially be configured in a header file and can also be altered at runtime in the FieldPlacer GUI (a GUI extension of the VPR GUI) to test different strategies and options interactively. As VTR 7.0 is written in C++ while VTR 6.0 was written in pure C, the FieldPlacer implementation provides calls for both and the script to patch VTR expects a parameter to decide which code base may be patched. In detail, the integration of the FieldPlacer into both VTR versions modifies several source code files to integrate the new options, graphics, outputs, etc. However, the FieldPlacer method itself remains as decoupled as possible and works rather encapsulated. To integrate the FieldPlacer into other FPGA 'compile flows', the framework only has to provide the architecture and the design's description. After the entire process, an export routine has to pass back the block positions of the final layout to the compile flow.

The graph debugger component of the FieldPlacer was a great help for the development of all presented features. It exports the graph representation from different steps of the FieldPlacer as gml files to make the effects and results of all steps easily comprehensible. This feature is also very helpful to find and fix methodological bugs in the implementation. Finally, it may support the development of further extensions in the future. Furthermore, a command-line debugging mode can be activated which, e.g., outputs the nodes' parameters of the different NodeLists before and after being sorted (like coordinates, angles to the barycenter, displacements, etc.) and other helpful information especially for further development.

Multiple repetitions of various aspects of the method may further improve a quality of the result. Instead of repeating the entire workflow, it may already be advantageous to repeat (only) the basic FieldPlacer (graph layouting phase for $G_D^{layout}$ and embedding) while choosing the best embedding (subject to a predefined metric) and (potentially) proceed with the LocalRefinement to save the repeated and relatively high refinement runtimes. For this purpose, a statistical framework was implemented around the FieldPlacer which can rate, backup and restore the placements generated in repeated runs. Along with a predefined objective function (e.g., minimize the critical path delay), a backup of the best obtained placement is created and restored whenever a new placement is inferior to this one. In addition to the simple exploitation of 'randomness', the slack graph morphing procedure can be used to optimize for low slack in the system and, consequently, for a small critical path delay by incorporating a timing analysis to modify the graph model. Finally, combined target functions (e.

g., small critical path delay and small overuse) are possible and adaptive termination criteria in the repeated procedure are also applicable.

Figure 7:
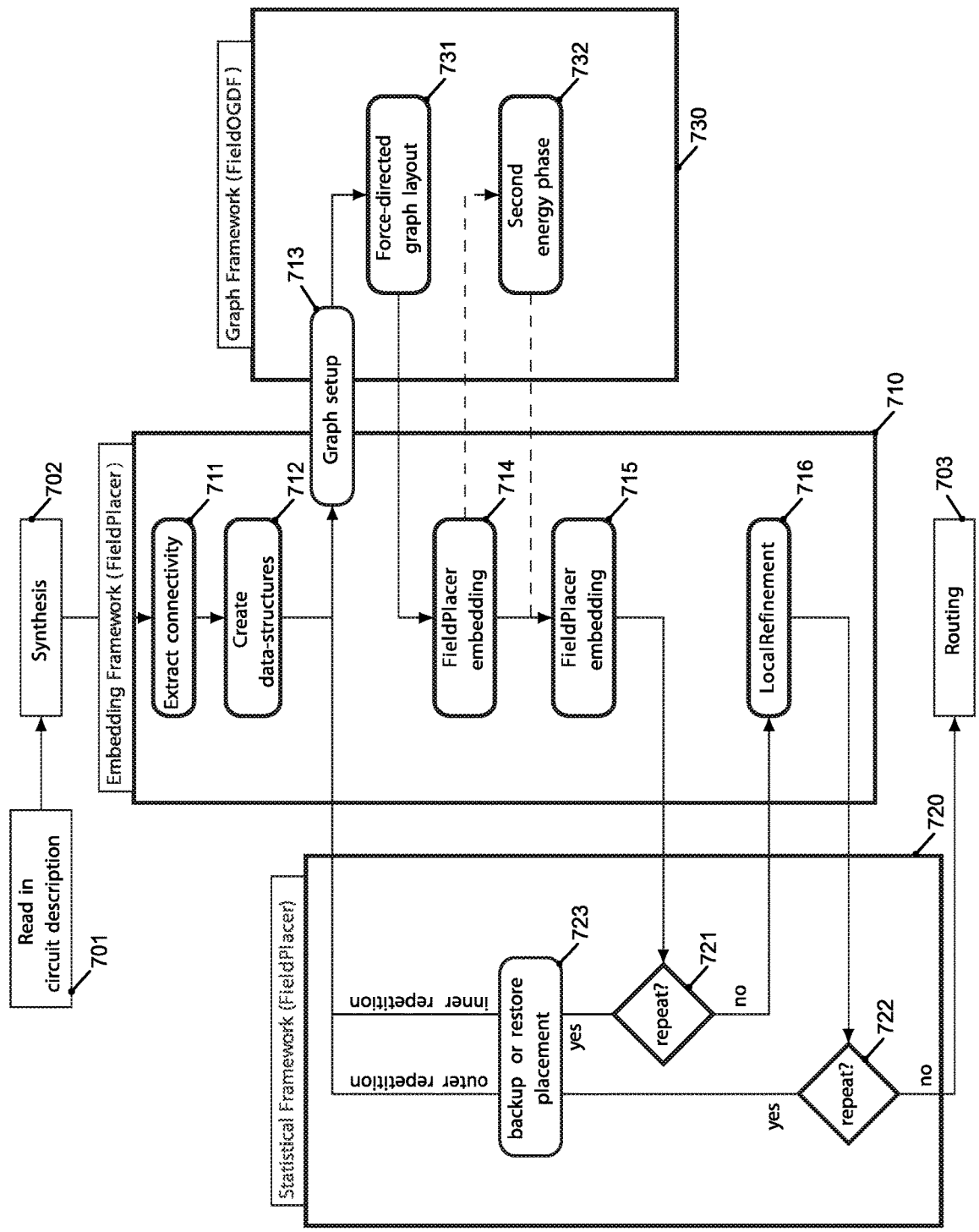
FIG. 7 depicts the statistical framework surrounding the FieldPlacer.

FIG. 7 depicts the whole framework surrounding the FieldPlacer. The framework comprises the sub-frameworks Embedding Framework (EF) 710, Statistical Framework (SF) 720 and Graph Framework (GF) 730. The process flow comprises reading in the circuit description 701, synthesis 702, extracting connectivity 711 (performed within the EF 710), creating data structures 712 (EF) and graph setup 713 (EF/GF). The process flow further comprises the force-directed graph layouting 731 (GF) and the second energy phase (732) (GF). The Embedding Framework 710 further comprises FieldPlacer embedding 714/715 (EF) and Local Refinement 716 (e.g. determining 148 of the refinement). The Statistical Framework 720 further comprises evaluation 721/722 on whether to repeat the graph layout and embedding after embedding/local refinement and a backup or restore functionality 723. The process flow finally comprises routing 703 (e.g. determining 160 the routing). For example, the FieldPlacer congestion-driven maze router evaluation may be used in 720.

Assuming that a local refinement is principally desired to improve the quality of the placement, the first option is to perform inner repetitions. In this case, the graph layout is performed multiple times and each $G_D^{layout}$ graph is embedded with the basic FieldPlacer method. Any of the presented metrics (bounding box cost, wirelength, critical path delay, overuse) can be used to rate these basic embeddings and if an embedding is better than the best one that has been found so far, the solution is backed and the next layout is created. This process can, for example, be repeated until a defined number of iterations has been performed. After restoring the best found solution from the backup, the local refinement can furthermore improve this layout.

Instead of (only) repeating the basic FieldPlacer method in that way, the outer repetition option can be activated to repeat the entire extended FieldPlacer multiple times and choose the best placement (again subject to a predefined objective function). This process can either be repeated interactively by the user until a satisfying solution has been created or automatically with either a constant number of repetitions or with an adaptive termination criterion.

Repeating the entire extended FieldPlacer (including the local refinement in every repetition) is undoubtedly more time consuming than repeating (only) the basic FieldPlacer before a unique final local refinement phase. However, repeating (only) the inner part of the method would only make sense if there is a high correlation between the quality before and after the local refinement (concerning the chosen objective function). To investigate this, 1000 independent extended FieldPlacer layouts of the 'most average' VPR benchmark code have been created. Due to the randomized decisions in the graph layouting phase, the quality of the results concerning the different norms varies. Moreover, the number of iterations in the spring embedder method is restricted and thus the system may not have converged on all levels with the default configuration of the multilevel layout.

Choosing the best placement out of several ones with randomized influences is one possibility to improve the final quality of the placement at the cost of a higher overall runtime. However, the FieldPlacer framework includes another mechanism to specifically improve the critical path delay involving the timing analysis of the entire design after each placement, which has to be performed to rate the critical path delay anyway. For example, the slack on each path in the design may be estimated. Slack appears if one signal has to wait for another one to proceed the signal processing. As a consequence, the critical path of a design is the path with no slack and highest delay. The slack is essentially a result of different amounts of delays on joining paths while the delays occur due to different delay types. While the logic and the propagation delays are independent from the placement, the wire delay depends on the distances between connected logic blocks and thus on the (Manhattan) edge lengths in the graph layout. Other influencing facts (e.g., more detailed Resistor-Capacitor effects) that depend on the detailed routing are not considered at that point.

Slack graph morphing: The idea of the slack graph morphing in the FieldPlacer is as follows: A path with high slack finally has to 'wait' for other signals relatively long at the next synchronization point. Thus, the wires on such paths can be elongated without worsening the overall timing as long as the delay added by the elongation does not exceed the available slack. This opens up the possibility to spread such nodes further away from each other to let other nodes become more close to each other. This opportunity can directly be used for paths with small or even no slack in the design. The connections on such paths could be shrunk to reduce the wire delay and possibly even the critical path (delay) of the design. Thus, the elongation of un-critical paths opens new possibilities for improvements of the critical ones (as the numbers of slots and routing resources on the architecture are both restricted). In this way, the system can improve the timing of the final layout in each repetition and an 'equilibrium slack state' can be reached after a number of such iterations. During this process, the critical path (not only its delay) may even change as the optimization of one path can make another one critical.

If negative slack is present in the design (e.g., due to user-defined timing constraints), all slack values may be constantly shifted by the most negative slack to make all slack values non-negative and maintain the ratios of slack to each other in the system.

The slack graph morphing in the FieldPlacer framework is based on the following model. First, the absolute slack slk(e) on each connection/edge e is related to the average slack $$\overline{slk} = \frac{1}{|E|}\sum_{e \in E} slk(e)$$

in to get a relative measure of the slack on each edge.

$$\widetilde{slk}(e) = \frac{slk(e)}{\overline{slk}} = \frac{slk(e)}{\frac{1}{|E|}\sum_{e \in E} slk(e)} = |E|\frac{slk(e)}{\sum_{e \in E} slk(e)}$$

A resulting value of slk(e)=1.0 consequently means that the slack on the edge e is just on the average of the design. A value that is smaller than 1.0 corresponds to a connection with lower-than-average slack (more critical) and connections with slk(e)>1.0 have an over-average amount of slack (less critical). Using this information, critical edges should be shrunk while uncritical edges can be lengthened. The FieldPlacer framework uses the zero-energy length in the force-system of the spring embedder method to adjust such imbalances. By default (and therefore also in the first iteration of the repeated flow), the zero-energy length is set to $l^{zero}(e)=1.0$ for all edges. After every iteration, this value is updated by averaging the actual zero-energy length of each edge with the new calculated relative slack value obtained from the new layout's timing analysis. In each repetition, the sum of all slk(e) values is |E|. Thus, the relative amount of elongation of edges is exactly compensated by shrinking of other edges). For this part of the FieldPlacer framework in particular, the option of removing parallel (multiple) edges should be activated to make an accurate steering of connections' lengths possible. As already mentioned, the $FM^3$ method is exceptionally well suited for this purpose as it creates layouts that meet the requirements of the defined zero-energy lengths very precisely. When multiple edges $e_1, e_2, \ldots, e_n$ have been combined to one common edge e within the FieldPlacer framework, this resulting edge e consequently gets a slack of $$\overline{slk}(e) = \min_{i=1,\ldots,n} \overline{slk}(e_i)$$

to be as restrictive as possible.

Explicitly improving the critical path delay in repeated runs worsens the overuse in the resulting layout and vice versa due to the principally contradicting characteristics of both targets. However, an 'optimization' in both directions simultaneously can often be desirable. Thus, the FieldPlacer framework includes the ability to use a combined measure to choose a layout with possibly small CriticalPathDelay and small OverUse at the same time. The trade-off can simply be steered by a function representing the convex combination of all desired targets.

Consider n measures of cost $c_0^j, \ldots, c_{n-1}^j$ of a placement generated in repetition j. Every run (j=0, ..., n−1) generates such a set of measures so that $c_i^j$ denotes the placement's cost of type i in repetition j. As the different cost measures can be in very different number ranges (e. g., critical path delay in nanoseconds vs. overuse), each cost value $c_i^j$ of a repetition (j>0) is scaled by the first obtained value ($c_i^0$). Consequently, the relative cost measure $$\tilde{c}_i^j = \frac{c_i^j}{c_i^0}$$

is used to transform all cost values to a more common scale. Thus, the relative measure rates how much better or worse the costs in repetition j are compared to the first obtained layout. Due to this common scale, a convex combination can be used to provide an 'intuitive and meaningful' trade-off between the different cost values.

$$C^j = \sum_{i=0,\ldots,n-1} \lambda_i \cdot \tilde{c}_i^j \text{ with } \lambda_i \geq 0 \text{ and } \sum_{i=0,\ldots,n-1} \lambda_i = 1$$

$C^j$ represents the combined measure for the placement generated in run j. As an example, a benchmark set combining the two already investigated and basically contradicting measures critical path delay ($c_0$) and overuse ($c_1$) in equal shares ($\lambda_0 = \lambda_1 = 0.5$) was executed.

With the combined cost function and activated slack graph morphing, good layouts concerning the desired trade-off between the two measures are chosen and, as a result, both metrics are improved on the average. In fact, all cost measures are further improved by the application of this combined target (in total).

For each metric, the results tend towards a 'common state' (the average layout), which is based on the similar but not identical equilibrium state reached by the force-directed graph layout. Especially after the local refinement, the picture is becoming even clearer. Most of the placements have a similar quality as the average placement while significantly better or worse ones are rare.

In repeated runs, these rare significantly good layouts are the ones a user is interested in. As all the metrics are to be minimized, the left-end of the histograms contain the interesting layouts. To find such, it can be assumed that the layout's quality (in these cases and for these metrics) approximately follow a normal distribution due to the common average state in the force equilibrium towards which all layouts strive.

When an optimization of the critical path delay with activated slack graph morphing is desired, the fact that the slack in the system tendentially decreases in every iteration could be used to terminate as soon as the improvement falls below a certain threshold. However, a general cost measure that follows a normal distribution can reach its randomly influenced optimum in any of the iterations. Hence, the backup and restore functionality has already been introduced to store the best placement that was found.

One question still has to be answered: How could the system determine if a 'significantly good' placement has been found so that the system can finally terminate the search?

To find a measure for the term 'significantly good' placement, the FieldPlacer framework can make use of the confidence interval (CI). Assuming that a normally distributed population is present, the value of one measurement lies in a confidence interval with a certain probability. Cox and Hall described it tangibly as follows: 'The confidence interval represents values for the population parameter for which the difference between the parameter and the observed estimate is not statistically significant at the 10% level'.

However, the real distribution may not be known within the process as the set of measurements only represents a sample. This is especially important in the beginning of the procedure when only very few placements have been accomplished. By consequence, the parameters of the actual distribution may be estimated.

In general, the confidence interval's size depends on the size of the sample—and the corrected sample standard deviation s (square root of the sample variance), precisely on $s/\sqrt{n}$. The smaller this ratio is, the larger is the interval. However, especially for small sample sizes, this value has to be extended to estimate a confidence interval. Consider a set of only two measurements with (coincidentally) almost identical cost function values. The corrected sample standard deviation s would be very small and the confidence interval would consequently also be very small. A significantly good sample would therefore often be detected only based on the fact that the sample size is too small.

To overcome this issue for normally distributed samples of small sizes, William Sealy Gosset developed the t-distribution. The t-distribution can be applied to 'correct' the measured confidence interval parameters for small sample sizes (e.g. for n<30). The samples are in fact very often that small when using the FieldPlacer method. To finally steer the size of the confidence interval and, therefore, the desired quality of the result, the confidence level can be varied in the FieldPlacer framework. Three predefined confidence levels of 0.75 (small), 0.975 (medium) and 0.998 (high) can be chosen at runtime whereas others are easily insertable. The method may further comprise repeating at least one of the determining 130 of the force-directed layout of the circuit graph, determining 140 the placement of the plurality of logic blocks, determining 150 the placement of the plurality of input/output blocks, determining 170 the placement of the memory blocks, determining 180 the placement of special function blocks and determining 160 of the actual routing or of a simulated routing without capacity constraints on the routing architecture with the congestion-driven maze router to estimate the routability of a placement, e.g. based on a confidence interval of a statistical distribution of optimization criteria of previous runs of the aforementioned method steps.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . ." performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software, but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. A method for determining a placement of at least one circuit for a reconfigurable logic device, the method comprising:
    obtaining information related to the at least one circuit, wherein the at least one circuit comprises a plurality of blocks and a plurality of connections between the plurality of blocks, and wherein the plurality of blocks comprise a plurality of logic blocks and a plurality of input/output blocks;
    calculating a circuit graph based on the information related to the at least one circuit, wherein the circuit graph comprises a plurality of nodes and a plurality of edges, wherein the plurality of nodes represent at least a subset of the plurality of blocks of the at least one circuit and wherein the plurality of edges represent at least a subset of the plurality of connections between the plurality of blocks of the at least one circuit;
    determining a force-directed layout of the circuit graph, wherein the force-directed layout is based on attractive forces based on the plurality of connections between the plurality of blocks and based on repulsive forces between the plurality of blocks; and
    determining a placement of the plurality of logic blocks onto a plurality of available logic cells of the reconfigurable logic device based on the force-directed layout of the circuit graph
    determining a placement of the plurality of input/output blocks onto a plurality of available input/output cells, wherein the determining of the placement of the plurality of input/output blocks is based on the force-directed layout of the circuit graph and based on the placement of the plurality of logic blocks.

2. The method according to claim 1, wherein the determining of the placement of the plurality of logic blocks is based on an arrangement of nodes of the plurality of nodes defined by the force-directed layout of the circuit graph.

3. The method according to claim 1, wherein the determining of the force-directed layout of the circuit graph is based on determining an energy-minimal state of a plurality of spring functions between the plurality of nodes, wherein the plurality of spring functions are based on a counteracting between the attractive forces and the repulsive forces.

4. The method according to claim 1, wherein the determining of the force-directed layout is based on a Manhattan-distance between nodes of the plurality of nodes,
and/or wherein a repulsive force of a block of the plurality of blocks increases with a number of connections of the block of the plurality of blocks,
and/or wherein the plurality of available logic cells is arranged in a three-dimensional grid,
and wherein the force-directed layout of the circuit graph corresponds to a three-dimensional force-directed layout of the circuit graph based on attractive and repulsive forces.

5. The method according to claim 1, wherein the determining of the placement of the plurality of logic blocks comprises:
partitioning the placement of the plurality of logic blocks into a plurality of partitions, and
determining a refinement of the placement of the plurality of logic blocks onto the plurality of available logic cells based on a local refinement of partitions of the plurality of partitions based on an optimization criterion.

6. The method according to claim 1, wherein the determining of the force-directed layout of the circuit graph further comprises rotating an intermediate force-directed layout of the circuit graph;
and/or wherein the determining of the force-directed layout of the circuit graph further comprises rotating an intermediate force-directed layout of the circuit graph based on an evaluation of predicted routing distances for a plurality of rotation angles;
and/or wherein the determining of the force-directed layout of the circuit graph comprises at least determining a first force-directed layout of the circuit graph and determining a second force-directed layout of the circuit graph to obtain the force-directed layout of the circuit graph, wherein the attractive forces used for the second force-directed layout of the circuit graph are based on the criticality of paths defined by the plurality of logic blocks and influenced by the length of the edges of the first force-directed layout of the circuit graph.

7. The method according to claim 1, wherein the determining of the placement of the plurality of logic blocks onto a plurality of available logic cells comprises:
splitting the plurality of logic blocks into a plurality of slices based on a first direction based on the force-directed layout of the circuit graph, and
distributing logic blocks of a slice of the plurality of slices based on a second direction based on the force-directed layout of the circuit graph.

8. The method according to claim 1, further comprising:
determining a further force-directed layout of the circuit graph based on the placement of the plurality of input/output blocks and based on the attractive forces indicated by the plurality of connections between the plurality of cells; and
determining a refinement of the placement of the plurality of logic blocks onto the plurality of available logic cells based on the further force-directed layout of the circuit graph.

9. The method according to claim 8, wherein the force-directed layout of the circuit graph is based on a first distance metric and wherein the further force-directed layout of the circuit graph is based on a second distance metric being different from the first distance metric, and/or wherein the determining of the placement of the plurality of input/output blocks is based on a barycenter of logic blocks of the placement of the plurality of logic blocks connected to the plurality of input/output blocks.

10. The method according to claim 1, further comprising:
determining a routing of the plurality of connections between the plurality of blocks based on the placement of the plurality of logic blocks and based on the placement of the plurality of input/output-blocks.

11. The method according to claim 10, wherein the determining of the routing of the plurality of connections is based on a preferred routing of at least one critical path of the at least one circuit and/or on a predicted signal slack based on at least one critical path of the at least one circuit.

12. The method according to claim 1, wherein the plurality of blocks further comprises a plurality of memory blocks, wherein the method further comprises determining a placement of the plurality of memory blocks onto a plurality of available memory cells based on the force-directed layout of the circuit graph and based on the placement of the plurality of logic blocks,
and/or wherein the plurality of blocks further comprises a plurality of special function blocks, wherein the method further comprises determining a placement of the plurality of special function blocks onto a plurality of available special function cells based on the force-directed layout of the circuit graph and based on the placement of the plurality of logic blocks.

13. The method according to claim 1, further comprising determining a simulated shortest-path routing without capacity constraints on a routing architecture of the reconfigurable logic device to estimate a routability of a placement, and wherein at least one of the determining of the placement of the plurality of logic blocks, determining a placement of a plurality of input/input blocks, determining a placement of a plurality of memory blocks and determining a placement of a plurality of special function blocks is further based on the estimated routability of the placement.

14. A computer program having a program code for performing a method comprising:
obtaining information related to the at least one circuit, wherein the at least one circuit comprises a plurality of blocks and a plurality of connections between the plurality of blocks, and wherein the plurality of blocks comprise a plurality of logic blocks and a plurality of input/output blocks;
calculating a circuit graph based on the information related to the at least one circuit, wherein the circuit graph comprises a plurality of nodes and a plurality of edges, wherein the plurality of nodes represent at least a subset of the plurality of blocks of the at least one circuit and wherein the plurality of edges represent at least a subset of the plurality of connections between the plurality of blocks of the at least one circuit;
determining a force-directed layout of the circuit graph, wherein the force-directed layout is based on attractive forces based on the plurality of connections between the plurality of blocks and based on repulsive forces between the plurality of blocks; and determining a placement of the plurality of logic blocks onto a plurality of available logic cells of the reconfigurable logic device based on the force-directed layout of the circuit graph determining a placement of the plurality of input/output blocks onto a plurality of available input/output cells, wherein the determining of the placement of the plurality of input/output blocks is based on the force-directed layout of the circuit graph and based on the placement of the plurality of logic blocks.

\* \* \* \* \*